United States Patent [19]

Aasen et al.

[11] Patent Number: 4,802,100

[45] Date of Patent: Jan. 31, 1989

[54] ADVANCED COGENERATION CONTROL SYSTEM

[75] Inventors: Robert K. Aasen, St. Paul; Donald C. Turck, Minneapolis; Anoop K. Mathur, Shoreview, all of Minn.

[73] Assignee: Gas Research Institute, Chicago, Ill.

[21] Appl. No.: 897,645

[22] Filed: Aug. 18, 1986

[51] Int. Cl.[4] .......................... G06F 15/46; H02P 9/04
[52] U.S. Cl. ..................................... 364/494; 364/492; 364/431.03; 60/648; 60/660; 290/4 R
[58] Field of Search ............... 364/494, 492, 495, 493, 364/431.01, 431.12, 464; 60/648, 660, 659, 662; 290/2, 4 R

[56] References Cited

U.S. PATENT DOCUMENTS

| | | | |
|---|---|---|---|
| 3,891,915 | 6/1975 | Yannone | 322/15 |
| 4,271,473 | 6/1981 | Ross | 364/494 |
| 4,446,700 | 5/1984 | Bronicki et al. | 60/641.8 |
| 4,510,756 | 4/1985 | Hise et al. | 60/659 |
| 4,527,071 | 7/1985 | Ausiello | 290/4 R |
| 4,550,380 | 10/1985 | Bukowski et al. | 364/494 |

Primary Examiner—Parshotam S. Lall
Assistant Examiner—V. N. Trans
Attorney, Agent, or Firm—Thomas W. Speckman; Ann W. Speckman

[57] ABSTRACT

Control sub-systems, modularized on both a hardware and software basis are configurable to supplement an existing cogeneration system package, controlling and/or monitoring only essential control points of such cogeneration system to select thermal or electrical load following modes, or on and off modes, and to optimize the operation of the cogeneration system handling only a few control points. Various inputs of the cogenerator system are sensed and used in generating diagnostic or performance evaluation routines. Personality modules adapt the sub-systems to a particular cogeneration package type, and permit tailoring for economic considerations, such as local rates and schedules, performance characteristics and operating constraints of the associated cogeneration package and the like.

36 Claims, 10 Drawing Sheets

EXHAUST BYPASS VALVE

FAN

ENGINE THROTTLE (TLF)

ENGINE THROTTLE (ELF OR LIM)

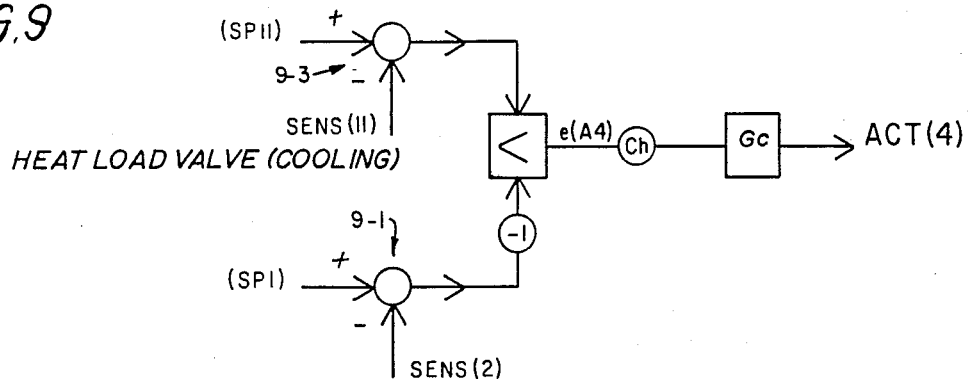
FIG.9 HEAT LOAD VALVE (COOLING)
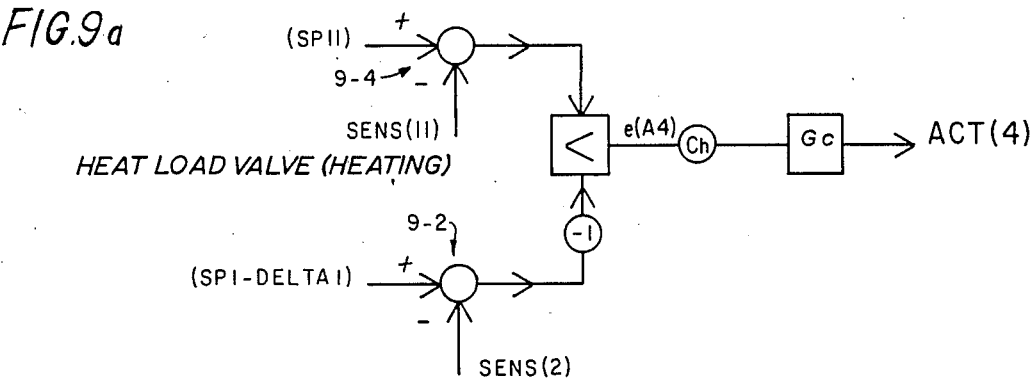
FIG.9a HEAT LOAD VALVE (HEATING)
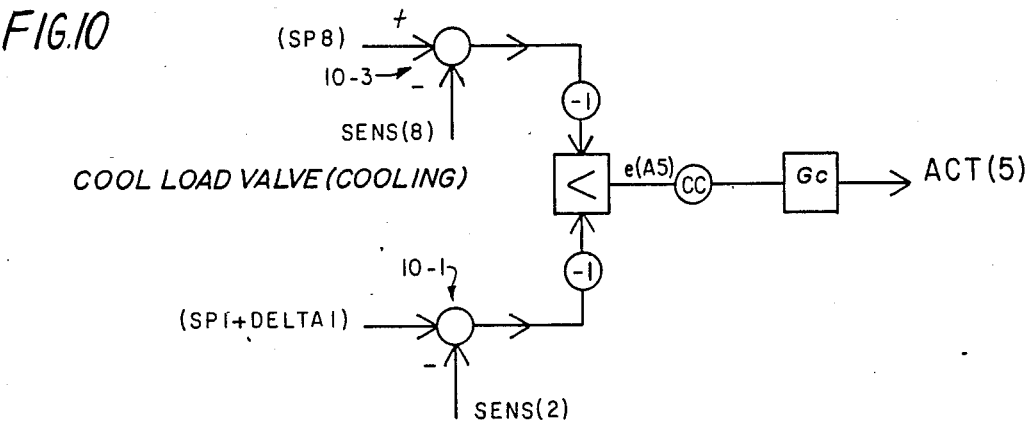
FIG.10 COOL LOAD VALVE (COOLING)
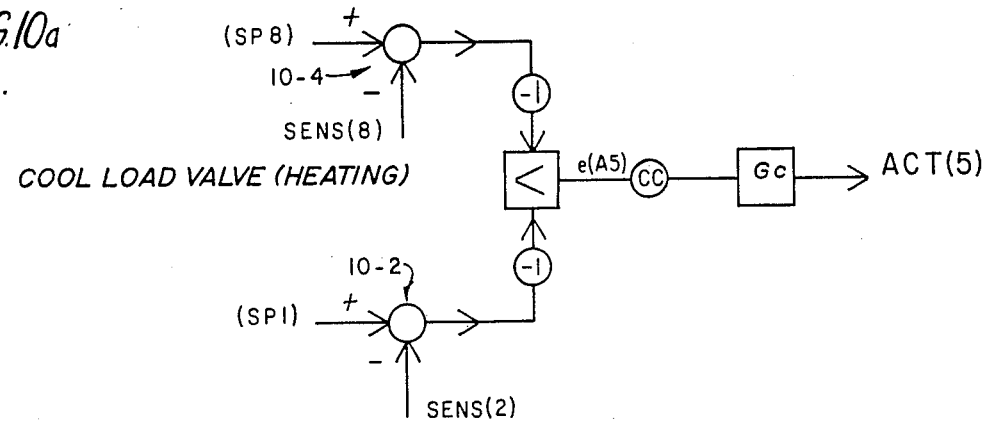
FIG.10a COOL LOAD VALVE (HEATING)
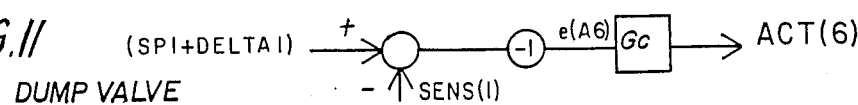
FIG.11 DUMP VALVE

ADVANCED COGENERATION CONTROL SYSTEM

BACKGROUND OF THE INVENTION

This invention relates to cogeneration systems and more particularly to microprocessor-based control sub-systems for packaged cogeneration systems.

In recent years, the use of cogeneration systems has become increasingly popular as a vehicle for reducing costs associated with energy usage in commercial and industrial operations. In a typical cogeneration system, an electrical power generator, such as a gas-fired turbine driving a generator, is used to generate electricity for supplying the electrical needs of the installation. Any excess electrical power generated is sold to the power company, and electrical power is purchased from the power company only to the extent necessary to supplement the amount of electrical power produced by the cogeneration system. Wastes such as heat loss are eliminated by utilizing heat generated as a result of production of electrical power for supplying or at least contributing to, heat and/or cooling demands for the installation. Heat produced as a result of operation of the gas-fired turbine is extracted by way of a heat exchanger and used in supplying heating and cooling demands for the installation.

In view of the increasing popularity of the cogeneration philosophy various manufacturers are producing packaged cogeneration systems including gas-fired turbine engine-generator, for example, with an associated digital computer for controlling the operation of a cogeneration system including monitoring and control of the engine governor, engine fail-safe controls, control of electrical production, switch gear, pumps, valves, etc. of the cogeneration system.

Packaged cogeneration systems with low-functionality controllers make the economics of cogeneration less attractive, and this decreases the marketability of small (kilowatt) cogeneration systems. Cogeneration controllers that can implement integrated and advanced control and that possess information, diagnostics, and communication features are not presently available commercially. Presently, costly customer-designed control sub-systems are necessary to provide such features.

Thus it would be desirable to have a family of advanced controllers that addresses the technical and cost control requirement for packaged, gas-fired cogeneration systems. In particular, it would be desirable to have a family of controllers which possess standardized functions to address modularity of both control hardware and software and cost effectively address the spectrum of packaged cogeneration market needs.

It would also be desirable to have a control sub-system for operating a cogeneration system reliably at maximum economic performance while meeting the cogeneration system operating constraints.

SUMMARY OF THE INVENTION

The present invention provides a family of cogeneration control and/or monitoring sub-systems for use with packaged cogeneration systems to provide local and strategic control, remote monitoring, diagnostics, information and reports, alarms and warnings, and tailoring of system operation. The sub-systems supplement existing cogeneration system controls. Personality modules provide for specialized control and related needs of the particular cogeneration system. The personality modules adapt the sub-systems to a particular cogeneration package type.

The systems are operable in an economic mode in which the operating mode is selected as a function of economic considerations, heating demands, sale and purchase price for electrical power, etc. The systems are also operable in load following, electrical or thermal, limit or fixed modes, and on or off modes.

In accordance with one embodiment of the invention, a control sub-system for a cogeneration system includes a liquid-cooled internal combustion engine, electrical generator means coupled to the engine and driven thereby for generating electrical power, power grid switch means connecting the electrical power output of the generator means with a power grid and an electrical load, heating means, cooling means, primary heat exchanger means, and a dump heat exchanger means. The primary heat exchanger means is coupled to the internal combustion engine for extracting therefrom heat energy generated as a result of operation of the engine, and applying same to the heating means and cooling means for supplying heating and cooling demands of the installation. The dump heat exchanger means with a fan is used to reject excess heat. A controller means, including programmed computer and a programmable controller, provides supervisory control of the above cogeneration system.

The control sub-system has three major functions: control, monitoring, and tailoring. The controller means responds to the sensor signals to monitor and control the operation of functional devices of the cogeneration system. A plurality of analog and discrete sensors are used, each being coupled to a signal processing means to provide a sensor signal indicative of a different parameter of the cogeneration system. The controller means acquires data, checks for alarm conditions, executes control algorithms, computes and tabulates operating information, and supervises control of the cogenerator.

The controller means responds to the sensor signals to control functional devices to define the operating characteristics of the cogeneration system tailoring means enabling changing of the operating characteristics of the cogeneration system through entry of information via the operator interface means.

The controller means also responds to the sensor signals to control the operation of the engine for operating the cogeneration system in one of a plurality of operating modes including an electrical load following mode wherein the engine is controlled to produce the energy required to meet the electrical loads of the installation and a thermal load following mode in which the engine is controlled to generate sufficient thermal energy to satisfy the heating and cooling requirements of the installation. The controller means responds to the sensor signals and to data signals representing the expected total cost for each operating mode to select the operating mode for the cogeneration system which is most economical. This strategy is called the "economic mode". A load prioritization feature controls changes in set points as a function of heating and cooling priority for the system, enabling delivery of thermal energy to the heating or cooling load with the most costly auxiliary system.

The controller means further responds to the sensor signals to control the operation of other major actuators to maintain stable design conditions in the cogeneration system. A unique application of auctioneering feedback control is employed.

Monitoring means provides a menu-driven operator interface. Through this interface the operator can request the generation of reports on the status and operation of the controller and the cogenerator. The monitoring means receives and stores information generated by the controller means, and generates diagnostic reports, notices, etc.

A unique diagnostic feature is the degradation detection, which uses sensor signals and algorithms to generate the trend-based cogeneration component performance reports, which are continuously updated in the system monitoring means also communicates information obtained by supervising and monitoring the operation of the cogeneration system, transmitting the information to remote terminals and the like.

The tailoring means provides a menu-driven operator interface means through which the operating characteristics of the cogenerator system and the controller means can be modified upon request. Examples of items which can be tailored include scheduling, fuel costs, characteristics of the heating and cooling system and of the cogeneration systems, values of constraints for analog control loops and titles, formats, reporting intervals etc. for reports, as well as titles for the sensors and actuators.

The invention consists of certain novel features and structural details hereinafter fully described, illustrated in the accompanying drawings, and particularly pointed out in the appended claims, it being understood that various changes in the details may be made without departing from the spirit, or sacrificing any of the advantages of the present invention.

DESCRIPTION OF THE DRAWINGS

For the purpose of facilitating and understanding the invention, there is illustrated in the accompanying drawings a preferred embodiment thereof, from an inspection of which, when considered in connection with the following description, the invention, its construction and operation, and many of its advantages will be readily understood and appreciated.

FIGS. 5–11 illustrate proportional control loops implemented by the control sub-system of FIG. 4;

DESCRIPTION OF THE PREFERRED EMBODIMENT

Figure 1:
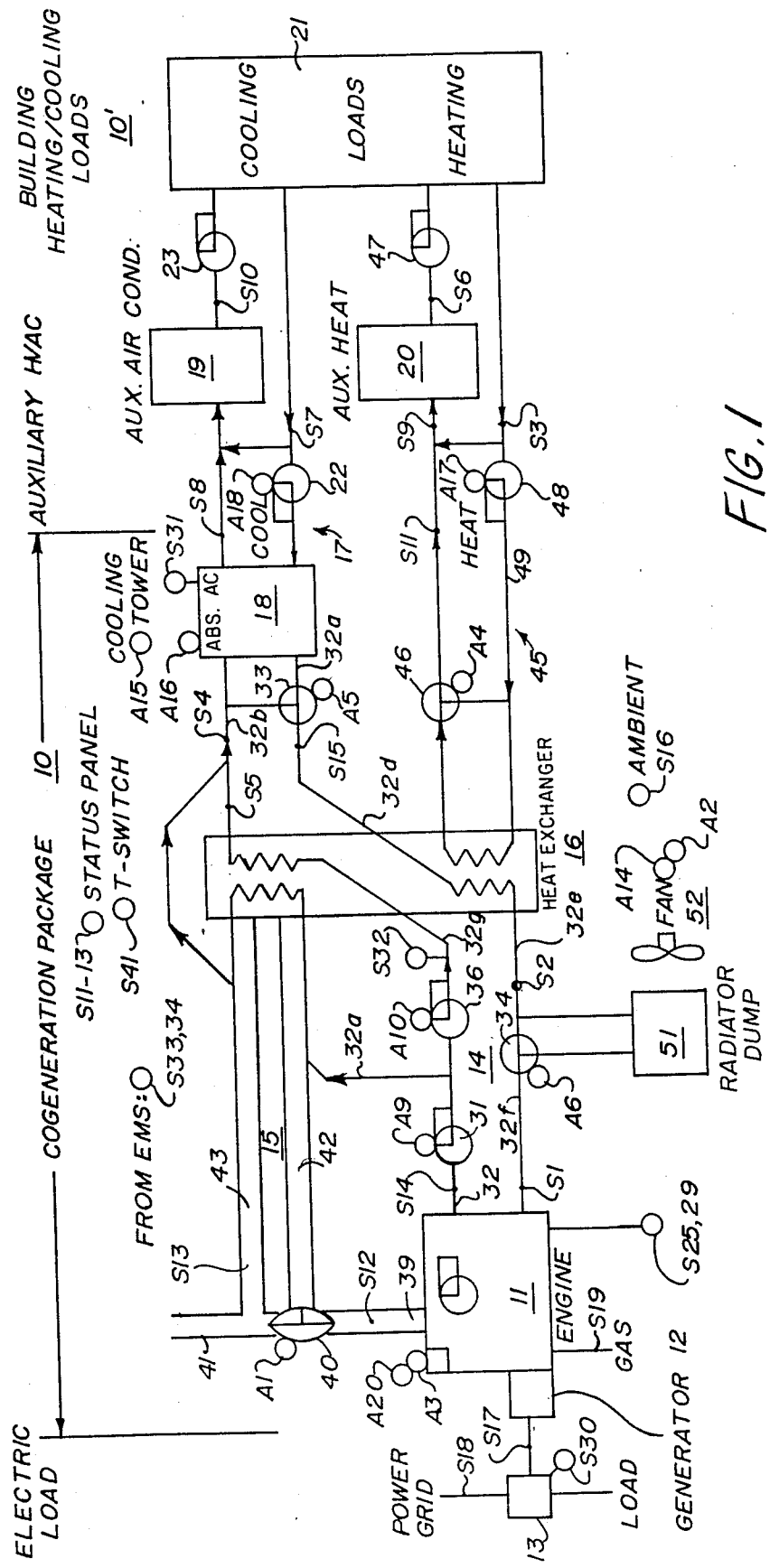
FIG. 1 is a block diagram of a gas-fired cogeneration system.

Referring to FIG. 1, there is illustrated a typical cogeneration system 10 including a gas-fired engine 11 which supplied electrical, heating and cooling demands to a commercial or industrial installation 10'. The internal combustion engine 11 is coupled to a generator 12. The generator 12 is coupled through suitable switch gear 13 to an electrical load or alternatively to the power grid of an electrical power distribution system. The system 10 further includes a fluid circuit 14 for recovering heat from the liquid coolant for the engine 11 and a fluid circuit 15 for recovering heat from exhaust gases of the engine by way of a heat exchanger 16. Heat is coupled from the heat exchanger 16 to a cooling loop 17 including an absorption air conditioner 18 and an auxiliary air conditioning unit 19 and to a heating loop 45 including an auxiliary heating unit 20, which supply the cooling and heating loads, represented by block 21, for the building or installation.

In loop 14, cooling fluid, preferably in liquid form, is circulated by way of engine jacket pump 31 through a duct 32, through piping 32a, piping 32b to the inlet of the absorption air conditioner 18, and returned through piping 32c, a valve 33, through piping 32d, through the heat exchanger 16, through piping 32e, through valve 34 and through piping 32f to the inlet of the engine cooling jacket. Fluid provided at the output of engine jacket pump 31 may be diverted through the heat exchanger 16 through a path including a silencer boost pump 36, piping 32g and piping 32h, the outlet of which is connected to piping 32b at the inlet of the absorption air conditioner 18.

Exhaust gas from the engine flows through an outlet duct 39 through an exhaust bypass valve 40 and at the outlet of the bypass valve 40 is vented to atmosphere through an exhaust duct 41. A portion of the exhaust gas is diverted around the bypass valve 40 through a duct 42 through the heat exchanger 16 and through duct 43 to the outlet vent duct 41.

Heat extracted from the exhaust gases and applied to the absorption air conditioner 18 provides cooled fluid which is conducted through auxiliary air conditioner 19 and cooling pump 23 to meet the cooling needs of the installation. The cooling return loop includes cooling pump 22 which circulates the cooled fluid through the cooling loop.

Heat extracted from the engine cooling jacket by the heat exchanger 16 is absorbed by fluid flowing through a heat loop 45 which includes a heat loop valve 46, the auxiliary heating unit 20, a heat pump 47 at the outlet of the auxiliary heating unit, and a heat loop pump 48 in the heat return duct 49.

For the purpose of dumping excess heat, the cogeneration system 10 includes a radiator dump 51 and an associated fan 52. The inlet of the radiator dump 51 is connected to the inlet of the dump valve 34 which is connected in piping 32e and 32f in the cooling liquid return to the inlet of the engine cooling jacket. The dump valve 34 is operable to direct the fluid flowing through piping 32e directly to the inlet of the engine cooling jacket through piping 32f, or divert some or all of the fluid to the radiator dump 51 to vent the excess heat.

Controller Sub-systems

In accordance with the present invention, there is provided a family of supervisory controller sub-systems which possess standardized functions and address modularly and cost-effectively the requirements for control and monitoring functions for commercial available, packaged gas-fired cogeneration systems, such as the system illustrated in FIG. 1. For the purpose of controlling and monitoring the operations of the cogeneration system, there are provided a plurality of sensors S1–S19, S25–S34 and S40, and a plurality of control points A1–A20 for the system at various points therewithin. The information obtained from the sensors is used in controlling the system operation.

Figure 2:
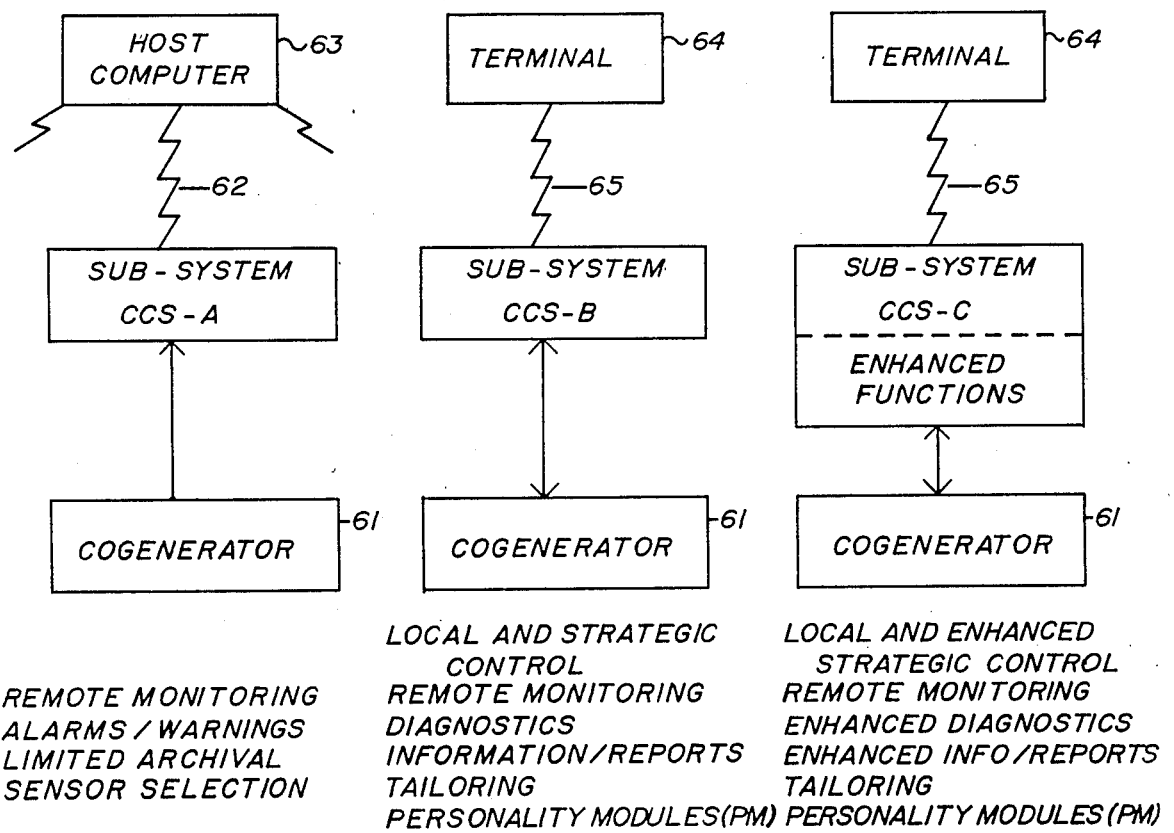
FIG. 2 is a block diagramatic representation of the controller sub-systems provided in accordance with the present invention for monitoring and/or controlling a cogeneration system.

Referring to FIG. 2, there is illustrated three realizations of cogeneration control sub-systems, CCS-A, CCS-B and CCS-C.

Control cogeneration sub-system CCS-A is a low-cost remote monitoring system for a packaged cogeneration system 61 including a process controller that gathers and archives data from sensors of the system 61 for routine transmittal via phone line 62 to a central/host computer 63. The sub-system CCS-A performs limit checks and initiates warnings to the central computer. The host computer software provides communications with multiple remotes (not shown), archives and processes transmitted data, and generates reports. In accordance with a tailoring feature performed by the host computer, the sub-system CCS-A can be adapted to a wide range of performance characteristics, economic profiles and the like as a function of application. Although the sub-system CCS-A requires a central host computer, the sub-system is modularly extendible into higher level cogeneration control sub-systems such as sub-systems CCS-B and CCS-C.

The process controller under software control collects sensor data, archives a selected subset of the collected data, checks for alarm conditions, and initiates communications to the host. The host computer collects, processes and generates reports on the data collected by the remote monitoring units. The host computer also tailors the characteristics of each of up to eight remote units and support communications with the remotes.

Cogeneration control subsystem CCS-B, which can provide monitoring and control of the packaged cogeneration system 61, incorporates a carefully chosen subset of control, diagnostics, information, and tailoring features. The sub-system CCS-B is a totally stand-alone controller. Sub-system CCS-B provides advanced load-following control, user-selected mode scheduling, and integrated local loop control. Diagnostics consist of notices, alarms, and limit checks of key parameters. Essential information and reporting are provided.

Cogeneration control sub-system CCS-C, which provides advanced monitoring and control for cogeneration system package 61, is a stand-alone controller that provides advanced control (the "economic mode" strategy, or least-cost operation, with real-time calculation and load-following), diagnostics (trend-based degradation detection), and information (through data presentation and reports), along with application flexibility via its integral tailoring feature. Both sub-systems CCS-B and CCS-C provide communications to one or more remote terminals 64 via a telephone link 65 and require the use of manufacturer-specific personality modules. The CCS-B and CCS-C control those cogeneration package components required to implement effective integrated control of the package. Core local control, including reliability constraints, is implemented on the engine (supervisory only), silencer, dump, heating valve and pump, and integral absorption air conditioner (enable only) and pump. Local control functions, set points, and constraints are integrated to improve performance, minimize equipment stresses, and minimize operating losses. This is critical during mode changes, start-ups and shutdowns.

The sub-systems CCS-B and CCS-C perform the following diagnostic functions: presentative maintenance notices, when hours logged reach a set point value, warnings, when monitored sensors reach a set point, and alarms and shutdowns, when a subset of the monitored sensors reach a set point, when the engine's integral shutdown is implemented, or when the system fails. The sub-systems provide status (raw data and sensor/actuator readings), diagnostic status, calculations (processed data), and reports (archived calculations). The sub-systems provide a tailoring package for its configuration to variances in the cogeneration package and, to a limited extent, the site/system application. This package is menu-driven and enables the tailoring of operating schedules, control set points/constants, diagnostic limits, and report destinations.

Application flexibility is addressed via tailoring and manufacturer-specific personality modules. The control function includes local control implementation of select cogeneration package components, local control integration, thermal/electrical load following, and manual advanced control strategy (the economic mode). Mode selection and component performance/reliability constraints are provided. The interface with the engine's integral controls and switch gear is specified.

Personality Modules

A feature of the controller sub-systems CCS-B and CCS-C is use of "personality modules." Basic software functions that are identical for a controller type (CCS-B or CCS-C) are identified as "core". At points where software functions differ for different applications, "function calls" to personality procedures are implemented. The set of procedures that addresses the needs of a specific cogeneration system type comprises the personality module.

By way of illustration of the nature of the personality modules for a given sub-system, if the software consisted of four main modules, Module A, Module B, Module C, and Module D, its structure may be defined as follows:

Module A consists of Submodules A.X, A.1.a, A.2.a, A.3.a, and A.4.a

Module B consists of Submodules B.X, B.2, B.3.a, and

Module C consists of Submodules C.X, C.2, C.3, and C.4

Module D consists of Submodules D.X, D.2, D.3.a, and D.4.a (where the "a" refers to a specific personality module "PM-a")

The core then would be comprised of:

executives "A.X, B.X, C.X, and D.X, the structure "Module A=A.1+A.2+A.3+A.4", and submodules B.2, C.2, C.3, C.4, and D.2, which do not change from one complete system to the next (Note the absence from "core" of submodules with the designation "a" which identifies specific personality modules.

Therefore, the complete "personality module, PM-a" would be comprised of the following submodules:

Submodules A.1.a, A.2.a, A.3.a, and A.4.a,
Submodules B.3.a, and B.4.a, and
Submodules D.3.a, and D.4.a.

Note that Module A is virtually unique to each controller and therefore part of each personality module, whereas Module C does not change and therefore is part of the core. There would be no "unused" software submodules, but rather unneeded software would be deleted from the personality module.

The sub-systems CCS-B and CCS-C core functions include control, diagnostics, information, and tailoring. The sub-system CCS-B core is a subset of the core function set for the advanced sub-system CCS-C. The core functions of the two sub-systems CCS-B and CCS-C are different, and likewise their personality modules are also different.

In the control portion of the personality module, the cogeneration package configuration, integrated control strategy, and associated components and control points are defined. The appropriate implementation of the core control functions on a specific system type is then developed. The personality module defines quantity and type (on/off or PI) of controlled valves, heat exchanger location, heat rejection mechanism, prime mover type (reciprocating or turbine), energy transport (water or steam), required control-specific sensor set, special considerations, etc.

In the diagnostics portion of the personality module, the diagnostic-specific sensors to be monitored in each category are defined. The core diagnostic functions are then implemented, based on this unique input set. The personality module defines quantity and type of sensors, parameters to be "diagnosed" and trended, diagnosis-based control supervision (shutdown), special considerations, etc.

In the information portion of the personality module, the information-specific sensors to be monitored are defined. The core information functions are then implemented, based on this unique input set. The personality module defines quantity and type of sensors, calculations to be made, special considerations, etc.

In the tailoring portion of the personality module, the tailored parameters are defined. The personality module is primarily a function of the CCS core and secondarily of the control, diagnostics, and information requirements.

The sub-systems CCS-A and CCS-B are streamlined versions of the system CCS-C. Accordingly, only sub-system CCS-C will be described in detail, with reference to an application for controlling the cogeneration system illustrated in FIG. 1. The sub-system CCS-C provides a local control implementation of select functions of the complete cogeneration system, particularly those cogeneration package components required to implement effective integrated control of the package, providing load following operation, and economic load strategy as will be described. Specific controls which are assumed by the sub-system CCS-C include, with reference to FIG. 1, throttling of the engine 11, operation of the exhaust bypass valve 40, the heat dump 51, both the dump valve 34 and fan 52, the heating valve 46 and heat boost pump 48, the absorption air conditioner valve 33 and associated pump 17, for example.

Figure 3:
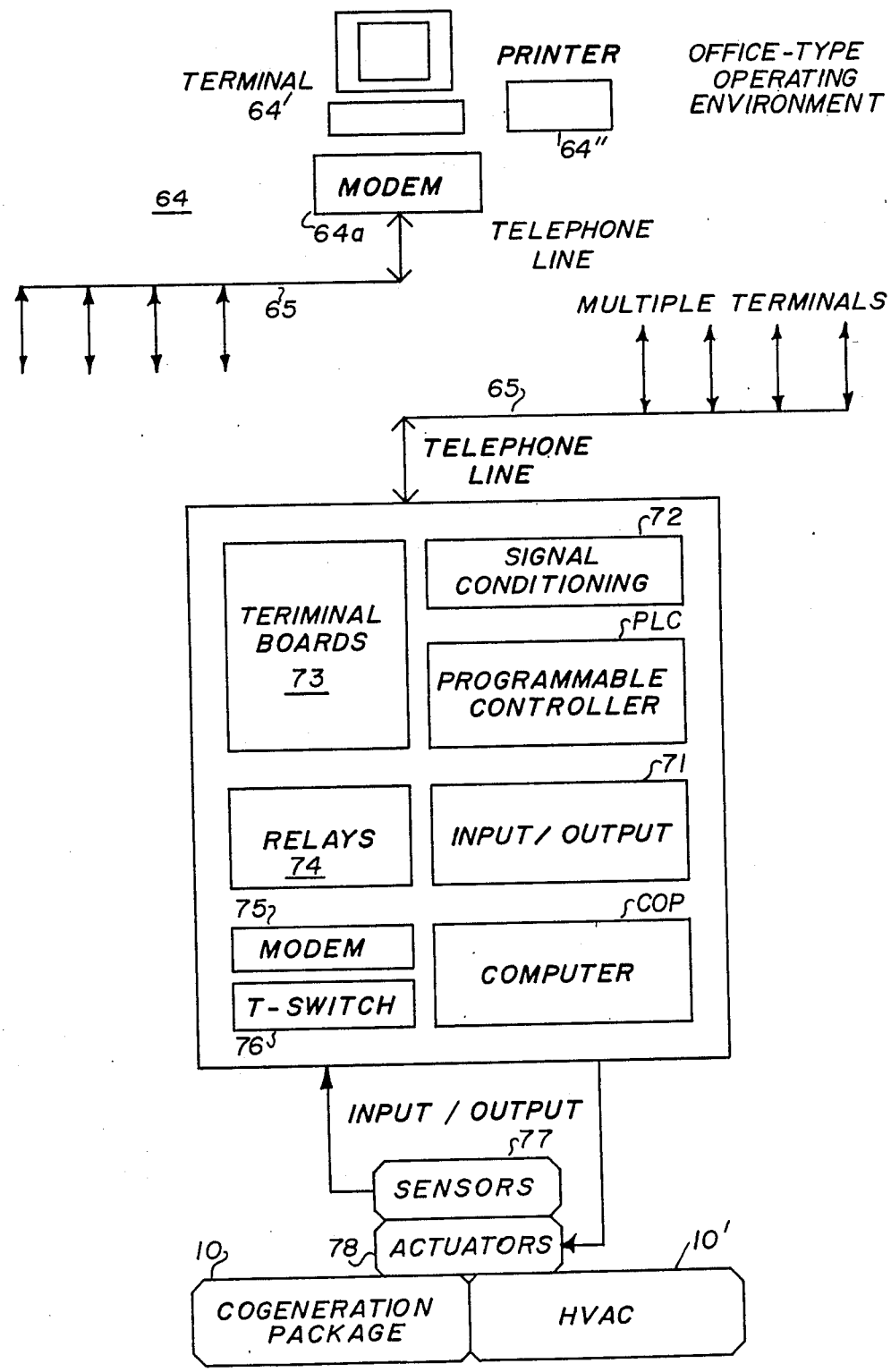
FIG. 3 is a detailed block diagram of one of the cogeneration control sub-systems illustrated in FIG. 2.

Referring to FIG. 3, the sub-system CCS-C comprises an industrial grade computer COP, a programmable controller PLC, input/output modules 71, and various hardware including an analog signal conditioning sub-system 72, terminal boards 73, relays 74, a modem 75, and a T-switch 76. The input/output modules 71 interface sensors 77 and actuators 78 with the programmable controller PLC. The sensors 77 and actuators 78 are associated with the cogeneration system 10 (FIG. 1), which controls heating, ventilating and air conditioning system 10', illustrated in FIG. 1. The location of sensors 77 and the identification of the actuators 78 is provided hereinafter.

As indicated, the sub-system CCS-C communicates with one or more terminals 64 via a telephone line 65. Sub-system CCS-C includes modem 75 for interfacing the sub-system CCS-C with a telephone line 65. The remote terminal 64 may includes a display unit 64' and a printer 64" in addition to modem 64a. Remote terminal 64 may for example be at office or at othe monitoring locations, remote from the location of the cogeneration. Data structure and definition are defined in Tables I and I-A.

TABLE I

| Name | Type | Definition |
|---|---|---|
| | | Data Structure Definitions |
| SENS | Real | Sensor readings |
| ACT | Real | Actuator settings |
| ACK | Byte | Status of diagnostic acknowledge |
| XD | Real | Calculations |
| X | Real | Integrated calculations |
| ST$ | String | Sensor titles |
| SD$ | String | Sensor units |
| AT$ | String | Actuator titles |
| AD$ | String | Actuator units |
| WARN$ | String | Diagnostic times |
| WT$ | String | Diagnotic titles |
| XT$ | String | Calculation titles |
| XD$ | String | Calculation units |
| SCHEDO | Byte | Operation schedule |
| SCHEDP | Byte | On peak/off peak schedule |
| TL | | |
| (1,2) | | On and off peak retail electrical rates |
| (3,4) | | On and off peak electrical sales rates |
| (5) | | Auxiliary boiler fuel rate |
| (6) | | Ratchet period |
| (7) | | Cogenerator engine fuel cost |
| (8) | | Heating set point |
| (9) | | Demand charge |
| (10) | | Limit set point |
| (11) | | Auxiliary boiler gas efficiency |
| (12) | | Vapor compression air conditioner COP |
| (13) | | Heat loop flow rate |
| (14) | | Cool loop flow rate |
| (15) | | Minimum throttle |
| (16) | | Engine warm-up time |
| (17) | | Engine parasitic rating |
| (18) | | Absorption air conditioner parasitic rating |
| (19) | | Dump jacket parasitic rating |
| (20) | | Absorption air conditioner minimum on time |
| (21) | | Silencer outlet set point |
| (22) | | Engine jacket inlet design set point |
| (23) | | Cogenerator air conditioner hot set point |
| (24) | | Dump jacket set point |
| (25) | | Cogenerator air conditioner cold set point |
| (26) | | ELF import set point |
| (27) | | FIX set point |
| (28) | | Boost pump shut-off delay time |
| (29) | | Cogenerator heating loop flow rate |
| (30) | | Cogenerator cooling loop flow rate |
| (31-33) | | P, I, and D gain constants for PID loop 1 |
| (34-36) | | P, I, and D gain constants for PID loop 2 |
| (37-39) | | P, I, and D gain constants for PID loop 3 |
| (40-42) | | P, I, and D gain constants for PID loop 4 |
| (43-45) | | P, I, and D gain constants for PID loop 5 |
| (46) | | Minimum engine performance threshold |

TABLE I-continued
Data Structure Definitions

| Name | Type | Definition |
|---|---|---|
| (47) | | Minimum silencer performance threshold |
| (48-50) | | P, I, and D gain constants for PID loop 6 |

TABLE I-A
Data Structure Definitions (Concluded)

| Number | Description |
|---|---|
| ITL | |
| (1) | Auxiliary heating type |
| (2) | Auxiliary cooling type |
| (3) | Absorption air conditioner present? |
| (4,5,6) | Report type, destination number and interval |
| (7,8,9) | Report type, destination number and interval |
| (10,11,12) | Report type, destination number and interval |
| (13,14,15) | Report type, destination number and interval |
| (16,17,18) | Report type, destination number and interval |
| (19,20,21) | Report type, destination number and interval |
| (22,23,24) | Report type, destination number and interval |
| (25,26,27) | Report type, destination number and interval |
| (28,29,30) | Report type, destination number and interval |
| (31,32,33) | Report type, destination number and interval |
| (34,35,36) | Report type, destination number and interval |
| (37-39) | Report type, destination number and interval |
| (40-42) | Report type, destination number and interval |
| (41-43) | Report type, destination number and interval |
| (44-46) | Report type, destination number and interval |
| (47) | Password code number |
| (48) | Heating/cooling priority flag |
| (49-50) | Not used |

TABLE II
Analog Sensors

| Number | Description |
|---|---|
| SENS(1) | Engine jacket inlet temperature |
| 2 | Dump jacket inlet temperature |
| 3 | Heat load return temperature |
| 4 | Water temperature at silencer outlet, mixed |
| 5 | Water temperature at silencer outlet |
| 6 | Auxiliary boiler outlet temperature |
| 7 | Chilled water at cogenerator air conditioner in |
| 8 | Chilled water at cogenerator air conditioner out |
| 9 | Auxiliary boiler inlet temperature |
| 10 | Chilled water at auxiliary air conditioner out |
| 11 | Heat loop vale outlet temperature |
| 12 | Exhaust gas to silencer temperature |
| 13 | Exhaust gas out of silencer |
| 14 | Engine jacket outlet |
| 15 | Cogenerator air conditioner hot side outlet |
| 16 | Enclosure ambient temperature |
| 17 | Generator output |
| 18 | Grid import (+)/export (−) |
| 19 | Engine fuel flow |
| 20-24 | Not used |

TABLE III
Discrete Sensors

| Number | Description |
|---|---|
| SENS(25) | Low oil pressure |
| 26 | High jacket pressure |
| 27 | No fluid flow in engine jacket |
| 28 | Engine overtemperature |
| 29 | Starter overcrank |
| 30 | Switchgear trip |
| 31 | Cogenerator air conditioner fail |
| 32 | No exhaust heat exchanger water flow |
| 33 | Call for cooling |
| 34 | Call for heating |
| 35-40 | Not used |
| 41 | Modem T-switch position |
| 42-48 | Not used |

Controller System Inputs

Figure 4:
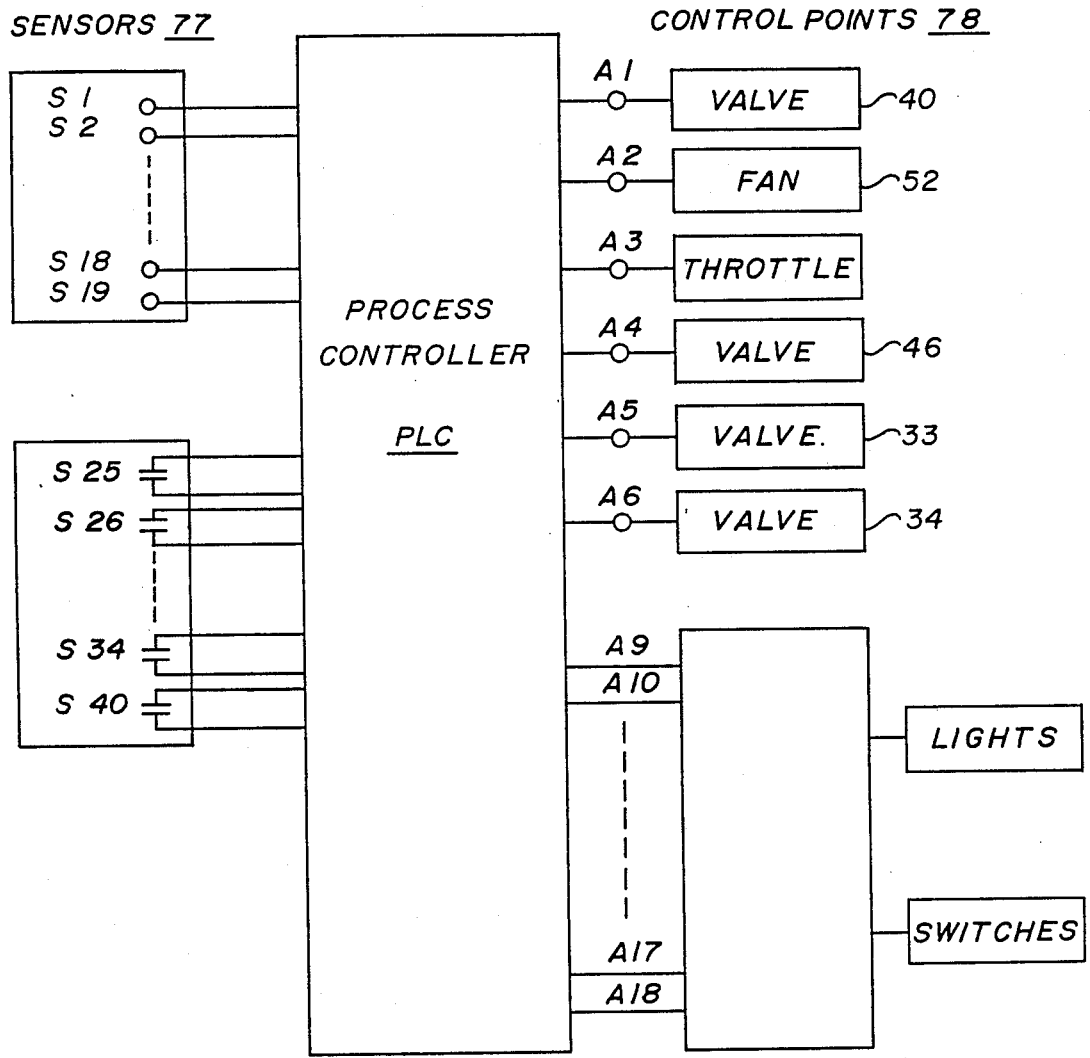
FIG. 4 illustrates the inputs and outputs to the control sub-system illustrated in FIG. 3.

Referring to FIGS. 1 and 4, sensors 77 comprise sensors S1–S19 which provide analog signals to the process controller PLC and sensors S25–S34 and S40 which provide discrete inputs in the form of contact closures to the process controller PLC. The sensor signals SENS(1) to SENS(40) are summarized in Tables II and III.

Sensors S1–S19 provide analog signals representative of temperatures, fuel flow, electrical signal levels, etc. of the cogeneration system 10. Sensor S1 is located at the engine inlet and measures the engine cooling jacket inlet temperature. Sensor S2 is located at the inlet of the dump heat exchanger 51 and measures the dump inlet temperature. Sensor S3 is located at the inlet of the heat loop pump 48 and measures the mixed heat load return temperature. Sensor S4 is located at the inlet of the absorption air conditioner 18 and measures the fluid temperature at the silencer output including heat contributions of the exhaust gas and the engine cooling jacket. Sensor S5 measures the fluid temperature at the silencer output provided at the output, at pipe 32b, of the exhaust heat exchanger 16.

Sensor S6 is located at the outlet of the auxiliary boiler and measures and auxiliary boiler outlet temperature. Sensor S7 is located at the inlet of the cool loop pump 22 and measures the cool load return chilled fluid temperature. Sensor S8 is located at the outlet of the absorption air conditioner and measures chilled fluid temperature at the cogenerator air conditioner outlet. Sensor S9 is located at the inlet of the auxiliary heating unit 20 and measures the auxiliary boiler inlet temperature. Sensor S10 is located at the output of the auxiliary air conditioner and measures the chilled fluid temperature at the outlet of the auxiliary air conditioner. Sensor S11 is located at the outlet of heat valve 46 and measures the mixed water temperature out of the valve and delivered to the auxiliary boiler 20.

Sensor S12 is located at the exhaust outlet of the engine duct 39 and measures the exhaust gas temperature applied to the inlet of the exhaust bypass valve 40. Sensor S13 is located at the outlet of the exhaust heat exchanger 16 and measures exhaust gas out of the heat exchanger. Sensor S14 is located at the outlet of the engine cooling jacket and measures the engine jacket outlet flow.

Sensor S15 is located at the outlet side of the cogenerator air conditioner and measures the mixed flow of the return loop of the heat exchanger 16. Sensor S16 measures the ambient temperature of the cogeneration package enclosure. Sensor S17 is connected at the generator output 12 and measures electricity generated by the cogenerator. Sensor S18 is connected at the output of the switch gear 13 and measures the grid import/export, that is the amount of electricity being drawn from the power grid or returned to the power grid. Sensor S19 measures the amount of the gas fuel supplied to the engine 11.

Sensors S25–S34 and S40 provide discrete outputs, such as in the form of contact closures for indicating various conditions of the cogeneration system 10. Sensors S25–S29 are associated with the engine and provide an output indicative of low oil pressure, high jacket pressure, no fluid flow in engine jacket, engine overtemperature and starter overcrank, respectively. Sensor S30 is associated with the switch gear 13 and provides an indication of switch gear trip. Sensor S31 is associated with the cogenerator air conditioner 18 and provides an output indicative of a failure of the unit. Sensor S32 provides an output indicative of loss of exhaust heat exchanger water flow to the heat exchanger 16. Sensors S33 and S34 provide indications of call for cooling and call for heating, respectively.

Controller System Outputs

The process controller under program control responds to the sensor inputs and to stored information in the form of set points, constants, limits, etc. provided to the controller PLC by the industrial computer COP to provide analog control outputs ACT (1-6) for controlling six control points A1-A6 of the system, and provides eleven discrete outputs (ACT 9-19), in the form of contact closures, providing switch closures at points A9-A19 to activate pumps, valves, etc. and operating indicating lights of the system 10. The sub-system has six interactive PI loops, including the engine throttle control, illustrated in FIGS. 5-11 and described hereinafter. In the exemplary embodiment, output ACT(1) controls the exhaust bypass valve 40. Output ACT (2) controls the fan 52. Output ACT (3) controls the throttle of the engine 11. Output ACT (4) controls the heat loop valve 46. Output ACT (5) controls the absorption air conditioner valve 33. Output ACT (6) controls the dump valve 34.

Regarding the discrete control outputs ACT (9)-ACT (19), output ACT (9) enables the jacket pump 31. Output ACT (10) enables the silencer boost pump 36. Output ACT (11) controls an indicator lamp for indicating when the cogenerator is operating properly. Outputs ACT (12) and ACT (13) control indicator lamps indicating warning and alarm conditions for the cogenerator. Output ACT (14) enables the fan 52. Output ACT (16) enables the air conditioner 18. Output ACT (17) enables the heat loop pump 48 and output ACT (18) enables the switch for the cool loop pump 22. Output ACT (19) enables the cogenerator system by activating the engine 11. The analog control outputs ACT (1)-ACT (6) and discrete control outputs ACT (9)-ACT (20) are summarized in Tables IV and V, respectively.

TABLE IV

| Analog Control Points | |
|---|---|
| Number | Description |
| ACT(1) | Silencer bypass valve |
| 2 | Dump jacket fan |
| 3 | Engine throttle |
| 4 | Heat loop valve |
| 5 | Absorption air conditioner valve |
| ACT(6) | Dump jacket bypass valve |

TABLE V

| Discrete Control Outputs | |
|---|---|
| Number | Description |
| ACT(9) | Jacket pump |
| 10 | Silencer boost pump |
| 11 | Cogenerator okay |
| 12 | Cogenerator warning |
| 13 | Cogenerator alarm |
| 14 | Dump jacket fan switch |
| 15 | Cooling tower enable |
| 16 | Cogenerator air conditioner enable switch |
| 17 | Heat loop pump switch |
| 18 | Cool loop pump switch |
| 19 | Not used |

TABLE V-continued

| Discrete Control Outputs | |
|---|---|
| Number | Description |
| ACT(20) | Cogenerator enable |

Software

The process controller PLC and the industrial computer COP operate under program control to provide the monitoring and control functions for the cogenerator system 10. Separate software is provided for each of the two signal processors, process controller PLC and the industrial computer COP.

The software is divided into three major functional blocks: control, monitoring and tailoring. Structure charts for the control, monitoring and tailoring software are given in FIGS. 12, 13 and 14, respectively. The functions of the routines for the software are set forth in terms of their inputs, the operation or process performed and the resultant outputs in the hierarchial input, process, output diagrams (HIPO) provided in Appendix I. The source code for the COP computer is provided in Appendix II.

The controlling software acquires data, checks for alarm conditions, executes control algorithms, computes and tabulates operating information, and supervises control of the cogenerator.

The monitoring software provides a menu-driven operator interface. Through this interface, the operator can request the generation of reports on the status and operation of the controller and the cogenerator. In addition, a subset of the tailoring functions is available.

The tailoring software provides a menu-driven operator interface through which the cogenerator system's operating characteristics and controller software specifics can be defined.

Computer COP Functions

The industrial computer COP transmits to (and receives from) the process controller PLC data, setpoints, etc. updating the information as necessary. The computer COP also generates reports, handles transmission to remote terminals, etc.

The sub-system CCS-C performs diagnostic functions including trend degradation detection, such as engine degradation as function of throttle and electric power generated, and silencer heat exchanger degradation as a function of exhaust gas and water temperatures in and out of the silencer. The sub-system also provides preventive maintenance notices, when hours are logged to reach a setting; warnings, when monitored sensors reach a set point; and generates alarms and shutdowns, when a subset of the monitored sensors reach a set point, when the engine's integral shutdown is implemented, or when the CCS-C sub-system fails. The sub-system CCS-C provides status (raw data and sensor/actuator readings), diagnostic status, calculations (processed data), and reports (archived calculations).

The sub-system CCS-C provides a tailoring package for its configuration to variance in the cogeneration package 10 and, to a limited extent, the site/system application. This package is menu-driven and enables the tailoring of the following categories of items: Operation schedules, energy rates, HVAC performance, cogeneration package performance, control set points/constants, diagnostic limits, and report destinations.

Computer COP

Figure 12:
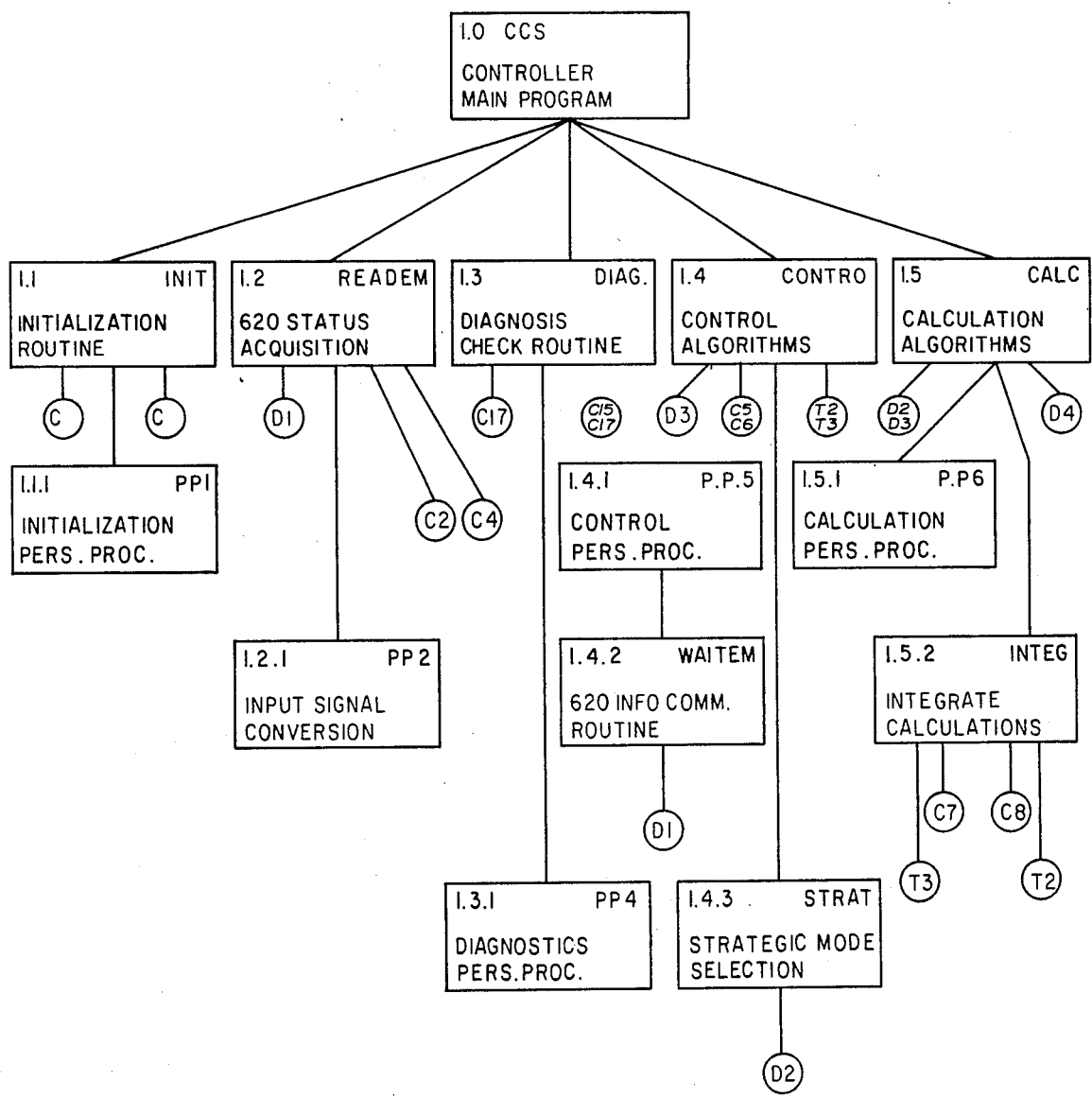
FIG. 12 is a structure chart illustrating control routines of the control sub-system.

Referring to FIG. 12, there is shown a structure chart for the controller portion of the software, represented by blocks 1.1 to 1.5, the numbers corresponding to the HIPO numbers for the routine included in the HIPO charts (Appendix I). In addition, various utility routines including control routines, C1–CN, timer routines D1–D4, monitor routines M1–M6, tailoring routines L1–L4, and timing routines T1–T3 invoked by the control, monitoring and tailoring routines (FIGS. 12–14), are also described by HIPO charts in Appendix I.

The main routine of the controller software for the main computer COP is called CCS, block 1.0. Routine CCS first initiates a call to a routine INIT, block 1.1, to initialize the software's start-up environment. After that, routine CCS loops on a set of four subordinate routines blocks 1.2–1.5 that supervise the major controller functions, status acquisition, diagnostics, control algorithms and calculation algorithms respectively.

The core controller acquires and stores twenty-four analog inputs and sixteen discrete inputs from the process controller PLC. The process controller acquires and stores the setting of eight analog and sixteen digital outputs. Acquisition of stored data is accomplished by means of a CCS-invoked call to a routine called REA-DEM (block 1.2). This routine invokes a personality procedure (PP2), block 1.2.1, to convert the latest sensor readings and actuator settings which are brought in by a communications routine.

Diagnostics

To assure safe and efficient system operation, CCS invokes a routine called DIAG block 1.3, which is designed to protect the cogenerator engine and associated system hardware. The diagnostic status conditions monitored by the controller are of three types: warnings, alarms and notices. A subject of the controller inputs is dedicated to cogenerator system safety and, when tripped, will result in an "alarm" diagnostic condition, which causes the supervisory control algorithms to request shutdown. Other, less severe conditions, results in a "warning" diagnostic condition. The core software applies a test to check that the inputs are within normal limits. The core software checks equipment operating times against the preventive maintenance threshold limits. These limits are tailorable using the tailoring package. When exceeded, these checks results in "notice"-type diagnostics being flagged. A personality procedure called PP4, block 1.3.1, uses TABLE, block D1, to monitor the engine and silencer and checks their performance against the tailorable minimum acceptable levels. Routine PP4 defines a normal operating range for each analog input point and a normal setting for each discrete input.

Supervisory Control

Routine CCS invokes a routine CONTRO, block 1.4, to execute the algorithms dedicated to supervision of cogenerator control. Routine CONTRO, via routine STRAT, block 1.4.3, selects the mode of engine operation on a scheduled basis. The operator is responsible for setting up this schedule by using the tailoring package. The engine can be scheduled to run at full throttle, be throttled such that the rate of electrical import is constant, or be shut down. These modes of engine operation are referred to as ON, Electrical Load Following (ELF), Thermal Load Following (TLF), Fixed (FIX), Limit (LIM), and OFF, respectively. An additional mode, called ECON, can be scheduled to signal the control supervisory software to select the mode (OFF, ON, TLF, ELF or LIM) that will minimize total system operating cost.

There are three different levels of control employed: strategic, optimizing control called the "economic mode", ECON noted above; load priority determinization; and integrated control implementation. The first two levels of control are supervisory and are performed in the computer COP; the third level of control is control implementation, performed in the programmable controller PLC.

The ECON algorithm is used to select, in real time, the lowest cost operating strategy for a given cogeneration system in its currently-installed application.

Based on the performance characteristics of the cogeneration and auxiliary HVAC equipment, the building heating/cooling/electrical loads, and on the cost of fuel and electricity (on/off peak, retail/sellback, demand period), the ECON algorithm calculates the total operation cost (cogeneration gas plus auxiliary HVAC plus electricity purchased) in each of strategic control modes to meet the building loads, and selects the lowest cost mode, constrained by selection system configuration and requirements.

The selected mode determines the throttle control algorithm. The control algorithms for modes ON, OFF and IDLE are straight forward. The control algorithms for models ELF and LIM are simple proportional integral loops using the building electric load measurement to determine the throttle position. In the mode TLF, the throttle control algorithms employ auctioneering feedback control described below.

The second level of control is the thermal load priority determination. This dictates how the thermal energy available from the cogeneration as distributed between the cooling and heating loads. The cooling or the heating priority is determined by routine STRAT, block 1.4.3, based upon economic considerations and is determined as part of the mode determination equations. The load priority affects the control of the heating load valve 46 and cooling valve 23 at points A4 and A5 (FIG. 1).

The criteria for selecting heating or cooling load priority takes into account the type of auxiliary heating unit used, i.e. gas-fired, electrically energized or "none", and the type of auxiliary air conditioning unit employed, i.e. vapor compression absorption or "none", to determine the auxiliary heating or cooling fuel cost based upon the auxiliary fuel current rate CX. If the cost for operating the auxiliary cooling unit to satisfy supplementary cooling load requirements exceeds the cost for operating the auxiliary heating unit to satisfy supplemental heating load demand, then load priority is heating. Otherwise, load priority is cooling.

The load priority flag ITL(48)=1 for cooling priority and ITL(48)=2 for heating pirority is stored in memory and down loaded to the programmable controller PLC along with setpoint and sensor data.

The third level of control is implementation, which is the actuator control strategy employed to meet the cogeneration system operating and performance requirements. Implementation performed by the programmable controller PLC is disclosed hereinafter.

ECON Mode

If ECON mode is scheduled, routine CONTRO invokes a routine called STRAT once every quarter hour to compute the minimum-cost engine throttling scheme. Routine STRAT does this by computing the expected total system cost for each mode. As an example, the elements that comprise system cost are shown in Table VI for each mode in a system that is sized to be able to meet any building HVAC or electrical load.

Routine STRAT uses a routine TABLE, (D2) to predict the contribution of the engine to the HVAC load in modes ON and ELF; the engine fuel consumption in modes ON, TLF and ELF; and the amount of electricity generated in modes ON and TLF. Utility cost information is passed to STRAT from a routine called LOOKUP.

To determine minimum cost, the system heating load (QHL), cooling load (QCL) and electrical load (QEL) are computed, and stored using the previous hours running sum totals XD(12), XD(14), XD(9), respectively.

TABLE VI

| NUMBER | Tabulated Information DESCRIPTION |
|---|---|
| XD(1) | MODE = LIM hours |
| 2 | MODE = ON hours |
| 3 | MODE = Thermal Load Following hours |
| 4 | MODE = Electrical Load Following hours |
| 5 | MODE = FIX average setting |
| 6 | Engine hours |
| 7 | Silencer and dump hours |
| 8 | Cogenerator air conditioner operating hours |
| 9 | Electrical load |
| 10 | Electricity generated during demand period |
| 11 | Electricity generated during off demand period |
| 12 | Heating load |
| 13 | Cogenerator supplied thermal to heating |
| 14 | Cooling load |
| 15 | Cogenerator supplied thermal to cooling |
| 16 | Cogenerator supplied cooling |
| 17 | Thermal dumped |
| 18 | Cogenerator parasitics |
| 19 | Cogenerator fuel used |
| XD(20) | Savings | where the symbol * represents a multiplication operation.

Thermal load following mode TLF is selected as the operating mode if the sum of the following is less than the related calculation for the other modes:

Cost of TLF mode = projected cost of the gas use and cogeneration components electrical operating energy (if engine was throttled to meet the thermal load)

plus the cost of the electricity purchased (which equals the building load minus electricity generated at the projected TLF throttle setting)

minus the value of electricity sold to the grid (which equals the electricity generated minus load at the projected TLF throttle setting)

plus the cost of auxiliary fuel needed to meet the heat and cool loads (which will be zero if the cogeneration system is large enough to satisfy the entire thermal loads).

Similarly, selection of electrical load following mode is made on the basis of amount of electricity generated, projected cost for engine fuel and load requirements.

Routine STRAT uses the routine TABLE to retrieve the rated engine performance parameters: fuel consumption (QCG), electrical generation (QEGEN), thermal (heating) output (QAH), and cooling output (QAC). This data is contained in a table as a function of throttle setting. The throttle setting can be between 0 and 100 percent and the data is tabulated in 10-percent range increments. The throttle setting for the modes is implicit for modes OFF and ON. For mode TLF, the throttle setting is determined by searching the engine performance data table for a heating or cooling output that matches the current load. For mode ELF, the throttle setting is determined by searching for the electrical generation output that matches the load minus 5 kW. For mode LIM, the throttle setting is determined by searching for the electrical generation output that matches the load minus the Limit setting TL(10).

The routine STRAT also makes a check for the following exceptional conditions which may affect the choice of mode. If the HVAC system features an elec-

TABLE VII

| | System Operating Cost Components | | | | |
|---|---|---|---|---|---|
| MODE | ENGINE FUEL AND PARASITIC COST + | ELECTRICITY PURCHASED + | ELECTRICITY SOLD − | AUXILIARY HVAC AND PARASITIC COST + | TOTAL COST = |
| OFF | 0 | LOAD | 0 | LOAD | A |
| ON | MAX | 0 | GEN-LOAD | LOAD-ENG | B |
| TLF | PROJECIED TLF THROT. | LOAD-GEN | GEN-LOAD | 0 | C |
| ELF | PROJECTED ELF THROT. | 0 | 0 | LOAD-ENG | D |

Cost, as a function of mode can then be determined by correlating the thermal equivalent of auxiliary fuel QXG, the thermal equivalent of rated cogenerator fuel input QCG, the difference between electrical load requirements and the generator output QEU, all in Btu/hour the current cost of auxiliary fuel CX, the current cost of cogenerator fuel CCG, and the current electrical retail rate CU, all in $/Btu as follows:

$$COST(MODE) = QXG*CX + QCG*CCG + QEU*CU$$

tric boiler for heating or uses vapor compression for cooling (ITL(1)=2 or ITL(2)=2), then:

(1) if (CES * QEG(100))/(CCG * QCG(100)) > 1, then MODE=ON;

(2) for heating mode SENS(34)=1 and (CER * QEG(100))/(CCG * QCG(100)−QAH-(100) * CER/TL(11)) < 1, then MODE=OFF;

(3) for cooling mode SENS(33)=1 and (CER * QEG(100))/(CCG * QCG(100)−QAC(100) * CER/TL(12)) < 1, then MODE=OFF:

where:

CER=cost of buying electricity TL(1 or 2) if QEU O

CES = price for selling electricity TL(3 or 4) if QEU O
QEG = electrical generation XD(10)
CCG = cost of cogenerator fuel TL(7)
QCG = thermal cooling output of cogenerator XC(15)
QAH = thermal heating output XD(13)
TL(11) = aux bioler efficiency
QAC = cooling output XC(16)
TL(12) = vapor compression AC If none of these equations (1)-(3) are true, then the MODE is set to TLF. If mode TLF or ELF throttle setting is less than the idle setting (TL(15)), then the MODE is set to OFF. If the MODE is set to OFF, then if there is a call for heat, SENS(34) = 1, and there is no auxiliary boiler (ITL(1) = 0), then the mode is set to MODE TLF; if there is a call for cooling, SENS(33) = 1, and there is no auxiliary air conditioner (ITL(2) = 0), then MODE = TLF. It this is a demand period and if the MODE is OFF, then the MODE is set to LIM.

Finally, routine CONTRO invokes a routine WRITEM to transmit the supervisory control information to the main computer COP. The software computes and tabulates information regarding system operation by invoking a routine called CALC. This information is integrated over the current hour, day, month and year by means of a call to INTEG. The tabulations are archived for each hour of the current day, each day of the current month and each month of the current year. This archival is done as part of the monitor package by a routine called ARCH. A personality procedure (PP6) is referenced to perform those computations which are unique to a given system.

Tabulated Data

Figure 15:
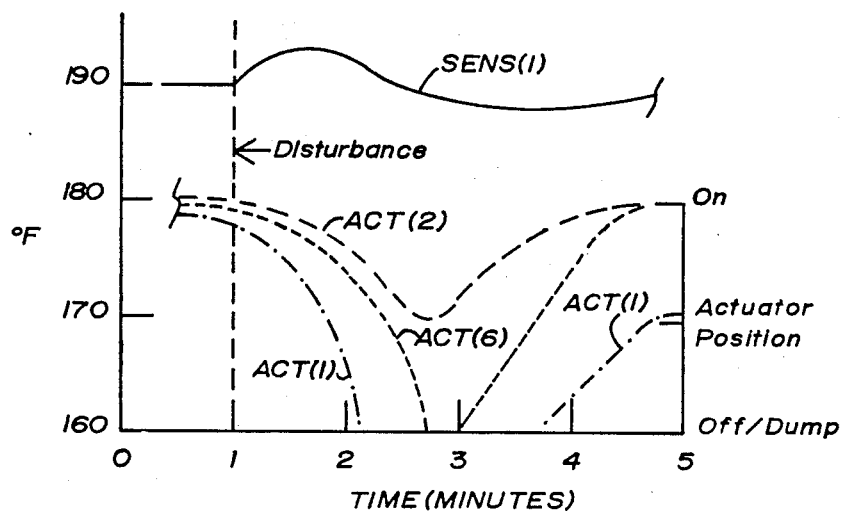
FIG. 15 is a graph illustrating integrated control provided by the control sub-system.

The software computes and tabulates information regarding system operation by invoking a routine called CALC, block 1.5 (FIG. 15). This information is integrated over the current hour, day, month and year by means of a call to INTEG, block 1.5.2. The tabulations are archieved for each hour of the current day, each day of the current month and each month of the current year. This archival is done as part of the monitor package by a routine called ARCH. A personality procedure (PP6), block 1.5.1, is referenced to perform those computations which are unique to a given system.

The following are the calculations for data XD(1) to XD(20) performed by routine CALC and integrated by routine INTEG. The tabulated data is summarized as follows:

Mode of operation:

XD(1) = 1.0 if mode is LIM,
XD(2) = 1.0 if mode is ON,
XD(3) = 1.0 if mode is TLF,
XD(4) = 1.0 if mode is ELF,
XD(5) = TL(28), if mode is FIX.

Engine, silencer and absorption air conditioner operating hours

XD(6) = ACT(20),
XD(7) = 1.0 if ACT(1) > 0.0,
XD(8) = ACT(16) * TL(18),

Electric load

XD(9) = SENS(18) + SENS(17),

Electric energy supplied by the cogenerator during demand period

XD(10) = SENS(17), if demand period.

Electric energy supplied by the cogenerator during off-demand period

XD(11) = SENS(17), if not a demand period.

Heating load

XD(12) = TL(13) * (SENS(6) = SENS(3)) * SENS(34).

Thermal energy supplied by cogenerator to heating load

XD(13) = TL(29) * (SENS(11) − SENS(3)) * SENS(34).

Cooling load

XD(14) = TL(14) * (SENS(7) − SENS(10)) * SENS(33).

Thermal energy supplied by cogenerator to cooling load

XD(15) = TL(30) * (SENS(4) − SENS(15)) * ACT(16).

Cooling energy supplied by cogenerator integral chiller

XD(16) = TL(30) * FLOAT(ITL(3)) * (SENS(7) − SENS(8) * ACT(16).

Cogenerator energy dumped

XD(17) = QAH − XD(15) − XD(13), where QAH is the available heat energy from the engine as determined by a call to TABLE.

Cogenerator electrical parasitics

XD(18) = TL(17) * XD(6) + TL(18) * ACT(2).

Cogenerator fuel used

XD(19) = SENS(19) * 1000.

The routine CALC also invokes routine TABLE to update the engine and silencer performance data. The inputs to TABLE for the engine data are the throttle setting ACT(3), fuel used XD(19), electricity generated XD(10 or 11), heat generated XD(13 and 15), and cooling generated XD(16). For the exhaust heat exchanger data, the exhaust heat exchanger performance rating UA is computed as:

$$UA = \text{mass flow } (SENS(5) - SENS(14)) ACT(5)/$$
$$[SENS(12) - SENS(5) - SENS(13) + SENS(14)]/$$
$$\ln[(SENS(12) - SENS(5))/SENS(13) - SENS(14))]$$

(the $UA$ is computed only when $ACT(1) = 1$)

The variable UA is a standard means of rating the performance of a heat exchanger. The exhaust heat exchanger performance rating HXUA then is the overall thermal conductance of the heat exchanger, calculated from:

$$Q = UA \Delta T,$$

where
Q = heat transferred, calculated using water side mass flow rate and fluid temperature into and out of the exhaust HX
U = Thermal conductance of the HX, per unit area
A = the Hx effective area ΔT = log-mean temperature difference (LMTD) calculated using the inlet and outlet temperatures of water and gas in the exhaust HX, where $$LMTD = [(\Delta T)_{max} - (\Delta T)_{min}]/ln[(\Delta T)_{max}/(\Delta T)_{min}]$$

with $(\Delta T)_{max} = T$ exhaust in $- T$ water out
$(\Delta T)_{min} = T$ exhaust out $- T$ water in.

The "mass flow" is the rate of the water flow (in units of lbm/hr) through the heat exchanger; SENS(X) refer to sensor data; ACT(5) is discrete enabling input; and ACT(1) is a control output indicative of the position of the exhaust bypass valve, with the true state corresponding to full exhaust flow through the heat exchanger.

The initial value of overall heat exchanger performance UA is calculated on line from data collected where the heat exchanger tubes are assumed clean. This initial conductance value is stored and subsequent calculated conductance values are ratioed with it, the ratio being used for trend diagnostics of exhaust heat exchanger fouling. To minimize impact of other variables, the calculations are done only under certain system operating conditions.

The routine CALC invokes a module called RATCH which tracks the peak electrical usage on a monthly basis. RATCH archives the peak electrical import during a demand period, the corresponding electrical generation rate, and the time of the peak occurrence.

Monitor Software

Figure 13:
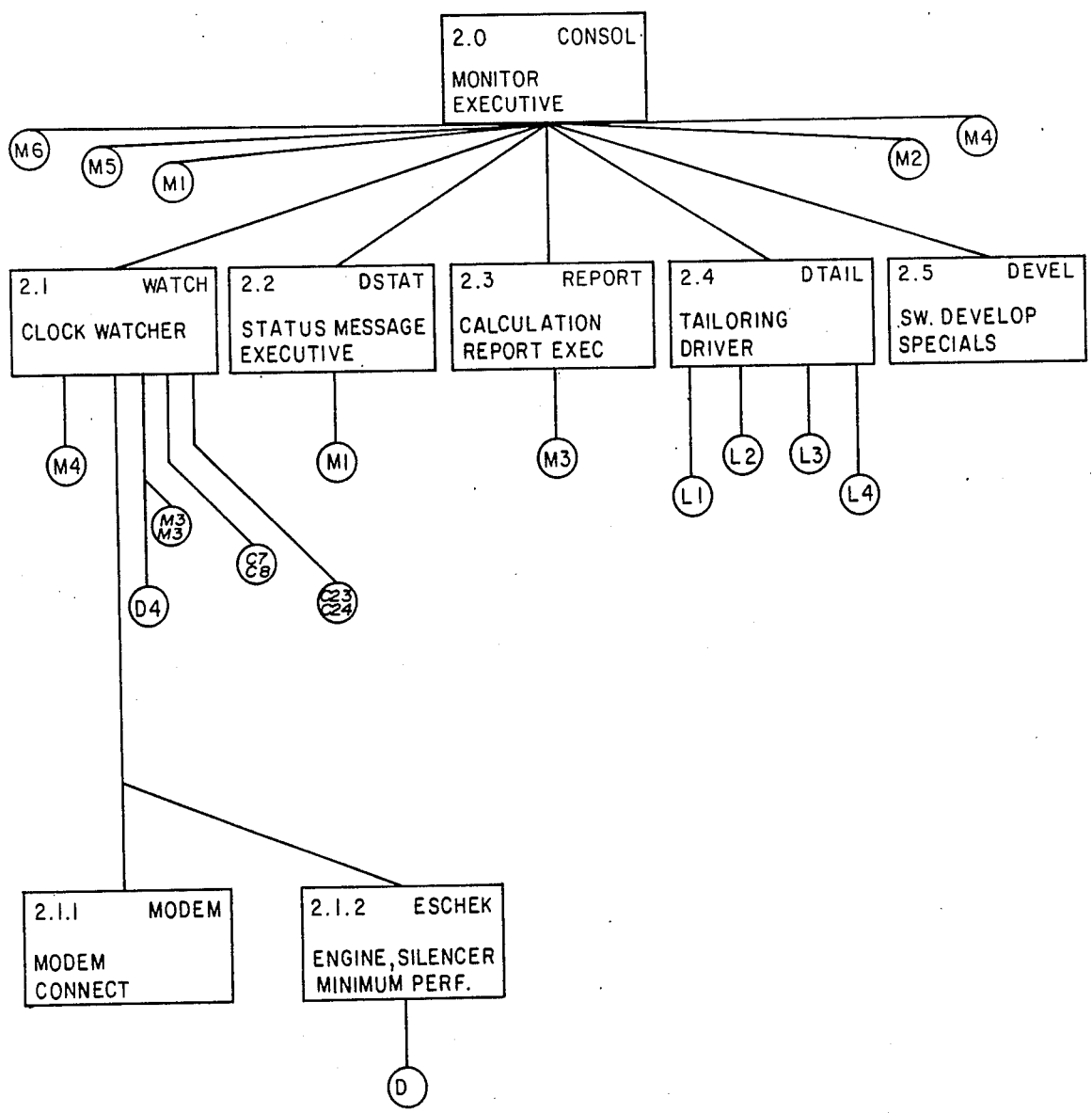
FIG. 13 is a structure chart illustrating monitor routines of the controller.

Referring to FIG. 13, there is shown a structure chart for the monitor portion of the software. The core software provides the owner and operator of the system with a means of obtaining information regarding system operation. This information includes current mode of operation, current sensor readings, current actuator settings, current diagnostic status, current peak import status, engine performance data, and tabulated information data. In addition, the monitor software is designed to allow the operator the ability to tailor selected items affecting the operation of the cogenerator system.

The routine Consol, block 2.0, is the main program of the monitor. It prints status information, the main menu and uses a battery of subordinate routines to generate various reports. These subordinate routines include WATCH, block 2.1, which initiates time critical tasks; DSTAT, block 2.2, which handles user requests to acknowledge or clear a diagnostic message; routine REPORT, block 2.3, which handles a user request to print a tabulated data report; routine DETAIL, block 2.4, which handles a user request to tailor the system; and routine DEVEL, block 2.5, which handles user requests to execute software development/checkout/startup package special requests. The main routines 2.0-2.5, subordinate routines and utility routines (M1-M4, D4, etc.) are described in HIPO charts included Appendix I.

The core software allows the operator to review this information at his discretion. The software also provides a means of scheduling the generation of any report at an interval of his choosing. Also associated with each regularly scheduled report is a report destination telephone number. A report can be regularly directed to one or more destinations. There are eight types of reports available.

Tailor Software

Figure 14:
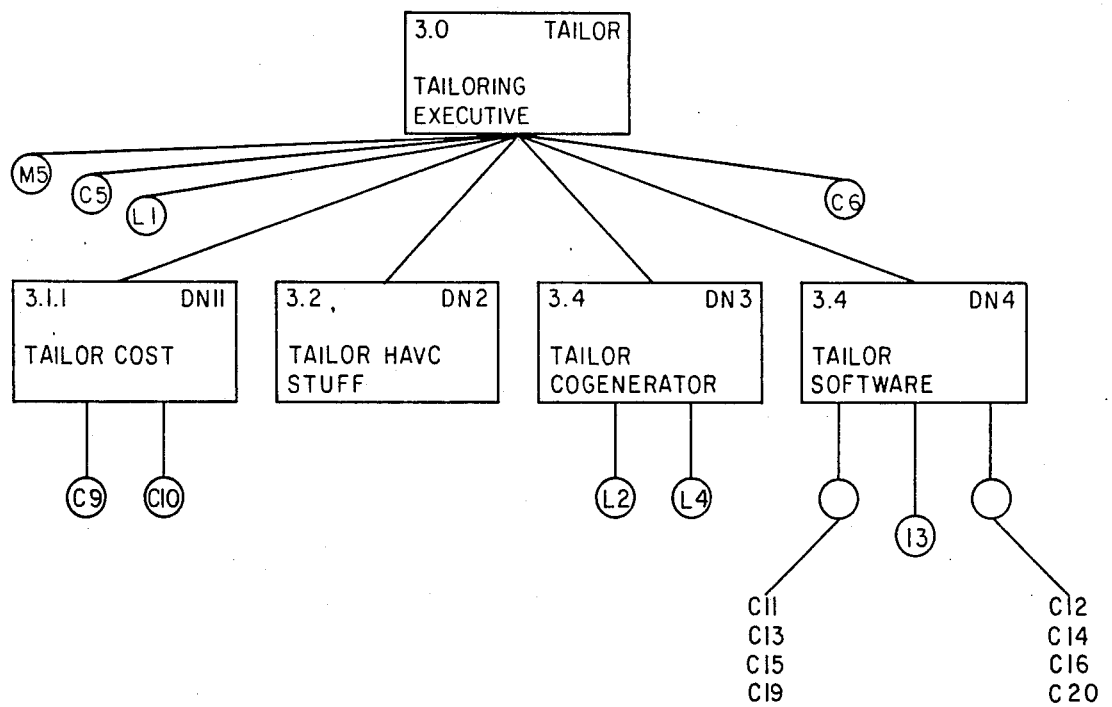
FIG. 14 is a structure chart illustrating tailoring routines of the control system.

Referring to FIG. 14, there is shown a structure chart for the tailoring portion of the software. The core software allows the operator to enter cogenerator systems cite-specific-parameters. Each of the routines of the tailor software consists of a code that causes printout of menus and user prompts to obtain responses. The user responses update the data structures via routine SCHEDO for operating schedules, routine SCHEDP for on-peak/off-peak schedules, and the vectors TL and ITL which contain miscellaneous tailoring information.

Referring to FIG. 14, routine DM11, block 3.1, handles tailoring of costs; routine DM2, block 3.2, handles tailoring of HVAC parameters; routine DM3, block 3.3, handles tailoring of cogenerator parameters; and routine DM4, block 3.4 handles tailoring of software parameters. The tailor subroutines shown in blocks 3.0-3.4, and related utility routines are described in HIPO charts provided in Appendix I.

Programmable Controller PLC Functions

Local control implementation is essentially independent of strategic control, although some set points and the split of energy to simultaneous heating and cooling loads may be affected. Local control of the cogenerator is implemented entirely as a personality module in the programmable controller PLC. The programmable controller PLC under program control acquires data via sensors 77 and converts the data to a form which is acceptable to the industrial computer COP. The PLC performs limit checks, executes routines (independent of but under the supervision of the computer COP) on a continuing basis, performing all the calculations (proportional plus integral, PI, with reset), and implements the command signals for control of the cogeneration system 10.

The programmable control PLC performs control implementation, the third level of control previously described in the computer COP paragraph. The system has six interactive PI loops, including the engine throttle. Only four setpoints are used, engine inlet temperature SP1, cooling valve inlet temperature SP8, heating valve inlet temperature SP11 and ambient temperature S16. Control loop setpoints are based on a single reference setpoint, such as engine inlet temperature, with a predetermined offset "DELTA" from the reference.

Integrated control implementation is used to meet the cogeneration systems requirements, with the engine coolant temperature SENS(1) being of highest priority. Representative setpoint values are 190° F. for SP1, 140° F. for load supply SENS(11), 44° F. for chilled water SENS(8) and 120° F. for enclosure ambient temperature SENS(16). These setpoints are used in minimizing thermal energy dumped (via exhaust bypass valve 40 and dump valve 51), minimizing fan usage and satisfying the priority load first. To satisfy those requirements, auctioneering feedback control is employed for engine throttle control in mode TLF, and controlling the dump fan, the heating valve, and the cooling valve.

In the auctioneering control scheme, the controller has several measurement inputs and one manipulated output, providing for pseudo multi-variable PI control of two separate loops. The output command is computed using the lowest (or in some cases highest) value from among the two setpoint errors. The transfer of control from one loop temperature measurement to the other is inherently bumpless as the two errors are identical at crossover points. This approach is generic and independent of the system design or configuration.

Analog Control Algorithms

Figure 5:
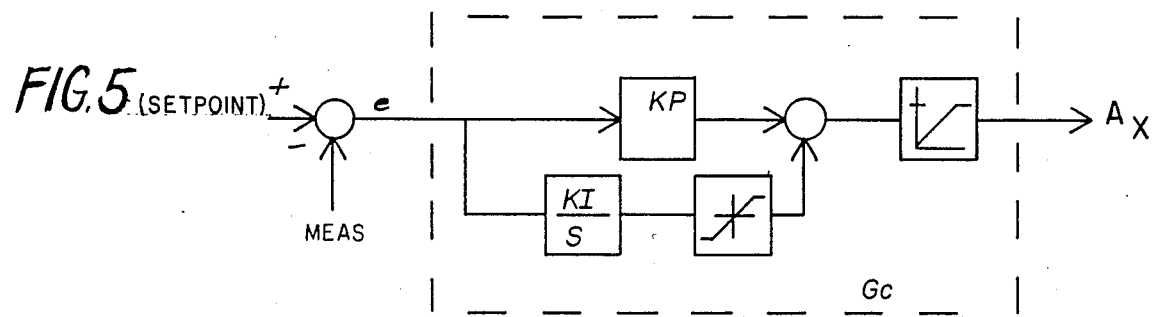

Referring to FIGS. 5-11, a common PI control algorithm, illustrated in FIG. 5 is used for all actuators and represented as:

Command signal $AX = Kpe + Kie + Ao$ where: Kp and Ki are the proportional and integral constants, respectively, and e is the error.

The six analog control loops illustrated in FIGS. 6-11 are implemented by the programmable controller PLC. The resulting signal is sent to the actuators via analog control signals ACT(1)-(6). The same PI control algorithm with reset is implemented for all six actuators, although the setpoints and constants, downloaded from the main computer COP, differ. The error used in the PI algorithm for each actuator is calculated using the process variables, setpoints, and auctioneering feedback equation (if implemented) for that actuator. Supervisory instructions from the main computer COP modify or constrain the setpoints or auctioneering feedback implementation.

Further discussion of each actuator follows, specifically the error determination, setpoints, and atrategic constraints imposed by the computer COP. Variables are:

e(Ax)=error used in PI control algorithm for output AX
SPX=setpoint related to loop with sensor SX
Delta X=offset from setpoint
SX=sensor used as process variable
Temp=temporary variable The offset delta from the setpoint is also used to establish prioritization of thermal energy for heating or cooling modes. Load prioritization is the delivery of thermal energy to the heating or cooling load with the most costly auxiliary system to minimize cost. The remainder of the thermal energy being supplied to the secondary load. The offset is used in the auctioneering feedback loops to provide a reference which is lower (or in some cases higher) depending upon whether heating or cooling has priority. For example, for the heating valve setpoint control loop and the effective setpoint is lower for heating priority so that for a given change in sensed temperature the heating valve will be actuated before the cooling valve even though the heating valve loop and the cooling valve loop on both referenced to the engine inlet temperature SP, SP1.

Figure 6:
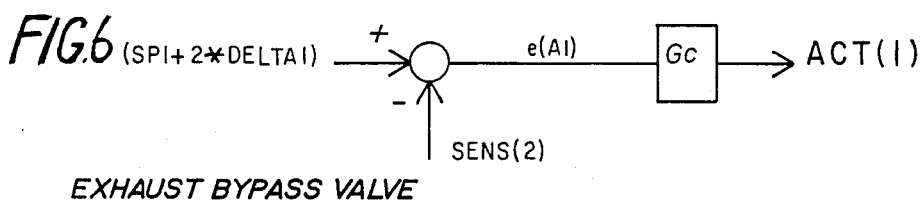

Referring to FIG. 6, the exhaust bypass valve 40 is controlled by analog signal ACT(1) to maintain the dump inlet temperature SENS(2) below a setpoint value SP1. An offset value delta 1 is added to the setpoint SP1 in accordance with the load prioritization feature required for generating outputs ACT(3)-ACT(5), for example. The error signal e(A1) which is applied to the general PI loop Gc is given by:

Exhaust bypass valve loop $e(A1) = (SP1 + 2*Delta\ 1) - SENS(2)$

Figure 7:
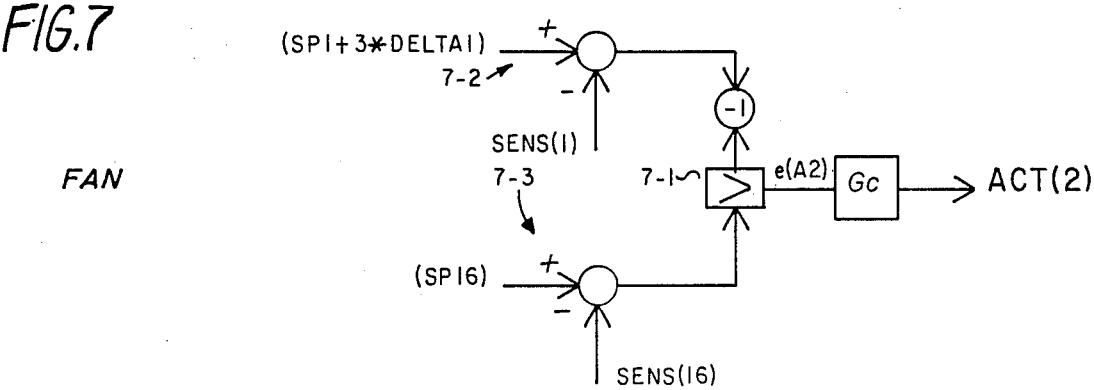

Referring to FIG. 7, the fan 52 is controlled by analog signal ACT(2) to maintain the ambient temperature SENS(16) and the engine jacket inlet temperature SENS(1) below setpoint values SP16 and SP1, respectively.

Fan Loop e(A2)=largest of (Temp 2A, Temp 2B), where:
Temp 2A = $-[(SP1 + 3*Delta\ 1) - SENS(1)]$
Temp 2B = $(SP16 - SENS(16))$ The values Temp 2A, 2B are signed data, not absolute value data.

This control loop employs auctioneering feedback control to determine at block 7-1 the error signal e(A2), which is the largest of the two signals generated in the upper loop 7-2 and the lower loop 7-3. The output of the upper loop is inverted at 7-4 to reverse the sense of the upper loop 7-2 relative to the lower loop 7-3 to yield control of the dump fan to the engine inlet loop 7-2 for increases in the temperature valve SENS(1).

Figure 8:
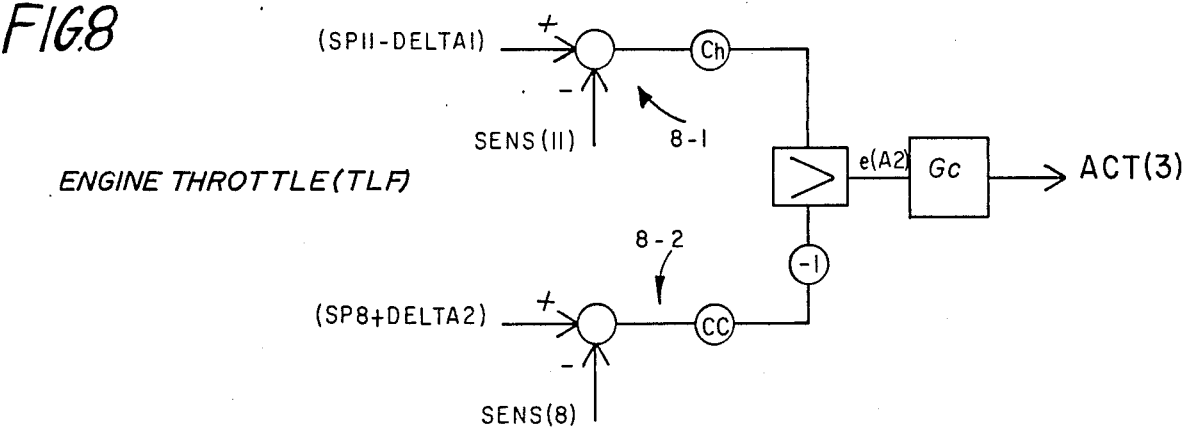
Figure 8A:
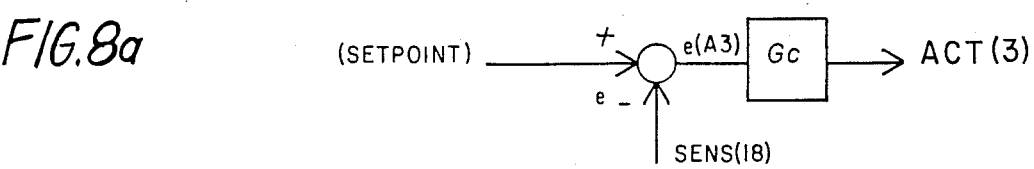

Referring to FIGS. 8 and 8a, the throttle control signal ACT(3) controls the throttle setting to maintain the cogenerator air conditioner chilled water temperature SENS(8) at a setpoint and the heat valve outlet temperature SENS(11) at a setpoint, for thermal load following mode TLF, to maintain at a kw import setpoint ELF SP, for electrical load following mode ELF, and at a second kw import setpoint LIM SP for limit mode LIM.

Engine Throttle Loop e(A3): For A3, PI control is used for TLF, ELF, and LIM. For other modes, a constant relative to 0-100% operation is supplied to the actuator.

Mode TLF e(A3)=Largest of (Temp3A, Temp3B), both signed data, where:
Temp3A = $(SP11 - Delta\ 1) - SENS(11)$, if call for heat
Temp3B = $-[(S8set + Delta\ 2) - SENS(8)]$, if call for cool

Mode ELF $e(A3) = (ELF\ SP) - SENS(18)$

Mode LIM $e(A3) = (LIM\ SP) - SENS(18)$

The upper loop 8-1 is enabled at Ch by the call for heating signal SENS(34). The lower loop 8-2 is enabled at Cc by the call for cooling signal SENS(33). The sense of loop 8-2 output being inverted to permit an increase in the temperature of the chilled water SENS(8) provide a corresponding increase in the throttle setting ACT(3). Auctioneering feedback control is used to determine at bloc 8-3 the largest of the two signals in loops 8-1, 8-2 for application to control loop Gc.

For the electrical load following mode ELF or limit mode LIM, the setpoints ELF SP or LIM SP are downloaded from the main computer COP and compared with the grid import/export value SENS(18).

Referring to FIGS. 9 and 9a, the heat loop valve 46 is controlled by analog signal ACT(4) to maintain the dump inlet temperature SENS(2) at a set point, which differs whether in heating or cooling priority by the introduction of offset delta 1, and the heat loop valve outlet temperature SENS(11) below the set point.

Heat Valve Loop $e(A4)$ = Smallest of (Temp4A, Temp4B) in heat priority, or = Smallest of (Temp4A, Temp4C) in cool priority, all signed data, where:

Temp4A = (SP11) − SENS(11), and call for heat
Temp4B = −[(SP1) − Delta 1) − SENS(2)] and call for heat
Temp4C = −[(SP1) − SENS(2)] and call for heat In FIGS. 9 and 9B, the sense of the output signal of the lower loops 9-1, 9-2 are inverted. Auctioneering feedback control is used to determine the smallest of the signals in the loops 9-1, 9-3 (FIG. 9), or loop 9-2, 9-4 (FIG. 9a). Heating or cooling priority is indicated by the status of the load priority flag ITL(48), the main computer COP downloading a suitable signal to the programmable logic controller PLC to enable the appropriate control loop (FIG. 9 or FIG. 9a). The heat load valve control loops (FIG. 9 or FIG. 9a) are enabled at Ch by the call for heating signal SENS(34). The use of a negative offset−delta 1 in loop 9-2 (FIG. 9a) gives priority to the engine inlet temperature SENS(1) for start-up conditions.

Referring to FIGS. 10 and 10a, the absorption air conditioner valve 33 is controlled by analog signal ACT(5) to maintain the dump inlet temperature SENS(2) at a setpoint, which differs whether in heating or cooling priority due to the introduction of offset delta 1, and the cogenerator air conditioner outlet temperature SENS(8) above the set point.

Cool Valve Loop $e(A5)$ = smallest of (Temp5A, Temp5B) in heat priority, or = smallest of (Temp5A, Temp5C) in cool priority, all signed data, where:

Temp5A = −[(SP8) − SENS(8)] and call for cool
Temp5B = −[(SP1) − SENS(2)] and call for cool
Temp5C = −[(SP1 + Delta 1) − SENS(2)] and call for cool In FIGS. 10 and 10a, the sense of the output signals in both loops 10-1, 10-3, in FIGS. 10 and 10-2, 10-4 in FIG. 10a, is inverted for the cooling mode control relative to the heating mode control which employs similar control loops for the engine coolant inlet temperature control. The offset delta 1 is added to the setpoint value SP1 in loop 10-1 to give priority to the engine inlet temperature control loop 10-1 over loop 10-3. Load priority is downloaded by the main computer COP and cooling mode enable at Cc is provided by request for cooling signal SENS(33).

Referring to FIG. 11, the dump valve 34 is controlled by analog signal ACT(6) to maintain the engine jacket inlet temperature SENS(1) below a set point.

Dump Valve Loop $e(A6) = -[(SP1 + Delta\ 1) - SENS(1)]$

The sense of the error signal e(A6) is inverted to enable the dump valve to be operated to its dump state in response to an increase in engine inlet temperature SENS(1).

Referring to FIG. 15, there is illustrated an example of integrated control which depicts actuator response in maintaining the engine inlet temperature (SENS(1)). The engine inlet temperature SENS(1) is represented by the solid line in FIG. 15. A disturbance (dramatic heat load reduction) is assumed to be created at time t = 1 minute, causing a significant increase in the engine inlet temperature from its desired setpoint value 190° F. As shown, the control outputs ACT(1), ACT(2) and ACT(6) for the bypass valve, dump fan, and dump jacket bypass valve, respectively exhibit substantial decreases starting slightly after the occurrence of the disturbence, to reduce the temperature at the engine inlet SENS(1) back to its setpoint value of 190° F., by directing heat away from the engine inlet. As the engine inlet temperature decreases, corresponding changes are provided in signals ACT(1), ACT(2) and ACT(6) to restore substantially to the conditions prior to the occurrence of the disturbance.

Figure 16:
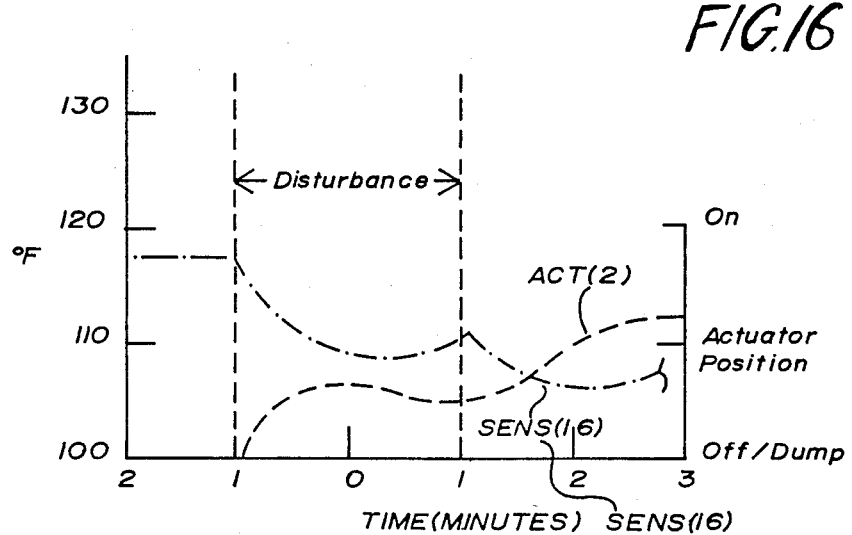
FIG. 16 is a graph illustrating auctioneering feedback control provided by the control sub-system; and, FIG. 17 is a graph illustrating load following control provided by the control sub-system.

Referring now to FIG. 16, there is illustrated an example of auctioneering feedback control as the dump valve fan 52 (FIG. 1) maintains the enclosure ambient temperature SENS(16) and another system temperature. A reduction in the ambient setpoint temperature for the enclosure is created at time t − 1 minute, resulting in a decrease in the sensed ambient temperature SENS(16) and an increase in the signal ACT(2) which controls the setting of the dump fan 52. Dramatic heat load reduction causes a further disturbance at time t = 1 minute resulting in further decrease in the ambient temperature SENS(16). The process controller PLC responds to this further increase to increase the value of signal ACT(2) to compensate for the decrease in ambient temperature from its setpoint value.

Figure 17:
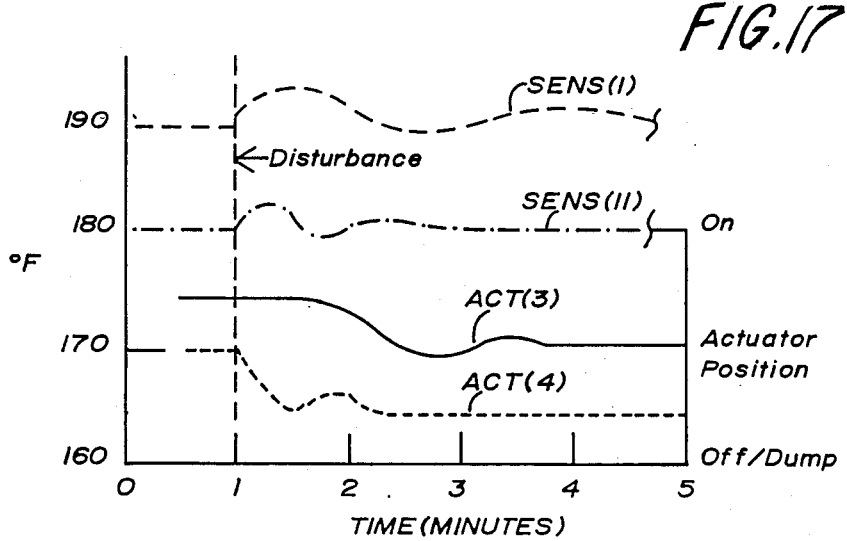

Referring now to FIG. 17, there is illustrated advanced thermal load following control. FIG. 17 illustrates engine throttling control to maintain the dump systems from wasting heat while the system is operating in mode TLF. The engine throttle (output ACT(3)) is represented by the solid line in FIG. 17. The temperature at the engine cooling jacket (SENS(1)) is represented by the dashed line. The heat valve outlet temperature (SENS(11)) is represented by the dot dashed line. The heating valve control signal ACT(4) represented by the dotted line in FIG. 17. A disturbance, caused by a dramatic heat load reduction, was created at time t = 1 minute. This disturbance caused an increase in the engine cooling jacket temperature SENS(1) and the heat valve outlet temperature SENS(11). The throttle command ACT(3) as well as the heating valve command ACT(4) were reduced to compensate for these temperature increases. Controlling the throttling of the engine, reducing the engine speed to reduce heat generation insures that the cogeneration system will run at desired temperature, minimizing dumping of thermal energy while maintaining temperatures, such as the temperature at the engine cooling jacket inlet and the temperature at the heat valve outlet at desired setpoint values.

Referring to the control loop equations for generating outputs ACT(1), ACT(2) and ACT(6), for controlling the silencer bypass valve 40, the dump fan 52 and the dump bypass valve 34 respectively, all of which employ (in at least loop) a common setpoint SP1, different values of offset are used, delta for obtaining output ACT(6), 2 delta for obtaining output ACT(1) and 3 delta for obtaining output ACT(2). The loops for outputs ACT(2) and ACT(6) are inverted so that the net result is that the loop for output ACT(1) has the fastest response, the loop for output ACT(2) has the slowest response, and the loop for output ACT(6) has a response therebetween as shown in FIG. 15. Thus, the use of multiples of the offset delta affords prioritization in the "heat dumping" requirement resulting from a disturbance which results in an increase in the engine coolant temperature SENS(1). With reference to FIG. 15, note that if operation of bypass valve 41 (output ACT(1)) and bypass valve dump bypass valve 34 (output ACT(6)) were sufficient to correct for the disturbance is less than a minute, no change would have been made in the status of the fan 52 (output ACT(2)).

By way of illustration of the auctioneering feedback control, with reference to the heat loop control (FIGS. 9, 9a) for generating output ACT(4), the setpoint value for the engine inlet temperature SP(1) is 190° F. and for the heat loop valve outlet temperature setpoint SP(11) is 140° F., and assuming offset delta=10° F., then for an initial sensed temperature of 100° F. for SENS(11) and SENS(2), the upper and lower loops, for heating priority are as follows:

(upper) $SP11 - SENS(11) = 140°\ F. - 100°\ F. = 40°\ F.$ (lower) $-(SP1 - \text{delta } 1 - SENS(2)) = (190°\ F. - 10°\ F. - 100°\ F.) = -80°\ F.$ Thus, initially, the upper leg is the largest value and has control.

When the sensed values SENS(11) and SENS(2) reach 135° F. and 185° F., then:

(upper) $SP11 - SENS(11) = 140°\ F. - 135°\ F. = 5°\ F.$ (lower) $-(SP1 - \text{delta} - SENS(2)) = 1[190°\ F. - 10°\ F. - 185°\ F.] = 5°\ F.$ and a bumpless shift occurs from control by the upper loop to control by the lower loop.

Discrete Control

The controller PLC also executes discrete control loops ACT(9) to ACT(13) and ACT(16) to ACT(19). The jacket pump 31 ACT(9), the exhaust heat exchanger boost pump 36 ACT(10), the cogenerator okay status lamp (not shown), the cogenerator warning status lamp (not shown), the cogenerator warning status lamp (not shown), the cogenerator enable relay (not shown), the cooling loop boost pump 22 ACT(18), the heating loop boost pump 48, ACT(17), and the absorption air conditioner enable relay (not shown).

Module DSCRET contains the following control loops:

Jacket pump:

ACT(9)=(1, if TL(28)<>0 and ACT (20)=1; 0, otherwise)

Exhaust heat exchanger boost pump:

ACT(10)=(1, if ACT(9)=1; 0, otherwise)

Cogenerator okay status lamp:

ACT(11)=(1, if no ALARMS or WARNINGs; 0, otherwise)

Cogenerator warning status lamp:

ACT(12)=(1, if a WARNING exists; 0, otherwise)

Cogenerator warning status lamp:

ACT(13)=(1, if an ALARM exists; 0, otherwise)

Cogenerator enable relay:

ACT(19)=(0, if MODE=OFF or any ALARM conditions exist (any of SENS(25, 28–30)=1); 1, otherwise)

Cooling loop boost pump:

ACT(18)=(see absorption air conditioner enable, ACT(16))

Heating loop boost pump:

ACT(17)=(1, if ACT(4)>0, or TL(28) not timed out; 0, otherwise)

Absorption air conditioner enable relay:

ACT(16)=(1, if ITL93)=1 and SENS(33)=and ACT(20)=1 and ACT(17)=1 and SENS(31)<>1 and SENS(4)>(TL(23) with a 10 F.° deadband) and TL(20) has not timed out; 0, otherwise)

Operating Routines

The control routines performed by the programmable controller PLC are given in HIPO charts 4.1.1 to 4.1.6 in Appendix I. The following is a brief description of the control routines including the analog control routines, 4.1.1 to 4.1.6 and of exemplary tailoring routines set forth in the HIPO charts (Appendix I).

Upon entering this series of six separate subroutines for the PI or PID loops, the program first calculates in the first control loop (4.1.1) the silencer bypass control analog signal ACT(1). The controller PLC obtains the silencer loop PI gains, the sense point and the set point, which are downloaded from computer COP, and performs the algorithm to obtain the valve setting output ACT(1) for the silencer bypass valve 40 (FIG. 1).

The program then performs the dump jacket fan PI control loop (4.1.2), obtaining the dump jacket loop PI gain constant, sense point and set point for obtaining the fan output ACT(2) for the radiator dump fan 52 (FIG. 1) by generating analog signal ACT(2).

The system then performs the engine throttle PI control loop (4.1.3), generating analog signal ACT(3) for controlling throttling of the engine 11 to produce heating, cooling or electrical power generation to meet load requirements within the constraints of the active operating mode. The controller obtains the cogenerator enable signal status, the engine loop PI gain constant, sense point and set point and generates signal ACT(3) to execute the control of the engine throttle to determine the throttle setting. The program also checks for tailor constraints to determine if the setting of the throttle is less than the idle speed and if so sets the throttle at the idle setting. Also, if the warm up is active and has not expired, the throttle is also set at the idle setting.

The program then computes the heat inlet valve setting (4.1.4), obtaining the heat loop valve PI gain constants, sense point and set point downloaded from computer COP and executing the algorithm to generate the control signal ACT(4) for operating the heat loop valve (FIG. 1) to the setting calculated.

The program then computes analog signal ACT(5) for the control of the absorption air conditioning inlet valve (4.1.5). The controller obtains the status of the absorption air conditioner 19 (FIG. 1) enable signal, and if the AC unit is enabled, then executes the PI control of the absorption AC inlet valve 17 (FIG. 1), obtaining the gain constants, sense point and set point values and calculating the analog signal ACT(5) to obtain the desired valve setting.

The program then executes the dump jacket PI control loop (4.1.6) to compute analog signal ACT(6) to obtain the setting for the dump jacket inlet valve 34 (FIG. 1).

If the scheduled mode is ECON, the economic mode selection routine STRAT (1.4.3) is invoked by routine CONTRO (1.4) to compute the mode of operation resulting in minimal operating costs. The routine uses TABLE to predict the expected performance of the cogeneration system in terms of fuel usage, electrical generation and load displacement.

For each mode candidate (OFF, ON, TLF, ELF) the program first invokes TABLE. The program then computes the operating costs, cost of running the engine plus cost of additional electricity minus the value of electricity sold to determine the minimum cost mode. Inputs used by the program are the heating, cooling and electrical loads, the cogenerator fuel usage, electricity generated, and HVAC needs. Additional inputs are the cost of cogeneration fuel, auxiliary fuel, and the electrical buy and sell rates.

If the auxiliary unit operating is electric powered, then the program determines first if the full throttle electrical sales is greater than full throttle fuel usage costs and if so sets the mode to ON. For tailored auxiliary type, the program obtains the electrical sales rate and cogeneration fuel cost.

If the ratio of the value of full throttle electrical sales at buy rates to the full throttle fuel costs less the value of the displaced auxiliary load is less than one, then the operating mode is set to OFF. Otherwise, thermal load mode TLF following is selected. If the throttle setting selected is less than the idle speed, then the OFF mode is selected. If the selection mode is OFF, but there is no auxiliary HVAC, then the thermal load following mode is selected. During a demand period when the selection is not the OFF mode, the limit mode is selected.

The discrete control routine (4.3) controls the discrete outputs of the CCS-C controller. The status of the cogenerator enable and the OFF delay timer are determined and if ACT(19) is true or if OFF delay timer is active and unexpired, then ACT(9) is turned on to activate the jacket pump.

When jacket pump is on, output ACT(10) is activated enabling the silencer boost pump 36 (FIG. 1).

The processor then monitors the status of ALARM and WARN flags, and if no alarms or warnings exist, output ACT(11) is turned on energizing the cogenerator OK lamp. If a warning exists, output ACT(12) is activated energizing the cogenerator warning lamp. If an alarm exists, then output ACT(13) is activated, energizing the cogenerator alarm lamp. If an alarm exists, or if the off mode is selected, then output ACT(19) is disabled, disabling the cogenerator system.

If the heat loop valve control output ACT(4) is greater than zero or if the off delay timer is active, then the heat loop pump switch output ACT(17) is activated to turn on the heat loop pump 48.

If the absorption air conditioner flag ITL(3) is true and there is a call for cooling, SENS(33) high, if cogenerator enable output ACT(19) is true, if the heat loop pump switch output ACT(17) is activated and the cogenerator air conditioner fail status flag SENS(31) is false, and if the water temperature at the silencer outlet, mixed, is greater than the set point value with a 10° dead band, then if the absorption air conditioner minimum on time conditions are satisfied, the cogenerator air conditioner enable switch output ACT(16) is activated to enable the absorption AC. The cool loop pump switch 17 is also activated by activating output ACT(18).

Information, set point values and other data are downloaded from the main computer COP and updated periodically. The process controller PLC continually executes the PID and discrete control loops, selecting operating mode as a function of the calculation results.

The tailoring subroutines 3.0–3.4 (FIG. 15) allow the operator to enter cogenerator system site specific parameters. Tailorable items include schedules, costs HVAC characteristics, cogenerator package characteristics and software.

Referring to HIPO chart 3.3 for the operation of the main computer COP while handling a tailor routine for tailoring cogeneration parameters, upon entering the routine, the tailoring menu is displayed and keyboard is evoked to obtain a user response. First a request is made to tailor load priority, invoking routine DN 14. Then the cogenerator constraint menu is displayed and the keyboard is invoked to obtain a user response. The user is prompted to enter a minimum throttle setting and keyboard is invoked to obtain the response. The data entered is used to update the throttle setting value.

The user is then prompted to enter the engine warmup time via the keyboard, and the data entered is used to update the this parameter. The user is then prompted to enter the absorption air conditioner minimum on time via the keyboard and the entered data is used to update the tailored item. The user is then prompted to enter the boost pump shutoff delay via the keyboard. The updated information is used in adjusting the boost pump shutoff delay setting.

To update tailor set points, subroutine DN14 is invoked and the cogenerator flow rate menu is displayed. The keyboard is invoked to obtain user response to enter cogenerator loop flow rate cogenerator toggle absorption AC present flag. Then the parasitic rating menu for the cogenerator is displayed and the keyboard is invoked to obtain user response. The user enters the engine parasitic rating desired, the dump parasitic rating desired and the absorption AC parasitic rate. The items are updated as the data is entered.

The cogenerator minimum performance menu is then displayed and the keyboard is invoked to obtain user response. The user enters the engine minimum performance rating, silencer HX minimum UA rating and the data received via the keyboard is used to update these parameters. The routine DN33 is then invoked to tailor the cogenerator performance data parameters entered.

Referring now to HIPO chart 3.4, to handle tailoring of software parameters, a routine is invoked by TAILOR. The software tailoring menu is displayed and the keyboard is invoked to get user response. The diagnostic title menu is displayed and the keyboard is invoked to obtain a user response to enter a new title. The sensor/actuator title menu is then displayed and the user is prompted to enter the new title and units. The tailored items are updated.

The report title menu is then displayed and the user is prompted to enter the new title in units and the information is updated. Routine DN13 is then invoked to tailor the automatic report generation.

The PID gain constant menu is then displayed and the keyboard is invoked to obtain user response. The user is prompted to enter the PID gains for the engine TFL loop, the engine ELF loop, the silencer loop, the dump loop, the absorption AC loop, the heating valve loop, and the dump valve loop. These items are requested one at a time and the parameter is updated as the information is received via the keyboard.

Then the analog alarm and discrete and normal setting menu is displayed and the user is prompted to enter updated information.

Referring now to HIPO chart L.4, this routine is invoked to handle tailoring of cogenerator set points. The set point tailoring menu is first displayed and the keyboard is invoked to obtain user response. The user is prompted to enter in the sequence the heating set point, the cooling set point, the cooling hot inlet set point, the silencer incremental set up, the dump jacket set point, the limit mode set point, the fix mode set point and the heating/cooling load priority. The items are prompted one at a time and the tailored items are as the data is received via the keyboard.

APPENDIX I

| INPUT | PROCESS | OUTPUT |
|---|---|---|
| | 1. Invoke INIT | |
| Stop flag | 2. Do until stop flag is set: | |
| |   2.1 Invoke READEM | |
| |   2.2 Invoke DIAG | |
| |   2.3 Invoke CONTRO | |
| |   2.4 Invoke CALC | |
| |   2.5 Invoke CONSOL | |

NOTES:
This is the main program of the CCS-2C 627 resident software. It uses INIT to initialize software system variables at startup and then calls a series of subordinate routines in round robin fashion to perform its controller functions.

| HIPO NUMBER: | MNEMONIC: | AUTHOR: | OUTSIDE SERVICES REQUIRED: |
|---|---|---|---|
| 1.0 | CCS | DCT | 1.1: INIT |
| | | | 1.2: READEM to get 620 status |
| | | | 1.3: DIAG to check for diagnostic conditions |
| TITLE: | | DATE: | 1.4: CONTRO to execute control algorithms |
| Controller main program | | 10/2/85 | 1.5: CALC to perform computations |
| | | | 1.6: CONSOL to service keyboard |

| INPUT | PROCESS | OUTPUT |
|---|---|---|
| | | |

NOTES:
This is the initialization routine invoked by CCS at software startup time.

| HIPO NUMBER: | MNEMONIC: | AUTHOR: | OUTSIDE SERVICES REQUIRED: |
|---|---|---|---|
| 1.1 | INIT | DCT | |
| TITLE: | | DATE: | |
| CCS software initialization | | 10/5/85 | |

| INPUT | PROCESS | OUTPUT |
|---|---|---|
| | 1. Initialize input buffer to zero | |
| | 2. Set up parameters for Ppint | |
| | 3. Do until good transfer, or 5 retries: | |
| 620-20 inputs, outputs | 3.1 Invoke Ppint | |
| and status | 4. If transfer successful, then: | |
| | 4.1 Set up 620 status flags | 620 status flags |
| | 4.2 Invoke PP2 | |

NOTES:
This routine is invoked by CCS to acquire input sensor readings and output actuator settings from the 620-20. It also checks the status of the 620-20.

| HIPO NUMBER: | MNEMONIC: | AUTHOR: | OUTSIDE SERVICES REQUIRED: |
|---|---|---|---|
| 1.2 | READEM | DCT | D1: Ppint to bring in 620-20 registers |
| | | | 1.2.1: PP2 to convert input sensor readings |
| TITLE: | | DATE: | |
| 620 Status acquisition routine | | 10/2/85 | |

| INPUT | PROCESS | OUTPUT |
|---|---|---|
| | 1. Do for each thermocouple (1-16): | |
| Analog inputs | 1.1 Convert and load into SENS | SENS(1-16) |
| | 2. Do for each miscellaneous analog input (17-24): | |
| Analog inputs | 2.1 Convert and load into SENS | SENS(17-24) |
| | 3. Do for each discrete input: | |
| Discrete inputs | 3.1 Load into SENS | SENS(25-48) |
| | 4. Do for each analog output: | |
| Analog outputs | 4.1 Convert and load into ACT | ACT(1-8) |
| | 5. Do for each discrete output: | |
| Discrete outputs | 5.1 Load into ACT | ACT(1-24) |
| | 6. Do for each IPC status flag: | |
| Status flags | 6.1 Load into FLAGS | FLAGS(1-10) |

NOTES:
This personality procedure is invoked by READEM to convert and load 620 input and output settings and 620 status registers into 627 data structures.

| HIPO NUMBER: | MNEMONIC: | AUTHOR: | OUTSIDE SERVICES REQUIRED: |
|---|---|---|---|
| 1.2.1 | PP2 | DCT | None |
| TITLE: | | DATE: | |
| Input/output/status converter | | 10/2/85 | |

| INPUT | PROCESS | OUTPUT |
|---|---|---|
|  | 1. Do for IPC status flags 1-4 (j=1,4): |  |
| IPC 620 status flags | 1.1 If FLAG(j) set, then set DIAG(i) | Diag. msgs. 1-3 & 9 |
|  | 2. Invoke PP4 |  |
|  | 3. Do for diags. 4-8 (j=4,8): |  |
| Input sensors | 3.1 If SENS(i)>Limit(j), then set DIAG(j) | Diag. msgs. 4-8 |
|  | 4. Do for diags. 10-15 (j=10,15): |  |
| Input sensors | 4.1 If SENS(i)>Limit(j), then set DIAG(j) | Diag. msgs. 10-15 |
| Engine operating hours | 5. If CALC(6)>Limit(18), then set DIAG(18) | Engine P.M. notice |
| Silncr operating hours | 6. If CALC(7)>Limit(19), then set DIAG(19) | Silencer P.M. notice |

NOTES:
This routine is invoked by CCS to check for diagnostic conditions. All notices except the trend diagnostic messages are checked and posted by this routine. PP4 is a personality procedure which contains vendor specific diagnostic alorithms, and settings for the Limit data structure.

| HIPO NUMBER: | MNEMONIC: | AUTHOR: | OUTSIDE SERVICES REQUIRED: |
|---|---|---|---|
| 1.3 | DIAG | DCT | 1.3.1: PP4 to execute special diagnostic algorithms and get Limit settings |
| TITLE: | | DATE: | |
| Diagnostic check routine | | 10/2/85 | |

| INPUT | PROCESS | OUTPUT |
|---|---|---|
|  | 1. Load settings for diagnostic limits | Limit data structure |
|  | 2. Invoke TABLE in read data mode |  |
| Performance data | 3. If the performance data indicates an engine | Engine degradation diag. |
| for engine and silencer | or silencer degradation, set DIAG(16 or 17) | Silencer degrade. diag. |

NOTES:
This routine is the CCS-2C special diagnostics algorithm personality procedure. It contains trend diagnostics and sets limits for triggering of standard diagnostics.

| HIPO NUMBER: | MNEMONIC: | AUTHOR: | OUTSIDE SERVICES REQUIRED: |
|---|---|---|---|
| 1.3.1 | PP4 | DCT | D2: TABLE to get latest engine and silencer performance data |
| TITLE: | | DATE: | |
| Diagnostics personality procedure | | 10/2/85 | |

| INPUT | PROCESS | OUTPUT |
|---|---|---|
|  | 1. Invoke LOOKUP |  |
| Mode of operation | 2. If MODE=ECON, then |  |
| Strategic control timer | 2.1 If timer expired, then: |  |
|  | 2.1.1 Invoke STRAT |  |
|  | 2.1.2 Reset the timer | Strategic control timer |
| Diagnostics | 3. If any alarm conditions exist, MODE=OFF | MODE |
|  | 4. Invoke PP5 |  |
|  | 5. Invoke WRITEM |  |

NOTES:
This routine is invoked by CCS to supervise control in the 620-20.

| HIPO NUMBER: | MNEMONIC: | AUTHOR: | OUTSIDE SERVICES REQUIRED: |
|---|---|---|---|
| 1.4 | CONTRO | DCT | D3: LOOKUP to get mode selected |
| | | | 1.4.3: STRAT to compute most economic mode |
| | | | 1.4.1: PP5 for vendor specific control algrthms |
| TITLE: | DATE: | | 1.4.2: WRITEM to download supervisory control information |
| Control algortihm supervisor | 10/2/85 | | |
| | | | T2 & T3: TIMSET & DELTAT to manage the timer |

| INPUT | PROCESS | OUTPUT |
|---|---|---|
| | | |

NOTES:
This routine is invoked by CONTRO to handle vendor specific control algorithms in the CCS-2C.

| HIPO NUMBER: | MNEMONIC: | AUTHOR: | OUTSIDE SERVICES REQUIRED: |
|---|---|---|---|
| 1.4.1 | PP5 | DCT | None |
| TITLE: | DATE: | | |
| Control personality procedure | 10/2/85 | | |

| INPUT | PROCESS | OUTPUT |
|---|---|---|
| Mode, setpoints and other supervis. stuff | 1. Set up parameters for Ppint | |
| | 2. Do until good transfer, or 5 retries: | |
| | 2.1 Invoke Ppint | Supervisory info to 620 |

NOTES:
This routine is invoked by CONTRO to transmit supervisory control information to the 620-20.

| HIPO NUMBER: | MNEMONIC: | AUTHOR: | OUTSIDE SERVICES REQUIRED: |
|---|---|---|---|
| 1.4.2 | WRITEM | DCT | D1: Ppint to transmit to the 620-20 |
| TITLE: | DATE: | | |
| 620 Info transmittal routine | 10/2/85 | | |

| INPUT | PROCESS | OUTPUT |
|---|---|---|
| | 1. Do for each candidate mode (Off, On, TLF, ELF):<br>1.1 Invoke TABLE | |
| Heating, cooling, elec. loads; Cogen fuel usage, elec. generated, HVAC needs displaced; costs of Cogen fuel, aux fuel elec. buy and sell rates | 1.2 Compute operating cost : Cost of running the engine + Cost of auxiliary fuel needed + Cost of additional electricity - Value of elec. sold | Minimum cost mode |
| Tailored aux. type<br>Elec. sales rate, cogen fuel cost<br>Aux boiler efficiency<br>Aux a.c. COP | 2. If the auxiliary is electric, then:<br>2.1 If the value of full throttle electrical sales > full throttle fuel usage costs, mode = On<br>2.2 If the value of full throttle electrical at buy rates / (full throttle fuel costs less the value of the displaced auxiliary load)<1, mode = Off<br>2.3 Otherwise, choose TLF | MODE<br><br>MODE<br>MODE |
| Tailored idle setting | 3. If the throttle setting selected < idle speed, then choose Off | MODE |
| Aux HVAC type | 4. If the selection is Off, but there is no auxiliary HVAC, then choose TLF | MODE |
| LIMit setting<br>Demand per. profile | 5. If it's a demand period and the selection is not Off, then choose LIM | MODE |

NOTES:
This routine is invoked by CONTRO if the scheduled mode is ECON. It computes the mode of operation resulting in minimal operating cost. It uses TABLE to predict the expected performance of the cogen system in terms of fuel usage, electrical generation, and load displacement.

| HIPO NUMBER: | MEMONIC: | AUTHOR: | OUTSIDE SERVICES REQUIRED: |
|---|---|---|---|
| 1.4.3 | STRAT | AKM | D2: TABLE to predict engine performance |
| TITLE:<br>Economic mode selection routine | | DATE:<br>10/2/85 | |

| INPUT | PROCESS | OUTPUT |
|---|---|---|
| Mode of operation | 1. Tabulate operating mode | XD data structure |
| Actuator settings | 2. Tabulate engine, silencer and a.c. operating hours | for all of these calcs. |
| Electric gen.&imported | 3. Compute electrical load | |
| | 4. Invoke LOOKUP | |
| | 5. Invoke RATCH | |
| Electric gen. | 6. Tabulate on/off peak generation | |
| Temperature sensors | 7. Compute heating load and cogen contribution | |
| Temperature sensors | 8. Compute cooling load, cogen contribution to cooling and thermal to the chiller | |
| | 9. Invoke TABLE to get predicted thermal available | |
| | 10. Compute thermal dumped | |
| Tailored inputs | 11. Compute parasitic totals | |
| Fuel flow sensor | 12. Compute fuel usage | |
| | 13. Invoke TABLE to update engine and silencer performance data | |
| TBD | 14. Compute savings | |
| TBD | 15. Invoke PP6 | |
| | 16. Invoke INTEG | |

NOTES:
This routine is invoked by CCS to perform various and sundry performance computations. PP6 is a personality procedure invoked to perform vendor specific computations.

| HIPO NUMBER: | MNEMONIC: | AUTHOR: | OUTSIDE SERVICES REQUIRED: |
|---|---|---|---|
| 1.5 | CALC | DCT | D2: TABLE to predict thermal output and also to update cogen performance data |
| TITLE: Calculation algorithms | | DATE: 10/3/85 | D3: LOOKUP to determine if this is an on or off period and to get utility and fuel costs |
| | | | D4: RATCH to capture peak import and generation information |
| | | | 1.5.1: PP6 the calculation personality procedure |
| | | | 1.5.2: INTEG to integrate the calculations |

| INPUT | PROCESS | OUTPUT |
|---|---|---|
| | | |

NOTES:
This routine is invoked by CALC to handle vendor specific calculation algorithms in the CCS-ZC.

| HIPO NUMBER: | MNEMONIC: | AUTHOR: | OUTSIDE SERVICES REQUIRED: |
|---|---|---|---|
| 1.5.1 | PP6 | DCT | None |
| TITLE: Calculation personality procedure | | DATE: 10/2/85 | |

| INPUT | PROCESS | OUTPUT |
|---|---|---|
| Integration timer | 1. Compute elapsed time | |
| | 2. Do, for each calculation (i): | |
| |   2.1 Do, for each integration period (j): | |
| XD data structure |     2.1.1 Integrate the calculation: | |
| |       $X(i,j) = X(i,j) + XD(i) * $ Delta time | X data structure |
| | 3. Reset the integration timer | Integration timer |

NOTES:
This routine is invoked by CALC to integrate the calculations. It uses DELTAT and TIMSET to manage the integration timer.

| HIPO NUMBER: | MNEMONIC: | AUTHOR: | OUTSIDE SERVICES REQUIRED: |
|---|---|---|---|
| 1.5.2 | INTEG | DCT | T3: DELTAT to compute elapsed time |
| | | | T4: TIMSET to reset the timer |
| TITLE: Calculation integrator | | DATE: 10/3/85 | |

| INPUT | PROCESS | OUTPUT |
|---|---|---|
| | 1. Invoke WATCH | |
| | 2. Invoke KB | |
| Keyboard input | 3. If the login flag is set correctly, and a terminal | |
| | is connected and: an invalid character | |
| Login flag | was returned, or | |
| Refresh timer | the screen refresh timer has expired, then: | |
| | 3.1 Invoke HPRINT | Main screen header |
| | 3.2 Invoke STATUS | Diagnostic status display |
| | 3.3 Invoke RATCH | Peak status display |
| Scheduled and selected | 3.4 Print Mode status | Mode status display |
| modes | | |
| | 3.5 Print main menu | Main menu display |
| | 3.6 Reset the refresh timer | Refresh timer |
| Login flag | 4. If the login flag is set correctly, then: | |
| Keyboard input | Do case of character returned by Inkey: | |
| | 4.1 Invoke DSTAT | |
| | 4.2 Invoke SENSOR | |
| | 4.3 Invoke REPORT | |
| | 4.4 Invoke TABLE | |
| | 4.5 Invoke DTAIL | |
| | 4.6 Invoke DEVEL | |

NOTES:
This routine is the main program of the Monitor. It prints status information, the main menu and uses a battery of subordinate routines to generate various reports. It is designed to be an independent task, but will probably be invoked in round robin fashion by CCS.

| HIPO NUMBER: | MNEMONIC: | AUTHOR: | OUTSIDE SERVICES REQUIRED: |
|---|---|---|---|
| 2.0 | CONSOL | DCT | M1: STATUS to print diagnostic status |
| | | | M2: SENSOR to print sensor/actuator report |
| TITLE: | | DATE: | M5: KB to handle keyboard input |
| Monitor executive | | 10/3/85 | M6: HPRINT to print the header |
| | | | M4: TABLE to print cogen performance data |
| | | | 2.1: WATCH to kick off time critical functions |
| | | | 2.2: DSTAT to handle diagnostic acks, clears |
| | | | 2.3: REPORT to drive tabulated report generation |
| | | | 2.4: DTAIL to drive on-line tailoring functions |
| | | | 2.5: DEVEL to handle S.W. development, |
| | | | installation and start-up functions |

| INPUT | PROCESS | OUTPUT |
|---|---|---|
| | 1 Do, for each active report timer i: i = 1,15). | |
| Report timers | 1.1 If timer expired, then: | |
| | 1.1.1 invoke MODEM to connect phone | |
| Report gen. data struc. | 1.1.2 Do case of report type: | |
| Connection flag | 1.1.2.1 If the connection was successful, | |
| | then Do: | |
| | 1.1.2.1.1 Invoke STATUS | |
| Mode select./sched. | 1.1.2.1.2 Print Modes | Mode scheduled, selected |
| | 1.1.2.2 Invoke SENSOR | |
| | 1.1.2.3 Do: | |
| | 1.1.2.3.1 If the connection was | |
| | successful then: | |
| | invoke MATRIX for hourly report | |

```
|                      |                              | 1.1.2.3.2 Invoke ARCH to archive totals   |                     |
|                      |                              | 1.1.2.3.3 Reset hourly totals             | X(1,j) = 0.0        |
|                      |                              | 1.1.2.4 Do:                               |                     |
|                      |                              |   1.1.2.4.1 If the connection was         |                     |
|                      |                              |            successful then:               |                     |
|                      |                              |            invoke MATRIX for daily report |                     |
|                      |                              |   1.1.2.4.2 Invoke ARCH to archive totals |                     |
|                      |                              |   1.1.2.4.3 Reset daily totals            | X(2,j) = 0.0        |
|                      |                              |   1.1.2.4.4 Invoke ESCHEK                 |                     |
|                      |                              | 1.1.2.5 Do:                               |                     |
|                      |                              |   1.1.2.5.1 If the connection was         |                     |
|                      |                              |            successful then:               |                     |
|                      |                              |            invoke MATRIX for monthly rep. |                     |
|                      |                              |   1.1.2.5.2 Invoke ARCH to archive totals |                     |
|                      |                              |   1.1.2.5.3 Reset monthly totals          | X(3,j) = 0.0        |
|                      |                              | 1.1.2.6 Do:                               |                     |
|                      |                              |   1.1.2.6.1 If the connection was         |                     |
|                      |                              |            successful then:               |                     |
|                      |                              |            invoke MATRIX for yearly report|                     |
|                      |                              |   1.1.2.6.2 Reset yearly totals           | X(4,j) = 0.0        |
|                      |                              | 1.1.2.7 If the connection was             |                     |
|                      |                              |            successful then: Invoke TABLE  |                     |
|                      |                              | 1.1.2.8 If the connection was             |                     |
|                      |                              |            successful then:               |                     |
|                      |                              |   1.1.2.8.1 Invoke RATCH to print peaks   |                     |
|                      |                              |   1.1.2.8.2 Invoke ARCH to archive peaks  |                     |
| Ratchet period timer |                              |   1.1.2.8.3 If the Ratchet timer has expired:|                  |
|                      |                              |     1.1.2.8.3.1 Invoke RATCH to reset peaks|                    |
|                      |                              |     1.1.2.8.3.2 Reset the timer           | Ratchet period timer|
|                      |                              | 1.1.3 Reset the timer                     |                     |
|                      |                              | 1.1.4 Invoke MODEM to disconnect phone    |                     |
```

NOTES:
This routine is invoked by CONSOL to kick off time critical tasks. It uses a battery of subordinate routines to generate various reports.

| HIPO NUMBER: | MNEMONIC: | AUTHOR: | OUTSIDE SERVICES REQUIRED:                              |
| 2.1          | WATCH     | DCT     | M1: STATUS to print diagnostic status                   |
|              |           |         | M2: SENSOR to print sensor/actuator report              |
| TITLE:       |           | DATE:   | M3: MATRIX to print tabulated data reports              |
| Clock watcher|           | 10/3/85 | M3.1: ARCH to archive tabulated data                    |
|              |           |         | M4: TABLE to print cogen performance data               |
|              |           |         | D4: RATCH to print peak status report and to reset peaks|
|              |           |         | 2.1.1: MODEM to handle phone connects                   |
|              |           |         | 2.1.2: ESCHEK to check cogen performance trend          |

| INPUT | PROCESS | OUTPUT |
|-------|---------|--------|
|       | 1. Set connect flag to false | Connect flag |
| Dial/hangup flag | 2. If flag is for dial out, then Do: | |
| T-switch sensor | 2.1 If the T-switch is set to "local", then: | |
|  | 2.1.1 Set connect flag to true | Connect flag |
|  | Else: | |
| Report gen. data struc. | 2.1.2 Send auto dial sequence | Auto dial sequence |
| Modem response | 2.1.3 If modem response is "Connect", then: | |
|  | Set connect flag to true | Connect flag |
|  | 3. If flag is for hangup, then send hangup sequence | Hangup sequence |

NOTES:
This routine is invoked by WATCH to drive the modem.

| HIPO NUMBER: | MNEMONIC: | AUTHOR: | OUTSIDE SERVICES REQUIRED: |
|---|---|---|---|
| 2.1.1 | MODEM | DCT | A modem |
| TITLE: | | DATE: | |
| Modem Connect | | 10/3/85 | |

| INPUT | PROCESS | OUTPUT |
|---|---|---|
| Engine performance, actual and minimum Silencer performance, actual and minimum | 1. Invoke TABLE to get performance data<br>2. If performance totals for the engine are below the tailored minimum, then set DIAG(16)<br>3. If performance totals for the silencer are below the tailored minimum, then set DIAG(17)<br>4. Invoke TABLE to reset performance totals | Engine diagnostic msg.<br>Silencer diagnostic msg. |

NOTES:

This routine is invoked by WATCH on a daily basis to check the performance data collected on the engine and silencer. It uses TABLE to retrieve the data and to reset the totals.

| HIPO NUMBER: | MNEMONIC: | AUTHOR: | OUTSIDE SERVICES REQUIRED: |
|---|---|---|---|
| 2.1.2 | ESCHEK | DCT | D4: TABLE to get and reset performance data |
| TITLE: | | DATE: | |
| Trend diagnostic checker | | 10/3/85 | |

| INPUT | PROCESS | OUTPUT |
|---|---|---|
| | 1. Do until user response is null: | |
| | 1.1 Print diagnostic ack/clear/print menu | Diagnostic menu |
| User choice | 1.2 Invoke KB to get user response | |
| | 1.3 Do case of user response: | |
| |     1.3.1 Invoke STATUS | |
| |     1.3.2 Do: | |
| |         1.3.2.1 Prompt user to get message to ack. | User prompt |
| User choice |         1.3.2.2 Invoke KB to get user response | |
| |         1.3.2.3 Set appropriate DIAG to "ack" | Diag. msg. data struct. |
| |     1.3.3 Do: | |
| |         1.3.3.1 Prompt user to get msg. to clear | User prompt |
| User choice |         1.3.3.2 Invoke KB to get user response | |
| |         1.3.3.3 Set appropriate DIAG to "clear" | Diag. msg. data struct. |

NOTES:

This routine is invoked by CONSOL to handle a user request to acknowledge or clear a diagnostic message.

| HIPO NUMBER: | MNEMONIC: | AUTHOR: | OUTSIDE SERVICES REQUIRED: |
|---|---|---|---|
| 2.2 | DSTAT- | DCT | M1: STATUS to print diagnostic messages |
| | | | M5: KB to handle keyboard input |
| TITLE: | | DATE: | |
| Status message executive | | 10/3/85 | |

| INPUT | PROCESS | OUTPUT |
|---|---|---|
| | 1. Do until user response is null: | |
| | 1.1 Print tabulated report menu | Report menu |
| User choice | 1.2 Invoke KB to get user response | |
| | 1.3 Do case of user response: | |
| | 1.3.1 Invoke MATRIX to print hourly totals | |
| | 1.3.1 Invoke MATRIX to print daily totals | |
| | 1.3.1 Invoke MATRIX to print monthly totals | |
| | 1.3.1 Invoke MATRIX to print yearly totals | |

NOTES:
This routine is invoked by CONSOL to handle a user request to print a tabulated data report

| HIPO NUMBER: | MNEMONIC: | AUTHOR: | OUTSIDE SERVICES REQUIRED: |
|---|---|---|---|
| 2.3 | REPORT | DCT | M3: MATRIX to generate the reports |
| | | | M5: KB to handle keyboard input |
| TITLE: | | DATE: | |
| Tabulated data report executive | | 10/3/85 | |

| INPUT | PROCESS | OUTPUT |
|---|---|---|
| | 1. Do until user response is null: | |
| | 1.1 Print on line tailoring menu | |
| User choice | 1.2 Invoke KB to get user response | Tailoring menu |
| | 1.3 Do case of user response: | |
| | 1.3.1 Invoke DN12 | |
| | 1.3.2 Invoke DN13 | |
| | 1.3.3 Invoke DN33 | |

NOTES:
This routine is invoked by CONSOL to handle a user request to tailor the system

| HIPO NUMBER: | MNEMONIC: | AUTHOR: | OUTSIDE SERVICES REQUIRED: |
|---|---|---|---|
| 2.4 | DTAIL | DCT | L1: DN12 to tailor operating and demand scheds. |
| | | | M5: KB to handle keyboard input |
| TITLE: | | DATE: | L2: DN33 to tailor cogen performance data |
| On line tailoring driver | | 10/3/85 | L3: DN13 to tailor auto generation of reports |

| INPUT | PROCESS | OUTPUT |
|---|---|---|
| User choice | 1. Do until user response is null:<br>   1.1 Print Specials menu<br>   1.2 Invoke KB to get user response<br>   1.3 Do case of user response:<br>      1.3.1 TBD | Specials menu |

NOTES:
This routine is invoked by CONSOL to handle a user request to execute software development/check out/start up package special requests. Its functions are TBD.

| HIPO NUMBER: | MNEMONIC: | AUTHOR: | OUTSIDE SERVICES REQUIRED: |
|---|---|---|---|
| 2.5 | DEVEL | DCT | M5: KB to handle keyboard input |
| TITLE:<br>Development specials executive | | DATE:<br>10/3/85 | |

| INPUT | PROCESS | OUTPUT |
|---|---|---|
| User choice | 1. Do until user response is null:<br>   1.1 Print tailoring menu<br>   1.2 Invoke KB to get user response<br>   1.3 Do case of user response:<br>      1.3.1 Invoke DN11<br>      1.3.2 Invoke DN2<br>      1.3.3 Invoke DN3<br>      1.3.4 Invoke DN4<br>      1.3.5 Invoke DN12 | Tailoring menu |

NOTES:
This routine is the main program of the tailoring package for the CCS-2C.

| HIPO NUMBER: | MNEMONIC: | AUTHOR: | OUTSIDE SERVICES REQUIRED: |
|---|---|---|---|
| 3.0 | TAILOR | DCT | 3.1.1: DN11 to tailor costs |
| | | | M5: KB to handle keyboard input |
| TITLE:<br>Off line tailoring executive | | DATE:<br>10/3/85 | 3.2: DN2 to tailor HVAC stuff<br>3.3: DN3 to tailor cogenerator stuff<br>3.4: DN4 to tailor the software<br>L1: DN12 to tailor operating and demand profiles |

| INPUT | PROCESS | OUTPUT |
|---|---|---|
|  | 1. Do until user response is null: |  |
|  | 1.1 Print cost menu | Cost menu |
| User choice | 1.2 Invoke KB to get user response |  |
|  | 1.3 Do case of user response: |  |
|  | 1.3.1 Do: |  |
|  | 1.3.1.1 Prompt user to enter off peak electrical purchase cost | User prompt |
| User choice | 1.3.1.2 Invoke KB to get user response |  |
|  | 1.3.1.3 Update tailored item | Tailored item |
|  | 1.3.2 Do: |  |
|  | 1.3.2.1 Prompt user to enter on peak electrical purchase cost | User prompt |
| User choice | 1.3.2.2 Invoke KB to get user response |  |
|  | 1.3.2.3 Update tailored item | Tailored item |
|  | 1.3.3 Do: |  |
|  | 1.3.3.1 Prompt user to enter off peak electrical sales price | User prompt |
| User choice | 1.3.3.2 Invoke KB to get user response |  |
|  | 1.3.3.3 Update tailored item | Tailored item |
|  | 1.3.4 Do: |  |
|  | 1.3.4.1 Prompt user to enter on peak electrical sales price | User prompt |
| User choice | 1.3.4.2 Invoke KB to get user response |  |
|  | 1.3.4.3 Update tailored item | Tailored item |
|  | 1.3.5 Do: |  |
|  | 1.3.5.1 Prompt user to enter aux. heating fuel cost | User prompt |
| User choice | 1.3.5.2 Invoke KB to get user response |  |
|  | 1.3.5.3 Update tailored item | Tailored item |
|  | 1.3.6 Do: |  |
|  | 1.3.6.1 Prompt user to enter aux. cooling fuel cost | User prompt |
| User choice | 1.3.6.2 Invoke KB to get user response |  |
|  | 1.3.6.3 Update tailored item | Tailored item |
|  | 1.3.7 Do: |  |
|  | 1.3.7.1 Prompt user to enter cogenerator fuel cost | User prompt |
| User choice | 1.3.7.2 Invoke KB to get user response |  |
|  | 1.3.7.3 Update tailored item | Tailored item |
|  | 1.3.8 Do: |  |
|  | 1.3.8.1 Prompt user to enter ratchet period demand charge | User prompt |
| User choice | 1.3.8.2 Invoke KB to get user response |  |
|  | 1.3.8.3 Update tailored item | Tailored item |

NOTES:
This routine is invoked by TAILOR to handle tailoring of costs.

| HIPO NUMBER: 3.1.1 | MNEMONIC: DN11 | AUTHOR: DCT | OUTSIDE SERVICES REQUIRED: |
|---|---|---|---|
| TITLE: Tailor costs |  | DATE: 10/3/85 | M5: KB to handle keyboard input |

| INPUT | PROCESS | OUTPUT |
|---|---|---|
| | 1. Do until user response is null: | |
| | 1.1 Print HVAC tailoring menu | HVAC tailoring menu |
| User choice | 1.2 Invoke KB to get user response | |
| | 1.3 Do case of user response: | |
| | 1.3.1 Do: | |
| | 1.3.1.1 Print aux. heating type menu | Aux. heating menu |
| User choice | 1.3.1.2 Invoke KB to get user response | |
| | 1.3.1.3 Do case of user response: | |
| | 1.3.1.3.1 Do: | |
| | 1.3.1.3.1.1 Prompt user to enter gas auxiliary efficiency | User prompt |
| User choice | 1.3.1.3.1.2 Invoke KB to get response | |
| | 1.3.1.3.1.3 Update tailored item | Tailored item |
| | 1.3.1.3.1.4 Set aux heat type to gas | Tailored item |
| | 1.3.1.3.2 Do: | |
| | 1.3.1.3.2.1 Set aux heat eff. to 1.0 | Tailored item |
| | 1.3.1.3.2.2 Set aux heat type to elec. | Tailored item |
| | 1.3.1.3.3 Set aux. heat type to none | Tailored item |
| | 1.3.2 Do: | |
| | 1.3.2.1 Print aux. cooling type menu | Aux. cooling menu |
| User choice | 1.3.2.2 Invoke KB to get user response | |
| | 1.3.2.3 Do case of user response: | |
| | 1.3.2.3.1 Do: | |
| | 1.3.2.3.1.1 Prompt user to enter absorption a.c. COP | User prompt |
| User choice | 1.3.2.3.1.2 Invoke KB to get response | |
| | 1.3.2.3.1.3 Update tailored item | Tailored item |
| | 1.3.2.3.1.4 Set aux cool type to absorption a.c. | Tailored item |
| | 1.3.2.3.2 Do: | |
| | 1.3.2.3.2.1 Set aux cool COP to TBD | Tailored item |
| | 1.3.2.3.2.2 Set aux cool type to vapor compression | Tailored item |
| | 1.3.2.3.3 Set aux. cool type to none | Tailored item |
| | 1.3.3 Do: | |
| | 1.3.3.1 Prompt user to enter HVAC heating loop flow rate | User prompt |
| User choice | 1.3.3.2 Invoke KB to get user response | |
| | 1.3.3.3 Update tailored item | Tailored item |
| | 1.3.4 Do: | |
| | 1.3.4.1 Prompt user to enter HVAC cooling loop flow rate | User prompt |
| User choice | 1.3.4.2 Invoke KB to get user response | |
| | 1.3.4.3 Update tailored item | Tailored item |

NOTES:
This routine is invoked by TAILOR to handle tailoring of HVAC parameters.

| HPO NUMBER: | MEMONIC: | AUTHOR: | OUTSIDE SERVICES REQUIRED: |
|---|---|---|---|
| 3.2 | DN2 | DCT | M5: KB to handle keyboard input |
| TITLE: | | DATE: | |
| Tailor HVAC | | 10/3/85 | |

| INPUT | PROCESS | OUTPUT |
|---|---|---|
| | 1. Do until user response is null: | |
| | 1.1 Print cogenerator tailoring menu | Cogen tailoring menu |
| User choice | 1.2 Invoke KB to get user response | |
| | 1.3 Do case of user response: | |
| |    1.3.1 Invoke DN14 to tailor load priority | |
| |    1.3.2 Do: | |
| |       1.3.2.1 Print cogen constraint menu | Constraint menu |
| User choice |       1.3.2.2 Invoke KB to get user response | |
| |       1.3.2.3 Do case of user response: | |
| |          1.3.2.3.1 Do: | |
| |             1.3.2.3.1.1 Prompt user to enter minimum throttle setting | User prompt |
| User choice |             1.3.2.3.1.2 Invoke KB to get response | |
| |             1.3.2.3.1.3 Update tailored item | Tailored item |
| |          1.3.2.3.2 Do: | |
| |             1.3.2.3.2.1 Prompt user to enter engine warm up time | User prompt |
| User choice |             1.3.2.3.2.2 Invoke KB to get response | |
| |             1.3.2.3.2.3 Update tailored item | Tailored item |
| |          1.3.2.3.3 Do: | |
| |             1.3.2.3.3.1 Prompt user to enter absorp. a.c. min. on time | User prompt |
| User choice |             1.3.2.3.3.2 Invoke KB to get response | |
| |             1.3.2.3.3.3 Update tailored item | Tailored item |
| |          1.3.2.3.4 Do: | |
| |             1.3.2.3.4.1 Prompt user to enter boost pump shut off delay | User prompt |
| User choice |             1.3.2.3.4.2 Invoke KB to get response | |
| |             1.3.2.3.4.3 Update tailored item | Tailored item |
| |    1.3.3 Invoke DN14 to tailor setpoints | |
| |    1.3.4 Do: | |
| |       1.3.4.1 Print cogen flow rate menu | Flow rate menu |
| User choice |       1.3.4.2 Invoke KB to get user response | |
| |       1.3.4.3 Do case of user response: | |
| |          1.3.4.3.1 Do: | |
| |             1.3.4.3.1.1 Prompt user to enter cogen heat loop flow rate | User prompt |
| User choice |             1.3.4.3.1.2 Invoke KB to get response | |
| |             1.3.4.3.1.3 Update tailored item | Tailored item |
| |          1.3.4.3.2 Do: | |
| |             1.3.4.3.2.1 Prompt user to enter cogen cool loop flow rate | User prompt |
| User choice |             1.3.4.3.2.2 Invoke KB to get response | |
| |             1.3.4.3.2.3 Update tailored item | Tailored item |
| |    1.3.5 Toggle absorption a.c. present flag | Tailored item |

NOTES:

This is part 1 of a 2 part HPO.

This routine is invoked by TAILOR to handle tailoring of cogenerator parameters.

| HIPO NUMBER: | MNEMONIC: | AUTHOR: | OUTSIDE SERVICES REQUIRED: |
|---|---|---|---|
| 3.3 | DN3 | DCT | L4: DN14 to tailor setpoints and load priority |
| | | | M5: KB to handle keyboard input |
| TITLE: | | DATE: | L2: DN33 to tailor cogenerator performance data |
| Tailor Cogenerator | | 10/3/85 | |

| INPUT | PROCESS | OUTPUT |
|---|---|---|
| | 1.3.6 Do: | |
| | 1.3.6.1 Print cogen parasitic rating menu | Parasitic menu |
| User choice | 1.3.6.2 Invoke KB to get user response | |
| | 1.3.6.3 Do case of user response: | |
| | 1.3.6.3.1 Do: | |
| | 1.3.6.3.1.1 Prompt user to enter Engine parasitic rating | User prompt |
| User choice | 1.3.6.3.1.2 Invoke KB to get response | |
| | 1.3.6.3.1.3 Update tailored item | Tailored item |
| | 1.3.6.3.2 Do: | |
| | 1.3.6.3.2.1 Prompt user to enter Dump parasitic rating | User prompt |
| User choice | 1.3.6.3.2.2 Invoke KB to get response | |
| | 1.3.6.3.2.3 Update tailored item | Tailored item |
| | 1.3.6.3.3 Do: | |
| | 1.3.6.3.3.1 Prompt user to enter absorp. a.c. parasitic rate | User prompt |
| User choice | 1.3.6.3.3.2 Invoke KB to get response | |
| | 1.3.6.3.3.3 Update tailored item | Tailored item |
| | 1.3.7 Do: | |
| | 1.3.7.1 Print cogen minimum perf. menu | Performance menu |
| User choice | 1.3.7.2 Invoke KB to get user response | |
| | 1.3.7.3 Do case of user response: | |
| | 1.3.7.3.1 Do: | |
| | 1.3.7.3.1.1 Prompt user to enter Engine min. perf. rating | User prompt |
| User choice | 1.3.7.3.1.2 Invoke KB to get response | |
| | 1.3.7.3.1.3 Update tailored item | Tailored item |
| | 1.3.7.3.2 Do: | |
| | 1.3.7.3.2.1 Prompt user to enter Silncr h.x. min. UA rating | User prompt |
| User choice | 1.3.7.3.2.2 Invoke KB to get response | |
| | 1.3.7.3.2.3 Update tailored item | Tailored item |
| | 1.3.8 Invoke DN33 to tailor cogen perf. data | |

NOTES:
This is part 2 of HPO 3.3.
This routine is invoked by TAILOR to handle tailoring of cogenerator parameters.

| HPO NUMBER: | MNEMONIC: | AUTHOR: | OUTSIDE SERVICES REQUIRED: |
|---|---|---|---|
| 3.3 | DN3 | DCT | L4: DN14 to tailor setpoints and load priority |
| | | | M5: KB to handle keyboard input |
| TITLE: | | DATE: | L2: DN33 to tailor cogenerator performance data |
| Tailor Cogenerator | | 10/3/85 | |

| INPUT | PROCESS | OUTPUT |
|---|---|---|
|  | 1. Do until user response is null: |  |
|  | 1.1 Print software tailoring menu. | Software tailoring menu |
| User choice | 1.2 Invoke KB to get user response |  |
|  | 1.3 Do case of user response: |  |
|  |    1.3.1 Do: |  |
|  |       1.3.1.1 Print Diagnostic title menu | Diagnostics menu |
| User choice |       1.3.1.2 Invoke KB to get user response |  |
|  |       1.3.1.3 Do case of user response: |  |
|  |          1.3.1.3.1 Do: |  |
|  |             1.3.1.3.1.1 Prompt user to enter | User prompt |
|  |                  the new title |  |
| User choice |             1.3.1.3.1.2 Invoke KB to get response |  |
|  |             1.3.1.3.1.3 Update tailored item | Tailored item |
|  |    1.3.2 Do: |  |
|  |       1.3.2.1 Print Sensor/Actuator title menu | Sensor/Actuator menu |
| User choice |       1.3.2.2 Invoke KB to get user response |  |
|  |       1.3.2.3 Do case of user response: |  |
|  |          1.3.2.3.1 Do: |  |
|  |             1.3.2.3.1.1 Prompt user to enter | User prompt |
|  |                  the new title and units |  |
| User choice |             1.3.2.3.1.2 Invoke KB to get response |  |
|  |             1.3.2.3.1.3 Update tailored item | Tailored item |
|  |    1.3.3 Do: |  |
|  |       1.3.3.1 Print Tabulated report title menu | Report menu |
| User choice |       1.3.3.2 Invoke KB to get user response |  |
|  |       1.3.3.3 Do case of user response: |  |
|  |          1.3.3.3.1 Do: |  |
|  |             1.3.3.3.1.1 Prompt user to enter | User prompt |
|  |                  the new title and units |  |
| User choice |             1.3.3.3.1.2 Invoke KB to get response |  |
|  |             1.3.3.3.1.3 Update tailored item | Tailored item |
|  |    1.3.4 Invoke DN13 to tailor auto report gen. |  |

NOTES:
This is part 1 of a 2 part HIPO.
This routine is invoked by TAILOR to handle tailoring of software parameters.

| HIPO NUMBER: | MNEMONIC: | AUTHOR: | OUTSIDE SERVICES REQUIRED: |
|---|---|---|---|
| 3.4 | DN4 | DCT | L3: DN13 to tailor auto report generation |
|  |  |  | M3: KB to handle keyboard input |
| TITLE: |  | DATE: |  |
| Tailor Software |  | 10/3/85 |  |

| INPUT | PROCESS | OUTPUT |
|---|---|---|
| | 1.3.5 Do: | |
| | 1.3.5.1 Print PID gain constant menu | Gain menu |
| User choice | 1.3.5.2 Invoke KB to get user response | |
| | 1.3.5.3 Do case of user response: | |
| | 1.3.5.3.1 Do: | |
| | 1.3.5.3.1.1 Prompt user to enter the PID gains for eng. TLF loop | User prompt |
| User choice | 1.3.5.3.1.2 Invoke KB to get response | |
| | 1.3.5.3.1.3 Update tailored items | Tailored items |
| | 1.3.5.3.2 Do: | |
| | 1.3.5.3.2.1 Prompt user to enter the PID gains for eng. ELF loop | User prompt |
| User choice | 1.3.5.3.2.2 Invoke KB to get response | |
| | 1.3.5.3.2.3 Update tailored items | Tailored items |
| | 1.3.5.3.3 Do: | |
| | 1.3.5.3.3.1 Prompt user to enter the PID gains for silencer loop | User prompt |
| User choice | 1.3.5.3.3.2 Invoke KB to get response | |
| | 1.3.5.3.3.3 Update tailored items | Tailored items |
| | 1.3.5.3.4 Do: | |
| | 1.3.5.3.4.1 Prompt user to enter the PID gains for dump loop | User prompt |
| User choice | 1.3.5.3.4.2 Invoke KB to get response | |
| | 1.3.5.3.4.3 Update tailored items | Tailored items |
| | 1.3.5.3.5 Do: | |
| | 1.3.5.3.5.1 Prompt user to enter the PID gains for abs. a.c. loop | User prompt |
| User choice | 1.3.5.3.5.2 Invoke KB to get response | |
| | 1.3.5.3.5.3 Update tailored items | Tailored items |
| | 1.3.5.3.6 Do: | |
| | 1.3.5.3.6.1 Prompt user to enter the PID gains for h. valve loop | User prompt |
| User choice | 1.3.5.3.6.2 Invoke KB to get response | |
| | 1.3.5.3.6.3 Update tailored items | Tailored items |
| | 1.3.5.3.7 Do: | |
| | 1.3.5.3.7.1 Prompt user to enter the PID gains for dump v. loop | User prompt |
| User choice | 1.3.5.3.7.2 Invoke KB to get response | |
| | 1.3.5.3.7.3 Update tailored items | Tailored items |
| | 1.3.6 Do: | |
| | 1.3.6.1 Print analog alarm, discrete normal setting menu | Trigger menu |
| User choice | 1.3.6.2 Invoke KB to get user response | |
| | 1.3.6.3 Do case of user response: | |
| | 1.3.6.3.1 Do: | |
| | 1.3.6.3.1.1 Prompt user to enter the new setting | User prompt |
| User choice | 1.3.6.3.1.2 Invoke KB to get response | |
| | 1.3.6.3.1.3 Update tailored item | Tailored item |

NOTES:
This is part 2 of HIPO 3.4
This routine is invoked by TAILOR to handle tailoring of software parameters.

| HIPO NUMBER: | MNEMONIC: | AUTHOR: | OUTSIDE SERVICES REQUIRED: |
|---|---|---|---|
| 3.4 | DM4 | DCT | L3: DN13 to tailor auto report generation |
| | | | M5: KB to handle keyboard input |
| TITLE: | | DATE: | |
| Tailor Software | | 10/3/85 | |

| INPUT | PROCESS | OUTPUT |
|---|---|---|
| Silencer loop PI gains, sense point, set point | 1. Execute PI control of silencer bypass valve | Valve setting |

NOTES:
This is an IPCD supplied routine to perform PI control. The gains and the set point are downloaded from the 627 supervisory control routine.

| HIPO NUMBER: | MNEMONIC: | AUTHOR: | OUTSIDE SERVICES REQUIRED: |
|---|---|---|---|
| 4.1.1 | PI1 | DL | None |
| TITLE: Silencer bypass PI control loop | | DATE: 10/3/85 | |

| INPUT | PROCESS | OUTPUT |
|---|---|---|
| Dump jacket loop PI gain constants, sense point, set point | 1. Execute PI control of dump jacket fan | Fan setting |

NOTES:
This is an IPCD supplied routine to perform PI control. The gains and the set point are downloaded from the 627 supervisory control routine.

| HIPO NUMBER: | MNEMONIC: | AUTHOR: | OUTSIDE SERVICES REQUIRED: |
|---|---|---|---|
| 4.1.2 | PI2 | DL | None |
| TITLE: Dump jacket fan PI control loop | | DATE: 10/3/85 | |

| INPUT | PROCESS | OUTPUT |
|---|---|---|
| Cogen enable signal | 1. If the engine is enabled, then: | |
| Engine loop PI gain constants, sense point, set point | 1.1 Execute PI control of engine throttle | Throttle setting |
| Tailored constraints | 1.2 If throttle setting is less than idle speed, set the throttle at the idle setting | Throttle setting |
| Warm up timer | 1.3 If the warm up timer is active and has not expired, set the throttle at the idle setting | Throttle setting |

NOTES:
This is an IPCD supplied routine to perform PI control. The gains and the set point are downloaded from the 627 supervisory control routine.

| HIPO NUMBER: | MNEMONIC: | AUTHOR: | OUTSIDE SERVICES REQUIRED: |
|---|---|---|---|
| 4.1.3 | P13 | DL | None |
| TITLE: Engine throttle PI control loop. | | DATE: 10/3/85 | |

| INPUT | PROCESS | OUTPUT |
|---|---|---|
| Heat loop valve PI gain constants, sense point, set point | 1. Execute PI control of heat loop inlet valve | Valve setting |

NOTES:
This is an IPCD supplied routine to perform PI control. The gains and the set point are downloaded from the 627 supervisory control routine.

| HIPO NUMBER: | MNEMONIC: | AUTHOR: | OUTSIDE SERVICES REQUIRED: |
|---|---|---|---|
| 4.1.4 | P14 | DL | None |
| TITLE: Heat loop inlet valve PI control loop | | DATE: 10/3/85 | |

| INPUT | PROCESS | OUTPUT |
|---|---|---|
| Absorption a.c. enable Abs. a.c. inlet valve PI gain constants, sense point, set point | 1. If the absorption a.c. unit is enabled, then: 1.1 Execute PI control of absorption a.c. inlet valve | Valve setting |

NOTES:
This is an IPCD supplied routine to perform PI control. The gains and the set point are downloaded from the 627 supervisory control routine.

| HIPO NUMBER: | MNEMONIC: | AUTHOR: | OUTSIDE SERVICES REQUIRED: |
|---|---|---|---|
| 4.1.5 | P15 | DL | None |
| TITLE: Absorption a.c. inlet valve PI control loop | | DATE: 10/3/85 | |

| INPUT | PROCESS | OUTPUT |
|---|---|---|
| Dump jacket valve PI gain constants, sense point, set point | 1. Execute PI control of dump jacket inlet valve | Valve setting |

NOTES:
This is an IPCD supplied routine to perform PI control. The gains and the set point are downloaded from the 627 supervisory control routine.

| HIPO NUMBER: 4.1.6 | MNEMONIC: PI6 | AUTHOR: DL | OUTSIDE SERVICES REQUIRED: None |
|---|---|---|---|
| TITLE: Dump jacket inlet valve PI control loop | DATE: 10/3/85 | | |

| INPUT | PROCESS | OUTPUT |
|---|---|---|
| Sensor reading, normal limits | 1. Do, for each analog input (i): <br> 1.1 If the sensor is out of range, then set the Warning flag | Warning flag |

NOTES:
This routine performs a range check on the analog input sensors.

| HIPO NUMBER: 4.2 | MNEMONIC: RANGE | AUTHOR: DL | OUTSIDE SERVICES REQUIRED: None |
|---|---|---|---|
| TITLE: Analog sensor range checker | DATE: 10/3/85 | | |

| INPUT | PROCESS | OUTPUT |
|---|---|---|
| Cogen enable, off delay timer | 1. If ACT(20) = 1 or off delay timer is active and unexpired, then turn on ACT(9) | Jacket pump discrete |
| Jacket pump status | 2. If the jacket pump is on, turn on ACT(10) | HX boost pump |
| ALARM, WARN flags | 3. If no alarms or warnings, turn on ACT(11) | Cogen okay lamp |
| WARN flag | 4. If a warning exists, turn on ACT(12) | Cogen warning lamp |
| ALARM flag | 5. If an alarm exists, then: Turn on ACT(13) | Cogen alarm lamp |
| ALARM, MODE | 6. If an alarm exists, or MODE=OFF, then turn off ACT(20) | Cogen enable |
| Heat loop valve setting | 7. If the ACT(4) > 0, or off delay timer is active and unexpired, then turn on ACT(17) | Heat loop boost pump |
| Off delay timer | | |
| Abs. a.c. present flag, Call for cooling, Cogen enable, heat loop pump, a.c. disable, mixed Silner outlet temp, a.c. min. on timer | 8. If ITL(3)=1 and SENS(33)=1 and ACT(20)=1 and ACT(17)=1 and SENS(31)<>1 and SENS(4)>TL(23) with a 10 degree deadband and TL(20) active and unexpired, then: <br> 9.1 Turn on ACT(16) <br> 9.2 Turn on ACT(18) | Absorption a.c. enable <br> Cool loop boost pump |

NOTES:
This routine controls the discrete outputs of the CCS-2C controller. The setpoints and timer settings are downloaded from the 627 supervisory control routine. ALARM and WARN may also be set by the supervisor.

| HIPO NUMBER: | MNEMONIC: | AUTHOR: | OUTSIDE SERVICES REQUIRED: |
|---|---|---|---|
| 4.3 | DSCRET | DL | None |

| TITLE: | DATE: |
|---|---|
| Discrete control routine | 10/3/85 |

| INPUT | PROCESS | OUTPUT |
|---|---|---|
| Safety package sens., Engine jacket inlet, Dump jacket setting, ALARM flag, controller status flags | 1. If any of SENS(25,32,28,29,30) are set, or If SENS(1)>TL(24)+10, or ALARM is set, or TBD controller status exists, then: <br> 1.1 Set ALARM <br> 1.2 Reset ACT(20) | Alarm flag <br> Cogen enable |

NOTES:
This is the engine safety package routine. The setpoint for the engine overtemperature comparison is downloaded from the supevisory control routine in the 627. ALARM may also be set by the supervisor. Some internal 620 status flags are also used.

| HIPO NUMBER: | MNEMONIC: | AUTHOR: | OUTSIDE SERVICES REQUIRED: |
|---|---|---|---|
| 4.4 | SAFETY | DL | 621-0004 SDM card |

| TITLE: | DATE: |
|---|---|
| Engine safety package | 10/3/85 |

| INPUT | PROCESS | OUTPUT |
|---|---|---|
| | FREADn | |
| Intertask comm. buff. | 1. Open ITCBm file in read mode <br> 2. GET data file content and load into data structure <br> 3. Close the file | Current data |
| | FWRITn | |
| Current data | 1. Open ITCBm file in update mode <br> 2. PUT data to the file <br> 3. Close the file | Intertask comm. buff. |

NOTES:
This diagram represents a generic FREAD FWRIT pair. These routines are used to read and write to the intertask communication buffer files ITCB1 - ITCB12. The "n" suffix on FREAD and FWRIT matches the numberic suffix of the intertask communication buffer file. See Table A5 int the appendix for a description of the content of the files.

| HIPO NUMBER: | MNEMONIC: | AUTHOR: | OUTSIDE SERVICES REQUIRED: |
|---|---|---|---|
| C1 - C24 | FREAD,FWRIT | DCT | Intertask communcation buffers ITCB1 - ITCB12 |

| TITLE: Read intertask communication buffer, Write intertask comm. buffer | DATE: 10/3/85 |
|---|---|

| INPUT | PROCESS | OUTPUT |
|---|---|---|
| Mode of call | 1. Do case of mode of call: | |
| | 1.1 Do: | |
| Electrical load | 1.1.1 Locate throttle settings which bracket the needed electrical generation | |
| | 1.1.2 Interpolate | Rated: Throttle setting, thermal to heating, thermal to cooling, cooling out |
| | 1.2 Do: | |
| Heating load | 1.2.1 Locate throttle settings which bracket the needed thermal generation | |
| | 1.2.2 Interpolate | Rated: Throttle setting, elec. generated, thermal to cooling, cooling out |
| | 1.3 Do: | |
| Cooling load | 1.3.1 Locate throttle settings which bracket the needed cooling generation | |
| | 1.1.2 Interpolate | Rated: Throttle setting, thermal to heating, thermal to cooling, elec. generated |
| | 1.4 Do: | |
| Thermal to cooling load | 1.4.1 Locate throttle settings which bracket the needed thermal to cooling generation | |
| | 1.1.2 Interpolate | Rated: Throttle setting, thermal to heating, electrical generated, cooling out |
| Throttle setting, elec. gen., heat gen., cooling gen., thermal to cooling, silncr UA | 1.5 Do: | |
| | 1.5.1 Locate throttle range which brackets input throttle setting | |
| | 1.5.2 Average in new values | Updated actual data |
| | 1.5.3 Increment observation count | Updated actual count |
| | 1.6 Reset all Actual values to Rated values, zero all observation counts | Updated Actual data Updated Actual count |

NOTES:
This utility routine manages both read and write access to the cogenerator performance data table.

| HIPO NUMBER: | MNEMONIC: | AUTHOR: | OUTSIDE SERVICES REQUIRED: |
|---|---|---|---|
| D2 | TABLE | DCT | None |
| TITLE: | | DATE: | |
| Cogen performance table manager | | 10/3/85 | |

| INPUT | PROCESS | OUTPUT |
|---|---|---|
| | 1. Invoke TIME | |
| Time, day of week | 2. Load: Scheduled mode, On peak/Off peak flag, Cost of electricity, value of sold elec., Cost of aux cooling fuel, aux heating fuel, Cogenerator fuel, and demand penalty | MODES, IPEAK,CER,CES CXC,CXH,CCG,DEM |

NOTES:
This utility routine looks up the scheduled mode, the peak status and various prices and costs.

| HIPO NUMBER: | MNEMONIC: | AUTHOR: | OUTSIDE SERVICES REQUIRED: |
|---|---|---|---|
| D3 | LOOKUP | DCT | T1: TIME to get time and day of week |
| TITLE: | | DATE: | |
| Cost/schedule lookup routine | | 10/3/85 | |

| INPUT | PROCESS | OUTPUT |
|---|---|---|
| Mode of call | 1. Do case of mode of call: | |
| On peak flag | 1.1 If On peak flag is set, then Do: | |
| Elec. imported | 1.1.1 If current import>max so far, then: | |
| | 1.1.1.1 Invoke TIME | |
| Elec. generated | 1.1.1.2 Set new max for import, gen.&time | Max peaks, time |
| | 1.2 Print peak info | Peak status report |
| | 1.3 Load: Import peak, generated and time | Max peaks, time |
| | 1.4 Set max import peak to zero | Max import peak |

NOTES:
This utility routine: 1) Tracks the import peak, corresponding electrical generated and time of occurrence, 2) Prints reports on same, 3) Returns current peak values or 4) Resets the peak observed to zero.

| HIPO NUMBER: | MNEMONIC: | AUTHOR: | OUTSIDE SERVICES REQUIRED: |
|---|---|---|---|
| D4 | RATCH | DCT | T1: TIME to get current time and date |
| TITLE: | | DATE: | |
| Peak import tracker | | 10/3/85 | |

| INPUT | PROCESS | OUTPUT |
|---|---|---|
| | 1. Do until user response is null: | |
| | 1.1 Print main profile menu | Main profile menu |
| User choice | 1.2 Invoke KB to get user choice | |
| | 1.3 Do case of user choice: | |
| | 1.3.1 Do: | |
| | 1.3.1.1 Print day of week menu | Day of week menu |
| Day of week | 1.3.1.2 Invoke KB to get user response | |
| | 1.3.1.2.1 Print hour of day menu | Hour of day menu |
| Hour of day | 1.3.1.2.2 Invoke KB to get user response | |
| | 1.3.1.2.2.2 Print profile menu | Profile menu |
| User choice | 1.3.1.2.2.3 Invoke KB to get user resp. | |
| | 1.3.1.2.2.4 Print current profile | Current profile |
| | 1.3.1.2.2.5 Print menu of choices to | |
| | chanage the entry to | Profile choices menu |
| User choice | 1.3.1.2.2.5.1 Invoke KB to get resp. | |
| | 1.3.1.2.2.5.2 Update tailored item and | |
| | all hours following | Tailored items |
| | 1.3.2 Do: | |
| | 1.3.2.1 Prompt user to enter the ratchet | User prompt |
| | period | |
| User response | 1.3.2.2 Invoke KB to get response | Ratchet period |

NOTES:

This utility routine is part of both the Monitor and Tailor packages. It is designed to handle tailoring of scheduled mode of operation and demand period construction.

| HIPO NUMBER: | MNEMONIC: | AUTHOR: | OUTSIDE SERVICES REQUIRED: |
|---|---|---|---|
| L1 | DN12 | DCT | M5: KB to handle keyboard input |
| TITLE: Tailor Profiles | | DATE: 10/3/85 | |

| INPUT | PROCESS | OUTPUT |
|---|---|---|
| | 1. Do until user response is null: | |
| | 1.1 Print menu of performance data categories | Performance menu |
| User choice | 1.2 Invoke KB to get user response | |
| | 1.3 Do case of user response: | |
| | 1.3.1 Do: | |
| |   1.3.1.1 Invoke TPRINT to print the performance table | Performance data table |
| |   1.3.1.2 Print menu of ways to change table | Change menu |
| User choice |   1.3.1.3 Invoke KB to get user response | |
| |   1.3.1.4 Do case of user response: | |
| |     1.3.1.4.1 Move Rated fuel usage column to Actual column, reset observ. | Updated performance table |
| |     1.3.1.4.2 Move Actual fuel usage column to Rated column | |
| |     1.3.1.4.3 Do: | |
| |       1.3.1.4.3.1 Prompt user to specify range to modify | User prompt |
| User input |       1.3.1.4.3.2 Invoke KB to get response | |
| |       1.3.1.4.3.3 Prompt user to specify new value | User prompt |
| User input |       1.3.1.4.3.4 Invoke KB to get response | |
| |       1.3.1.4.3.5 Update fuel usage Rated cell | Updated perf. table |
| |     1.3.1.4.4 Do: | |
| |       1.3.1.4.4.1 Prompt user to specify range to modify | User prompt |
| User input |       1.3.1.4.4.2 Invoke KB to get response | |
| |       1.3.1.4.4.3 Prompt user to specify new value | User prompt |
| User input |       1.3.1.4.4.4 Invoke KB to get response | |
| |       1.3.1.4.4.5 Update fuel usage Actual cell | Updated perf. table |
| | 1.3.2 Same procedure for Electrical generated | Updated perf. table |
| | 1.3.3 Same procedure for Heating generated | Updated perf. table |
| | 1.3.4 Same procedure for Thermal to cooling | Updated perf. table |
| | 1.3.5 Same procedure for Cooling generated | Updated perf. table |
| | 1.3.6 Same procedure for Silencer UA | Updated perf. table |

NOTES:

This routine handles the tailoring of the cogenerator performance data table.

| HIPO NUMBER: | MNEMONIC: | AUTHOR: | OUTSIDE SERVICES REQUIRED: |
|---|---|---|---|
| L2 | DN33 | DCT | Performance data table |
| | | | M5: KB to handle keyboard input |
| TITLE: Tailor performance data table | | DATE: 10/3/85 | |

| INPUT | PROCESS | OUTPUT |
|---|---|---|
| | 1. Do until user response is null: | |
| | 1.1 Print menu of reports | Report menu |
| User choice | 1.2 Invoke KB to get user's choice to change | |
| | 1.3 Prompt user to enter the report's destination phone number | User prompt |
| User choice | 1.4 Invoke KB to get user response | Report data structure |
| | 1.5 If report type is a tabulated data report then Do case of report type: | |
| | 1.5.1 Set interval to 60 minutes | Report data structure |
| | 1.5.2 Set interval to 24 hours | |
| | 1.5.3 Set interval to monthly | |
| | 1.5.4 Set interval to yearly | |
| | Else: | |
| | 1.5.5 Prompt user to enter the report intrvl | User prompt |
| User choice | 1.5.6 Invoke KB to get user response | Report data structure |

NOTES:
This routine handles the tailoring of the automatic generation of reports.

| HIPO NUMBER: | MNEMONIC: | AUTHOR: | OUTSIDE SERVICES REQUIRED: |
|---|---|---|---|
| L3 | DN13 | DCT | M5: KB to handle keyboard input |
| TITLE: Tailor report schedule | | DATE: 10/3/85 | |

| INPUT | PROCESS | OUTPUT |
|---|---|---|
| | 1. Do until user response is null: | |
| | 1.1 Print Setpoint tailoring menu | Setpoint tailoring menu |
| User choice | 1.2 Invoke KB to get user response | |
| | 1.3 Do case of user response: | |
| | 1.3.1 Do: | |
| | 1.3.1.1 Prompt user to enter the heating setpoint | User prompt |
| User choice | 1.3.1.2 Invoke KB to get user response | |
| | 1.3.1.3 Update tailored item | Tailored item |
| | 1.3.2 Do: | |
| | 1.3.2.1 Prompt user to enter the cooling setpoint | User prompt |
| User choice | 1.3.2.2 Invoke KB to get user response | |
| | 1.3.2.3 Update tailored item | Tailored item |
| | 1.3.3 Do: | |
| | 1.3.3.1 Prompt user to enter the cooling hot inlet setpoint | User prompt |
| User choice | 1.3.3.2 Invoke KB to get user response | |
| | 1.3.3.3 Update tailored item | Tailored item |
| | 1.3.4 Do: | |
| | 1.3.4.1 Prompt user to enter the silencer incremental setup | User prompt |
| User choice | 1.3.4.2 Invoke KB to get user response | |
| | 1.3.4.3 Update tailored item | Tailored item |
| | 1.3.5 Do: | |
| | 1.3.5.1 Prompt user to enter the dump jacket setpoint | User prompt |

| | | |
|---|---|---|
| User choice | 1.3.5.2 Invoke KB to get user response | |
| | 1.3.5.3 Update tailored item | Tailored item |
| | 1.3.6 Do: | |
| | 1.3.6.1 Prompt user to enter the LIMit mode setpoint | User prompt |
| User choice | 1.3.6.2 Invoke KB to get user response | |
| | 1.3.6.3 Update tailored item | Tailored item |
| | 1.3.7 Do: | |
| | 1.3.7.1 Prompt user to enter the FIX mode setpoint. | User prompt |
| User choice | 1.3.7.2 Invoke KB to get user response | |
| | 1.3.7.3 Update tailored item | Tailored item |
| | 1.3.8 Do: | |
| | 1.3.8.1 Prompt user to enter the heating/ cooling load priority | User prompt |
| User choice | 1.3.8.2 Invoke KB to get user response | |
| | 1.3.8.3 Update tailored item | Tailored item |

NOTES:
This utility routine is invoked to handle tailoring of cogenerator setpoints.

| HIPO NUMBER: | MNEMONIC: | AUTHOR: | OUTSIDE SERVICES REQUIRED: |
|---|---|---|---|
| L4 | DN14 | DCT | |
| | | | M5: KB to handle keyboard input |
| TITLE: | | DATE: | |
| Tailor Cogenerator setpoints | | 10/3/85 | |

| INPUT | PROCESS | OUTPUT |
|---|---|---|
| | 1. Invoke HPRINT, print header | Header of report |
| | 2. Print "WARNINGS:" | Warning report header |
| | 3. Do, for each warning message: | |
| Diagnostic msgs. data structure | 3.1 If message is active, then: | |
| | 3.1.1 Print message | Diagnostic report |
| | 3.1.2 Print associated time | |
| | 3.1.3 Print acknowledge status | |
| | 4. If no warning msgs. active, print "NONE" | |
| | 5. Print "ALARMS:" | Alarm report header |
| | 6. Do, for each alarm message | |
| Diagnostic msgs. data structure | 6.1 If message is active, then: | |
| | 6.1.1 Print message | Diagnostic report |
| | 6.1.2 Print associated time | |
| | 6.1.3 Print acknowledge status | |
| | 7. If no alarms are active, Print "NONE" | |
| | 8. Print "NOTICES:" | Notice report header |
| | 9. Do, for each diagnostic message | |
| Diagnostic msgs. data structure | 9.1 If message is active, then: | |
| | 9.1.1 Print message | Diagnostic report |
| | 9.1.2 Print associated time | |
| | 9.1.3 Print acknowledge status | |
| | 10. If no notices are active, Print "NONE" | |

NOTES:
This routine prints the diagnostic messages. The data structure defining the messages consists of three parts for each message: The number and text of the message, the ack status (inactive, ack, no-ack), and a character string containing the time of occurrence.

| HIPO NUMBER: | MNEMONIC: | AUTHOR: | OUTSIDE SERVICES REQUIRED: |
|---|---|---|---|
| M1 | STATUS | DCT | M6: HPRINT to print report header |
| TITLE: | | DATE: | |
| Diagnostic status report printer | | 10/3/85 | |

| INPUT | PROCESS | OUTPUT |
|---|---|---|
| | 1. Invoke HPRINT, print header | Header of report |
| | 2. Print "SENSOR REPORT:" | Sensor report header |
| | 3. Do, for each sensor: | |
| Sensor titles | 3.1 Print sensor number and title | Sensor report |
| Sensor readings | 3.1.2 Print sensor reading | |
| Sensor units | 3.1.3 Print sensor units | |
| | 4. Print "ACTUATORS:" | Actuator report header |
| | 5. Do, for each actuator | |
| Actuator titles | 5.1 Print actuator number and title | Actuator report |
| Actuator settings | 5.2 Print actuator setting | |
| Actuator units | 5.3 Print actuator units or meaning | |

NOTES:
This routine prints the sensor/actuator report. Data structures exist which contain the sensor or actuator number, name and units.

| HIPO NUMBER: | MNEMONIC: | AUTHOR: | OUTSIDE SERVICES REQUIRED: |
|---|---|---|---|
| M2 | SENSOR | DCT | M6: HPRINT to print report header |
| TITLE: | | DATE: | |
| Sensor/actuator report printer | | 10/3/85 | |

| INPUT | PROCESS | OUTPUT |
|---|---|---|
| Report type | 1. Invoke HPRINT, print header | Report header |
| | 2. Do, for each "bank" of 4 tabulations: | |
| Tabulated data titles | 2.1 If first line of bank, then print titles | Table titles |
| Report type | 2.2 If not an hourly report, then: | |
| | 2.2.1 Do for each line of this bank (24,31,12): | |
| | 2.2.1.1 Invoke ARCH | |
| Archived data | 2.2.1.2 Print archived data | Report body |
| Tabulated data totals | 2.3 Print period totals and units | Report bottom line |
| and units for this table | | |

NOTES:
This utility routine is used to print archived data and tabulated data totals in a matrix or table form.

| HIPO NUMBER: | MNEMONIC: | AUTHOR: | OUTSIDE SERVICES REQUIRED: |
|---|---|---|---|
| M3 | MATRIX | DCT | M6: HPRINT to print header |
| | | | M3.1: ARCH to retrieve archived data |
| TITLE: | | DATE: | |
| Tabulated data report printer | | 10/4/85 | |

| INPUT | PROCESS | OUTPUT |
|---|---|---|
| | 1. Invoke HPRINT, print part 1 header | Report header |
| | 2. Do for each of 10 bins: | |
| Engine perf. data | 2.1 Print throttle range | Report part 1 |
| | 2.2 Print rated fuel usage | |
| | 2.3 Print actual fuel usage | |
| | 2.4 Print number of observations | |
| | 2.5 Print rated electrical output | |
| | 2.6 Print actual electrical output | |
| | 2.7 Print number of observations | |
| | 3. Print part 2 header | Report part 2 header |
| | 4. Do for each of 10 bins: | |
| Engine perf. data | 4.1 Print throttle range | Report part 2 |
| | 4.2 Print rated heat output | |
| | 4.3 Print actual heat output | |
| | 4.4 Print number of observations | |
| | 4.5 Print rated thermal to cooling output | |
| | 4.6 Print actual thermal to cooling output | |
| | 4.7 Print number of observations | |
| | 4.8 Print rated cooling output | |
| | 4.9 Print actual cooling output | |
| | 4.10 Print number of observations | |
| | 5. Print part 3 header | Report part 3 header |
| | 6. Do for each of 10 bins: | |
| Engine perf. data | 6.1 Print throttle range | Report part 3 |
| | 6.2 Print rated silencer UA | |
| | 6.3 Print actual silencer UA | |
| | 6.4 Print number of observations | |

NOTES:
This utility routine is used to print the cogenerator performance data table.

| HIPO NUMBER: | MNEMONIC: | AUTHOR: | OUTSIDE SERVICES REQUIRED: |
|---|---|---|---|
| M4 | TPRINT | DCT | Engine performance data file |
| | | | M6: HPRINT to print the header |
| TITLE: | | DATE: | |
| Performance table printer | | 10/4/85 | |

| INPUT | PROCESS | OUTPUT |
|---|---|---|
| Character from k.b. | 1. Invoke Inkey | |
| | 2. If non-null input character, then: | |
| Logout flag | 2.1 If Logout flag is set, then: | |
| | 2.1.1 Invoke PWORD | |
| | Else: | |
| | 2.1.2 If incoming character is a backspace | |
| | then: Drop last character from input | Input buffer |
| | buffer and decrement count | Buffer count |
| | 2.1.3 If incoming character is legal, then: | |
| | 2.1.3.1 Append it to the buffer, incr. count | Input buffer, count |
| | 2.1.3.2 Reset no input timer | No input timer |
| | 2.1.4 If incoming character is a carriage | |
| | return, or if input buffer full, then: | |

|                  |                                                              |                        |
|------------------|--------------------------------------------------------------|------------------------|
|                  | 2.1.4.1 Reset Total, flags                                   | Total, Dec & Min flags |
|                  | 2.1.4.2 Do for each character in the buffer:                 |                        |
|                  | 2.1.4.2.1 If character is numeric, then:                     |                        |
|                  | 2.1.4.2.1.1 If dec. point has been seen:                     |                        |
|                  | 2.1.4.2.1.1.1 Total=                                         |                        |
|                  | Total+10**Dec*Char                                           | Total                  |
|                  | 2.1.4.2.1.1.2 Dec=Dec-1                                      |                        |
|                  | Else:                                                        |                        |
|                  | 2.1.4.2.1.1.3 Total=Total*10+Char                            | Total                  |
|                  | 2.1.4.2.2 If char is non-numeric, then:                      |                        |
|                  | 2.1.4.2.2.1 If "-" set Min. If Min already set, then error   | Min flag               |
|                  | 2.1.4.2.2.2 If "." set Dec=-1. If Dec already set, then error | Dec flag              |
| Mode of call     | 2.1.4.3 Round off Total if integer expected                  | Total                  |
| No input timer   | 3. If no input timer has expired, then set Logout flag       | Logout flag            |

NOTES:
This utility routine is used by many of the menu driven modules which expect only integer or real values to be input by the user. It collects ascii characters, does line editing and interprets the resulting input buffer as either a real or integer number.

| HIPO NUMBER:              | MNEMONIC: | AUTHOR: | OUTSIDE SERVICES REQUIRED:                        |
|---------------------------|-----------|---------|---------------------------------------------------|
| M5                        | KB        | DCT     | M5.1: Inkey, an IPCD supplied keyboard scan routine. |
| TITLE:                    |           | DATE:   | M5.2: PWORD to check for valid user               |
| Keyboard input executive  |           | 10/4/85 |                                                   |

| INPUT          | PROCESS                                             | OUTPUT       |
|----------------|-----------------------------------------------------|--------------|
|                | 1. Prompt user to enter the password                | User prompt  |
| User response  | 2. Get user input                                   |              |
| Password       | 3. If user input = password, then set Login flag    | Login flag   |
|                | also reset login flag                               | Login flag   |

NOTES:
This routine validates the user. It is invoked by KB any time that a character is detected at the keyboard and the login flag is not currently set. The password is hard coded into the software.

| HIPO NUMBER:      | MNEMONIC: | AUTHOR: | OUTSIDE SERVICES REQUIRED: |
|-------------------|-----------|---------|----------------------------|
| M5.2              | PWORD     | DCT     | None                       |
| TITLE:            |           | DATE:   |                            |
| Password checker  |           | 10/4/85 |                            |

| INPUT | PROCESS | OUTPUT |
|---|---|---|
| | 1. Invoke TIME | |
| Time and date | 2. Print Date, Banner and time | Banner |
| Mode of call | 3. Do case of mode of call: | |
| |    3.1 Print "DIAGNOSTIC STATUS:" | Header |
| |    3.2 Print "SENSOR/ACTUATOR REPORT:" | Header |
| |    3.3 Print "HOURLY TABULATED DATA REPORT:" | Header |
| |    3.4 Print "DAILY TABULATED DATA REPORT:" | Header |
| |    3.5 Print "MONTHLY TABULATED DATA REPORT" | Header |
| |    3.6 Print "YEARLY TABULATED DATA REPORT:" | Header |
| |    3.7 Print "COGEN PERFORMANCE REPORT:" | Header |

NOTES:
This utility routine prints a banner and a header for the various reports.

| HIPO NUMBER: | MNEMONIC: | AUTHOR: | OUTSIDE SERVICES REQUIRED: |
|---|---|---|---|
| H6 | HPRINT | DCT | T1: TIME to get date and time |
| TITLE: | | DATE: | |
| Header printer | | 10/5/85 | |

| INPUT | PROCESS | OUTPUT |
|---|---|---|
| | TIME | |
| Real time clock | 1. Do until a valid date and time are returned: | |
| |   1.1 Get the date and time and day of week | Date and time and day |
| | TIMSET | |
| | 1. Invoke TIME | |
| Date and time | 2. Set timer | Timer |
| | DELTAT | |
| | 1. Invoke TIME | |
| Timer setting | 2. Compute elapsed time | Delta time |

NOTES:
Shown here are three time and timer related utility routines. TIME accesses the real time clock to return the date and the time. TIMSET initializes a timer to the current time. DELTAT computes the elapsed time on an active timer.

| HIPO NUMBER: | MNEMONIC: | AUTHOR: | OUTSIDE SERVICES REQUIRED: |
|---|---|---|---|
| T1, T2 and T3 | TIME, etc. | DCT | Real time clock |
| TITLE: Get time, Set timer, | | DATE: | |
| Compute elapsed time | | 10/03/85 | |

APPENDIX II

```
+-------------------------------------------------------------+
!TITLE:Cogeneration Controls Subsystem CCS-2C    Rev 08!
+-------------------------------------------------------------+
!     620-20 Rev 0?         623-50 Firmware Code 33!
+---------------+--+------------------------------------------+
!DATE:02/10/86! !PROGRAMMER:D.LYDEN TSC/W.E.WARE IFCD !
+---------------+--+------------------------------------------+
```

[IPC620-020 MEM SZ= 8K FREE MEM= 5024 STAND ALONE PROGRAMMER]

```
        directory of .  11:46:56
    CMDS            TAILOR          DN12            CONSOL
    CCS             START           KB              ITCB1
    ITCB3           ITCB4           ITCB5           ITCB6
    ITCB7           ITCB8           ITCB9           ITCB10
    ITCB11          ITCB12          ITCB13          ITCB14
    ITCB15          ITCB16
```

```
PROCEDURE TAILOR
  0000      DIM SEL:INTEGER
  0007      DIM ZINT,ONER:BYTE; XT:REAL
  0018      DIM TL(80):REAL; ITL(56):INTEGER
  002F      DIM PN:INTEGER
  0036      DIM SS2$,SS$,SSD$(5):STRING[8]
  004F      DIM MIT$:STRING[6]
  005B      DATA "DN11","DN2","DN3","DN4","DN12"," 1.5"
  0086      DATA 0,1,"KB"
  0095      SHELL "LOAD M1"
  00A0      SHELL "LOAD NINKEY"
  00AF      FOR PN=1 TO 5
  00BF         READ SSD$(PN)
  00C8      NEXT PN
  00D3      READ MIT$
  00D8      OPEN #PN,"ITCB3":READ
  00E8      GET #PN,TL
  00F2      GET #PN,ITL
  00FC      CLOSE #PN
  0102      READ ZINT,ONER,SS2$
  010F  2
  0113      PRINT " 1. OFF-LINE TAILORING PACKAGE"
  0135      PRINT "    1. COSTS "
  0146      PRINT "    2. HVAC SPECIFICATIONS"
  0164      PRINT "    3. COGENERATOR PACKAGE SPECIFICATIONS"
  0191      PRINT "    4. SOFTWARE PARAMETERS"
  01AF      PRINT "    5. SCHEDULES AND RATCHET"
  01CF      PRINT "    0. QUIT"
  01DE      PRINT " SELECT (0 - 5) : ";
  01F5      RUN SS2$(ZINT,SEL,XT)
  0209      IF SEL>5 OR SEL<0 THEN GOTO 2
  021F      ENDIF
  0221      IF SEL=0 THEN
  022D         OPEN #PN,"ITCB3":UPDATE
  023D         PUT #PN,TL
  0247         PUT #PN,ITL
  0251         CLOSE #PN
  0257         KILL SS2$
  025C         SHELL "UNLINK INKEY"
  026C         SHELL "UNLINK M1"
  0279      ELSE
  027D         SS$=SSD$(SEL)
  0288         IF SEL=5 THEN RUN SS$(TL,ITL,MIT$)
  02A7         ELSE
```

```
02AB            RUN SS$(TL,ITL)
02BA          ENDIF
02BC          KILL SS$
02C1          GOTO 2
02C5        ENDIF

PROCEDURE DN11
  0000        PARAM TL(80):REAL; ITL(56):INTEGER
  0017        DIM SS$:STRING[8]
  0023        DIM ZINT,ONER:BYTE; XT:REAL
  0034        DIM SEL,SEL1:INTEGER
  003F        DATA 0,1,"KB"
  004E        READ ZINT,ONER,SS$
  005B 5
  005F        PRINT " 1.1 COSTS"
  006D        PRINT "    1. DEMAND PERIOD ELEC. BUY RATE ($/KWH)   : ";
  00A3        PRINT TL(1)
  00AA        PRINT "    2. OFF DEMAND ELEC. BUY RATE ($/KWH)      : ";
  00E0        PRINT TL(2)
  00E7        PRINT "    3. DEMAND PERIOD ELEC. SALES RATE ($/KWH) : ";
  011D        PRINT TL(3)
  0124        PRINT "    4. OFF DEMAND ELEC SALES RATE ($/KWH)     : ";
  015A        PRINT TL(4)
  0161        PRINT "    5. AUXILIARY HEATING FUEL RATE ($/MBTU)   : ";
  0197        PRINT TL(5)
  019E        PRINT "    6. AUXILIARY COOLING FUEL RATE ($/MBTU)   : ";
  01D4        PRINT TL(51)
  01DB        PRINT "    7. COGENERATOR ENGINE FUEL RATE ($/MBTU)  : ";
  0211        PRINT TL(7)
  0218        PRINT "    8. RATCHET PERIOD DEMAND CHARGE           : ";
  024E        PRINT TL(9)
  0255        PRINT "    0. QUIT"
  0265        PRINT " SELECT (0 - 8) : ";
  027C        RUN SS$(ZINT,SEL,XT)
  0290        IF SEL<0 OR SEL>8 THEN GOTO 5
  02A6        ENDIF
  02A8        IF SEL=0 THEN END
  02B5        ENDIF
  02B7        PRINT " 1.1."; SEL; " ENTER THE NEW RATE OR CHARGE : ";
  02E8        RUN SS$(ONER,SEL1,XT)
  02FC        IF SEL=7 OR SEL<6 THEN TL(SEL)=XT
  031A        ELSE
  031E          IF SEL=6 THEN TL(51)=XT
  0334          ENDIF
  0336          IF SEL=8 THEN TL(9)=XT
  034C          ENDIF
  034E        ENDIF
  0350        GOTO 5
  0354 100

PROCEDURE DN2
  0000        PARAM TL(80):REAL; ITL(56):INTEGER
  0017        DIM SEL,IT:INTEGER; ZINT,ONER:BYTE; TEMPR,XT:REAL
  0036        DIM SS$:STRING[4]
  0042        DATA 0,1,"KB"
  0051        READ ZINT,ONER,SS$
  005E 5
  0062        PRINT " 1.2 HVAC SPECIFICATIONS"
  007E        PRINT "     1. AUXILIARY HEATING SYSTEM"
  00A2        PRINT "     2. AUXILIARY COOLING SYSTEM"
  00C6        PRINT "     3. BUILDING HEAT LOOP FLOW RATE (GPM) : ";
  00F8        PRINT TL(13)/499.8
  0106        PRINT "     4. BUILDING COOL LOOP FLOW RATE (GPM) : ";
  0138        PRINT TL(14)/499.8
  0146        PRINT "     0. QUIT"
  0156        PRINT " SELECT (0 - 4) : ";
  016D        RUN SS$(ZINT,SEL,XT)
  0181        IF SEL<0 OR SEL>4 THEN GOTO 5
  0197        ENDIF
```

```
0199        ON SEL+1 GOSUB 100,10,20,30,30
01B7        GOTO 5
01BB  10
01BF        PRINT " 1.2.1 AUXILIARY HEATING SYSTEM"
01E2        PRINT "        1. GAS";
01F4        IF ITL(1)=1 THEN PRINT "     <- CURRENT";
0216        ENDIF
0218        PRINT
021A        PRINT "        2. ELECTRIC";
0231        IF ITL(1)=2 THEN PRINT " <- CURRENT";
024E        ENDIF
0250        PRINT
0252        PRINT "        3. NONE";
0265        IF ITL(1)=3 THEN PRINT "     <- CURRENT";
0286        ENDIF
0288        PRINT
028A        PRINT "        0. QUIT"
029C        PRINT " SELECT (0 - 3) : ";
02B3        RUN SS$(ZINT,SEL,XT)
02C7        IF SEL<0 OR SEL>3 THEN GOTO 10
02DD        ENDIF
02DF        IF SEL=0 THEN RETURN
02EC        ENDIF
02EE        ITL(1)=SEL
02F9  11
02FD        IF ITL(1)=1 THEN
030B          PRINT " 1.2.1.1 THE HEATING SYSTEM IS CURRENTLY RATED ";
033F          PRINT TL(11)*100.; "% EFFICIENT"
035B          PRINT "          ENTER THE NEW RATING (1 - 100) : ";
038A          RUN SS$(ONER,IT,TEMPR)
039E          IF TEMPR<1. OR TEMPR>100. THEN GOTO 11
03BC          ENDIF
03BE          TL(11)=TEMPR/100.
03D0        ELSE
03D4          TL(11)=1.
03E2        ENDIF
03E4        GOTO 10
03E8  20
03EC        PRINT " 1.2.2 AUXILIARY COOLING SYSTEM"
040F        PRINT "        1. ABSORPTION";
0428        IF ITL(2)=1 THEN PRINT "        <- CURRENT";
044D        ENDIF
044F        PRINT
0451        PRINT "        2. VAPOR COMPRESSION";
0471        IF ITL(2)=2 THEN PRINT "  <- CURRENT";
048F        ENDIF
0491        PRINT
0493        PRINT "        3. NONE";
04A6        IF ITL(2)=3 THEN PRINT "           <- CURRENT";
04D0        ENDIF
04D2        PRINT
04D4        PRINT "        0. QUIT"
04E6        PRINT " SELECT (0 - 3) : ";
04FD        RUN SS$(ZINT,SEL,XT)
0511        IF SEL<0 OR SEL>3 THEN GOTO 20
0527        ENDIF
0529        IF SEL=0 THEN RETURN
0536        ENDIF
0538        ITL(2)=SEL
0543  21
0547        IF SEL<>3 THEN
0553          PRINT " 1.2.2."; SEL;
0563          PRINT " THE COOLING SYSTEM COP IS CURRENTLY RATED AT ";
0596          PRINT TL(12)
059D          PRINT "          ENTER THE NEW COP (0 - 10) : ";
05C8          RUN SS$(ONER,IT,TEMPR)
05DC          IF TEMPR<.0 OR TEMPR>10. THEN GOTO 21
05FA          ENDIF
05FC          TL(12)=TEMPR
```

```
0607        ELSE
060B          TL(12)=1.
0619        ENDIF
061B        GOTO 20
061F  30
0623        PRINT " 1.2."; SEL;
0631        PRINT " ENTER THE NEW FLOW RATE (GPM) : ";
0657        RUN SS$(ONER,IT,TEMPR)
066B        IF TEMPR<.0 THEN GOTO 30
067E        ENDIF
0680        TL(SEL+10)=TEMPR*499.8
0696        RETURN
0698 100

PROCEDURE DN4P1
0000        PARAM SEL:INTEGER
0007        DIM SEL2,SEL3,IT:INTEGER; ZINT,ONER:BYTE; TEMPR,XT:REAL
002A        DIM C$:STRING[6]; S$:STRING[15]; U$:STRING[4]
004C        DIM PN:INTEGER
0053        DIM SS$:STRING[4]
005F        DATA 0,1,"KB"
006E        READ ZINT,ONER,SS$
007B        ON SEL-1 GOSUB 20,30
008D        END
008F  20
0093        OPEN #PN,"ITCB6":UPDATE
00A3  21
00A7        SEEK #PN,.0
00B4        PRINT " 1.4.2 SENSOR/ACTUATOR TITLES AND UNITS"
00DF        PRINT "     1. PRINT THE CURRENT TITLE LIST"
0109        PRINT "     2. CHANGE SOME TITLES"
0129        PRINT "     0. QUIT"
013B        PRINT " SELECT (0 - 2) : ";
0152        RUN SS$(ZINT,SEL,XT)
0166        IF SEL>2 OR SEL<0 THEN GOTO 21
017C        ENDIF
017E        IF SEL=0 THEN
018A          CLOSE #PN
0190          RETURN
0192        ENDIF
0194        ON SEL GOSUB 22,23
01A3        GOTO 21
01A7  22
01AB        PRINT " 1.4.2.1 CURRENT SENSOR/ACTUATOR TITLE LIST"
01DA        PRINT " SENSOR TITLES TO FOLLOW"
01F6        FOR IT=1 TO 80
0206          IF IT=20 OR IT=40 OR IT=57 OR IT=70 THEN
0227            IF IT=57 THEN PRINT " ACTUATOR TITLES TO FOLLOW"
0250            ENDIF
0252            PRINT " MORE TO COME, PRESS RETURN TO CONTINUE...";
0281            RUN SS$(ZINT,SEL,XT)
0295          ENDIF
0297          GET #PN,S$
02A1          GET #PN,U$
02AB          PRINT "     "; IT; ". ";
02C0          PRINT USING "S15<",S$;
02CE          PRINT "--"; U$
02D8        NEXT IT
02E3        RETURN
02E5  23
02E9        PRINT " 1.4.2.2";
02F6        PRINT " SELECT 1-56 TO CHANGE SENSORS,";
031A        PRINT " 57-80 TO CHANGE ACTUATORS,"
0339        PRINT " OR 0 TO QUIT : ";
034E        RUN SS$(ZINT,SEL2,XT)
0362        IF SEL2<0 OR SEL2>80 THEN GOTO 23
0378        ENDIF
037A        IF SEL2=0 THEN
```

```
0386        RETURN
0388        ENDIF
038A        PRINT " 1.4.2.2."; SEL2; " ENTER THE NEW TITLE (15 CHAR. LIMIT) : "
03C6        PRINT "   123456789ABCDEF"
03DB        INPUT S$
03E0        PRINT " 1.4.2."; SEL2;
03F0        PRINT " ENTER THE NEW UNITS TITLE (4 CHAR. LIMIT) : "
0421        PRINT "   1234"
042B        INPUT U$
0430        XT=FLOAT(SEL2-1)*19.
0443        SEEK #PN,XT
044D        PUT #PN,S$
0457        PUT #PN,U$
0461        GOTO 23
0465 30
0469        OPEN #PN,"ITCB7":UPDATE
0479 31
047D        SEEK #PN,.0
048A        PRINT " 1.4.3 TABULATED DATA REPORT TITLES AND UNITS"
04BB        PRINT "      1. PRINT THE CURRENT TITLE LIST"
04E5        PRINT "      2. CHANGE SOME TITLES"
0505        PRINT "      0. QUIT"
0517        PRINT " SELECT (0 - 2) : ";
052E        RUN SS$(ZINT,SEL,XT)
0542        IF SEL>2 OR SEL<0 THEN GOTO 31
0558        ENDIF
055A        IF SEL=0 THEN
0566           CLOSE #PN
056C           RETURN
056E        ENDIF
0570        ON SEL GOSUB 32,33
057F        GOTO 31
0583 32
0587        PRINT " 1.4.3.1 TABULATED DATA REPORT TITLE LIST"
05B4        FOR IT=1 TO 20
05C4           GET #PN,C$
05CE           GET #PN,U$
05D8           PRINT "         "; IT; ". ";
05EF           PRINT USING "S6<",C$;
05FC           PRINT "--"; U$
0606        NEXT IT
0611        PRINT " PRESS RETURN TO CONTINUE...";
0632        RUN SS$(ZINT,SEL2,XT)
0646        RETURN
0648 33
064C        PRINT " 1.4.3.2";
0659        PRINT " SELECT ITEM TO CHANGE (1 - 20) OR 0 TO QUIT : ";
068D        RUN SS$(ZINT,SEL2,XT)
06A1        IF SEL2<0 OR SEL2>20 THEN GOTO 33
06B7        ENDIF
06B9        IF SEL2=0 THEN
06C5           RETURN
06C7        ENDIF
06C9        PRINT " 1.4.3.2."; SEL2; " ENTER THE NEW TITLE (6 CHAR. LIMIT)
0704        PRINT "   123456"
0710        INPUT C$
0715        PRINT " 1.4.3.2."; SEL2;
0727        PRINT " ENTER THE NEW UNITS TITLE (4 CHAR. LIMIT) : "
0758        PRINT "   1234"
0762        INPUT U$
0767        XT=FLOAT(SEL2-1)*10.
077A        SEEK #PN,XT
0784        PUT #PN,C$
078E        PUT #PN,U$
0798        GOTO 33
```

```
PROCEDURE DN4
  0000        PARAM TL(80):REAL; ITL(56):INTEGER
  0017        DIM SEL:INTEGER; ZINT:BYTE; XT:REAL
  002A        DIM SS2$,SS$:STRING[8]
  003A        DATA 0,"KB"
  0046        READ ZINT,SS2$
  004F 5
  0053        PRINT " 1.4 SOFTWARE PARAMETERS"
  006F        PRINT "    1. DIAGNOSTICS TITLES, TRIGGERS, THRESHOLDS AND TYPES"
  00AD        PRINT "    2. SENSOR/ACTUATOR TITLES AND UNITS"
  00D9        PRINT "    3. TABULATED DATA REPORT TITLES AND UNITS"
  010B        PRINT "    4. AUTOMATIC REPORT GENERATION"
  0132        PRINT "    5. CONTROL LOOP PI GAIN CONSTANTS"
  015C        PRINT "    6. CIM PORT : T"; ITL(51)
  017A        PRINT "    7. TABULATED DATA FILE FIXER"
  019F        PRINT "    0. QUIT"
  01AF        PRINT " SELECT (0 - 7) : ";
  01C6        RUN SS2$(ZINT,SEL,XT)
  01DA        IF SEL<0 OR SEL>7 THEN GOTO 5
  01F0        ENDIF
  01F2        ON SEL+1 GOSUB 100,10,20,20,30,40,60,70
  021C        GOTO 5
  0220 10
  0224        SS$="DN4P3"
  0230        RUN SS$
  0234        KILL SS$
  0239 20
  023D        SS$="DN4P1"
  0249        RUN SS$(SEL)
  0253        KILL SS$
  0258        RETURN
  025A 30
  025E        SS$="DN13"
  0269        RUN SS$(TL,ITL," 1.4.4")
  0281        KILL SS$
  0286        RETURN
  0288 40
  028C        SS$="DN4P2"
  0298        RUN SS$(TL,ITL,SEL)
  02AC        KILL SS$
  02B1        RETURN
  02B3 60
  02B7        PRINT " 1.4.6 ENTER THE NEW PORT NUMBER (1 - 4) : ";
  02E7        RUN SS2$(ZINT,SEL,XT)
  02FB        IF SEL<1 OR SEL>4 THEN GOTO 60
  0311        ENDIF
  0313        ITL(51)=SEL
  031E        RETURN
  0320 70
  0324        SS$="ZERO"
  032F        RUN SS$
  0333        KILL SS$
  0338        RETURN
  033A 100

PROCEDURE DN4P3
  0000        DIM SEL,SEL2,SEL3,IT:INTEGER; ZINT,ONER:BYTE; XT:REAL
  0023        DIM S$:STRING[15]; U$:STRING[4]
  003A        DIM WT$(4):STRING[7]
  004B        DIM PN,NWC,NWARN:INTEGER
  005A        DIM TRIG:INTEGER; THRESH:REAL; WTYPE:BYTE
  006D        DIM SS2$:STRING[8]
  0079        DATA 40,0,1,"DISABLE","WARNING","ALARM  ","NOTICE "
  00AE        DATA "KB"
  00B7        READ NWARN,ZINT,ONER,WT$(1),WT$(2),WT$(3),WT$(4)
  00E0        READ SS2$
  00E5 10
  00E9        OPEN #PN,"ITCB10":UPDATE
  00FA 11
  00FE        PRINT " 1.4.1 DIAGNOSTIC TITLES, TRIGGERS, THRESHOLDS AND TYPES"
  013A        PRINT "     1. PRINT DIAGNOSTIC LIST"
```

```
015D        PRINT "        2. SET UP A DIAGNOSTIC"
017E        PRINT "        0. QUIT"
0190        PRINT " SELECT (0 - 2) : ";
01A7        RUN SS2$(ZINT,SEL3,XT)
01BB        IF SEL3<0 OR SEL3>2 THEN GOTO 11
01D1        ENDIF
01D3        IF SEL3=0 THEN
01DF          CLOSE #PN
01E5          END
01E7        ENDIF
01E9        IF SEL3=1 THEN
01F5 12
01F9          SEEK #PN,.0
0206          NWC=0
020D          PRINT " 1.4.1.1 DIAGNOSTIC LIST"
0229          PRINT " NUMBER TITLE              TRIGGER              THRESHOLD TYPE"
0266          FOR IT=1 TO NWARN
0277            GET #PN,S$
0281            GET #PN,TRIG
028B            GET #PN,THRESH
0295            GET #PN,WTYPE
029F            IF WTYPE>0 AND WTYPE<4 THEN
02B2              IF NWC>20 OR IT=NWARN THEN
02C6                NWC=0
02CD                PRINT " MORE TO COME, PRESS RETURN TO CONTINUE...";
02FC                RUN SS2$(ZINT,SEL3,XT)
0310              ENDIF
0312              NWC=NWC+1
031D              PRINT USING "I6>",IT;
032A              PRINT ". ";
0331              PRINT USING "S15<",S$;
033F              IF IT>12 THEN
034B                PRINT USING "I7>",TRIG;
0358                IF THRESH<.0 THEN PRINT " FALLING TO ";
0378                ELSE PRINT " RISING TO  ";
038C                ENDIF
038E                PRINT USING "R10.2>",ABS(THRESH);
039F              ELSE
03A3                PRINT "...........FIXED............";
03C5              ENDIF
03C7              PRINT " "; WT$(WTYPE+1)
03D6            ENDIF
03D8          NEXT IT
03E3          PRINT " PRESS RETURN TO CONTINUE...";
0404          RUN SS2$(ZINT,SEL3,XT)
0418          GOTO 11
041C        ENDIF
041E        IF SEL3=2 THEN
042A 13
042E          PRINT " 1.4.1.2";
043B          PRINT " SELECT DIAGNOSTIC TO CHANGE (0 - 40) : ";
0468          RUN SS2$(ZINT,SEL2,XT)
047C          IF SEL2<0 OR SEL2>40 THEN GOTO 13
0492          ENDIF
0494          IF SEL2=0 THEN GOTO 11
04A3          ENDIF
04A5        ENDIF
04A7 14
04AB        PRINT " 1.4.1.2."; SEL2; " DIAGNOSTIC CHANGE MENU";
04D7        PRINT " FOR DIAG. #"; SEL2
04EB        PRINT "        1. TITLE"
0503        PRINT "        2. TRIGGERING SENSOR NUMBER"
052E        PRINT "        3. SENSOR TRIGGER THRESHOLD"
0559        PRINT "        4. DIAGNOSTIC TYPE"
057B        PRINT "        0. QUIT"
0592        PRINT " SELECT (0 - 4) : ";
05A9        RUN SS2$(ZINT,SEL3,XT)
05BD        IF SEL3<0 OR SEL3>4 THEN GOTO 14
05D3        ENDIF
```

```
05D5        IF SEL3=0 THEN GOTO 13
05E4        ENDIF
05E6        ON SEL3 GOSUB 15,16,17,18
05FD        GOTO 14
0601 15
0605        PRINT " 1.4.1.2."; SEL2; ".1";
061C        PRINT " ENTER THE NEW TITLE (15 CHAR. LIMIT) : "
0648        PRINT "  123456789ABCDEF"
065D        INPUT S$
0662        XT=FLOAT(SEL2-1)*23.
0675        SEEK #PN,XT
067F        PUT #PN,S$
0689        RETURN
068B 16
068F        PRINT " 1.4.1.2."; SEL2; ".2";
06A6        PRINT " ENTER THE TRIGGERING SENSOR NUMBER (1 - 56) : ";
06DA        RUN SS2$(ZINT,TRIG,XT)
06EE        IF TRIG<0 OR TRIG>80 THEN GOTO 16
0704        ENDIF
0706        XT=FLOAT(SEL2-1)*23.+15.
0720        SEEK #PN,XT
072A        PUT #PN,TRIG
0734        RETURN
0736 17
073A        PRINT " 1.4.1.2."; SEL2; ".3";
0751        PRINT " ENTER THE TRIGGER THRESHOLD : ";
0775        RUN SS2$(ONER,SEL3,THRESH)
0789        PRINT " 1.4.1.2."; SEL2; ".3";
07A0        PRINT " TRIGGER ON FALL OR TRIGGER ON RISE (1=FALL, 2=RISE)"
07D8        PRINT " SELECT (1 OR 2) : ";
07F0        RUN SS2$(ZINT,SEL3,XT)
0804        IF SEL3<1 OR SEL3>2 THEN GOTO 17
081A        ENDIF
081C        XT=FLOAT(SEL2-1)*23.+17.
0836        SEEK #PN,XT
0840        IF SEL3=1 THEN THRESH=-(THRESH)
0854        ENDIF
0856        PUT #PN,THRESH
0860        RETURN
0862 18
0866        PRINT " 1.4.1.2."; SEL2; ".4";
087D        PRINT " DIAGNOSTIC TYPE"
0891        PRINT "          1. DISABLE"
08AC        PRINT "          2. WARNING"
08C7        PRINT "          3. ALARM"
08E0        PRINT "          4. NOTICE"
08FA        PRINT "          0. QUIT"
0912        PRINT " SELECT (0 - 4) : ";
0929        RUN SS2$(ZINT,SEL3,XT)
093D        IF SEL3<0 OR SEL3>4 THEN GOTO 18
0953        ENDIF
0955        IF SEL3>0 THEN
0961           WTYPE=SEL3-1
096C           XT=FLOAT(SEL2-1)*23.+22.
0986           SEEK #PN,XT
0990           PUT #PN,WTYPE
099A        ENDIF
099C        RETURN
PROCEDURE DN3
0000        PARAM TL(80):REAL; ITL(56):INTEGER
0017        DIM SEL,SEL2,IT:INTEGER; ZINT,ONER:BYTE; TEMPR,XT:REAL
003A        DIM MIT$:STRING[6]
0046        DIM SS$,SS2$:STRING[8]
0056        DATA " 1.3.2",0,1,"KB"
006E        READ MIT$,ZINT,ONER,SS$
007F 5
0083        PRINT " 1.3 COGENERATOR SPECIFICATIONS"
00A6        PRINT "     1. OPERATING CONSTRAINTS"
00C7        PRINT "     2. SETPOINTS AND LOAD PRIORITY"
00EE        PRINT "     3. COGEN HEAT LOAD LOOP FLOW RATE (GPM) : ";
```

```
0122        PRINT TL(29)/499.8
0130        PRINT "      4. COGEN COOL LOAD LOOP FLOW RATE (GPM) : ";
0164        PRINT TL(30)/499.8
0172        PRINT "      5. INTEGRAL ABSORPTION A.C. COP          : ";
01A6        PRINT TL(80)
01AD        PRINT "      6. PARASITIC RATINGS"
01CA        PRINT "      7. ENGINE MINIMUM EFF. (ACTUAL/RATED %) : ";
01FE        PRINT TL(46)
0205        PRINT "      8. SILENCER MINIMUM UA (ACTUAL/RATED %) : ";
0239        PRINT TL(47)
0240        PRINT "      9. COGENERATOR PERFORMANCE DATA"
0268        PRINT "     10. ENGINE PREVENTIVE MAINT. TIME (HOURS): ";
029C        PRINT ITL(37)
02A3        PRINT "     11. SILENCER PREVENTIVE MAINTENANCE TIME : ";
02D7        PRINT ITL(38)
02DE        PRINT "     12. ENGINE COOLANT FLOW RATE (GPM)        : ";
0312        PRINT TL(33)/499.8
0320        PRINT "     13. EXHAUST GAS MAX FLOW RATE (LBM/HR)    : ";
0354        PRINT TL(36)
035B        PRINT "      0. QUIT"
036B        PRINT " SELECT (0 - 13) : ";
0383        RUN SS$(ZINT,SEL,XT)
0397        IF SEL<0 OR SEL>13 THEN GOTO 5
03AD        ENDIF
03AF        ON SEL+1 GOSUB 1000,20,10,40,40,40,40,40,40,40,40,40,40,40
03F1        GOTO 5
03F5 10
03F9        SS2$="DN14"
0404        RUN SS2$(TL,ITL,MIT$)
0418        KILL SS2$
041D        RETURN
041F 20
0423        PRINT " 1.3.1 OPERATING CONSTRAINTS"
0443        PRINT "          1. ENGINE IDLE SETTING (%)            : ";
0478        PRINT TL(15)/40.95
0486        PRINT "          2. ENGINE OFF SETTING (%)             : ";
04BB        PRINT TL(73)/40.95
04C9        PRINT "          3. DUMP FAN IDLE SETTING (%)          : ";
04FE        PRINT TL(74)/40.95
050C        PRINT "          4. DUMP FAN OFF SETTING (%)           : ";
0541        PRINT TL(75)/40.95
054F        PRINT "          5. ENGINE START SETTING (%)           : ";
0584        PRINT TL(76)/40.95
0592        PRINT "          6. ENGINE MINIMUM ON TIME (SECONDS)   : ";
05C7        PRINT TL(16)
05CE        PRINT "          7. ENGINE MINIMUM OFF TIME (SECONDS)  : ";
0603        PRINT TL(70)
060A        PRINT "          8. DUMP FAN MINIMUM ON TIME (SECONDS) : ";
063F        PRINT TL(71)
0646        PRINT "          9. DUMP FAN MINIMUM OFF TIME (SECONDS) : ";
067B        PRINT TL(72)
0682        PRINT "         10. ABS. A.C. MINIMUM ON TIME (SECONDS) : ";
06B7        PRINT TL(20)
06BE        PRINT "         11. BOOST PUMP SHUT OFF DELAY (SECONDS) : ";
06F3        PRINT TL(28)
06FA        PRINT "          0. QUIT"
070C        PRINT " SELECT (0 - 11) : ";
0724        RUN SS$(ZINT,SEL2,XT)
0738        IF SEL2<0 OR SEL2>11 THEN GOTO 20
074E        ENDIF
0750        IF SEL2=0 THEN RETURN
075D        ENDIF
075F 21
0763        IF SEL2<6 THEN
076F          PRINT " 1.3.1."; SEL2;
077F          PRINT " ENTER THE NEW SETTING (1 - 100) : ";
07A8          RUN SS$(ONER,IT,TEMPR)
07BC          IF TEMPR<1. OR TEMPR>100. THEN GOTO 21
07DA          ENDIF
07DC          IF SEL2=1 THEN
```

```
07E8              TL(15)=TEMPR*40.95
07FA            ELSE
07FE              TL(SEL2+71)=TEMPR*40.95
0814            ENDIF
0816          ELSE
081A            PRINT " 1.3.1.";
0826            PRINT SEL2; " ENTER THE NEW TIME (SECONDS) : ";
084F            RUN SS$(ONER,IT,TEMPR)
0863            IF TEMPR<0 THEN GOTO 21
0873            ELSE
0877              ON SEL2-5 GOSUB 23,24,25,26,27,28
0899              GOTO 20
089D 23           TL(16)=TEMPR
08AB              RETURN
08AD 24           TL(70)=TEMPR
08BB              RETURN
08BD 25           TL(71)=TEMPR
08CB              RETURN
08CD 26           TL(72)=TEMPR
08DB              RETURN
08DD 27           TL(20)=TEMPR
08EB              RETURN
08ED 28           TL(28)=TEMPR
08FB              RETURN
08FD            ENDIF
08FF          ENDIF
0901          GOTO 20
0905 40
0909          SS2$="DN3P1"
0915          RUN SS2$(TL,ITL,SEL)
0929          KILL SS2$
092E          RETURN
0930 1000
PROCEDURE DN3P1
 0000          PARAM TL(80):REAL; ITL(56):INTEGER
 0017          PARAM SEL:INTEGER
 001E          DIM SEL2,IT:INTEGER; ZINT,ONER:BYTE; TEMPR,XT:REAL
 003D          DIM MIT$:STRING[6]
 0049          DIM SS$,SS2$:STRING[8]
 0059          DATA " 1.3.2",0,1,"KB"
 0071          READ MIT$,ZINT,ONER,SS$
 0082 5
 0086          ON SEL+1 GOSUB 200,200,200,40,40,60,70,80,80,100,90,90,40,40
 00C8          END
 00CA 40
 00CE          PRINT " 1.3."; SEL;
 00DC          PRINT " ENTER THE NEW FLOW RATE : ";
 00FC          RUN SS$(ONER,IT,TEMPR)
 0110          IF TEMPR<.0 THEN GOTO 40
 0123          ENDIF
 0125          IF SEL=12 THEN TL(33)=TEMPR*499.8
 0142          ENDIF
 0144          IF SEL=13 THEN TL(36)=TEMPR
 015A          ENDIF
 015C          IF SEL<12 THEN
 0168            TL(SEL+26)=TEMPR*499.8
 017E          ENDIF
 0180          RETURN
 0182 60
 0186          PRINT " 1.3.5 ENTER THE COP (0 IF NO ABS. AC.) : ";
 01B5          RUN SS$(ONER,IT,TEMPR)
 01C9          IF TEMPR<.0 OR TEMPR>100. THEN GOTO 60
 01E7          ENDIF
 01E9          IF TEMPR<.0001 THEN ITL(3)=0
 0202          ELSE ITL(3)=1
 020F          ENDIF
 0211          TL(80)=TEMPR
 021C          RETURN
 021E 70
```

```
0222        PRINT " 1.3.6 COGENERATOR PARASITIC RATINGS"
024A        PRINT "         1. ENGINE (KW/HR)                          : ";
027C        PRINT TL(17)
0283        PRINT "         2. INTEGRAL ABSORPTION A.C. (KW/HR) : ";
02B5        PRINT TL(18)
02BC        PRINT "         3. DUMP (KW/HR)                          : ";
02EE        PRINT TL(19)
02F5        PRINT "         0. QUIT"
0307        PRINT " SELECT (0 - 3) : "
031D        RUN SS$(ZINT,SEL2,XT)
0331        IF SEL2<0 OR SEL2>3 THEN GOTO 70
0347        ENDIF
0349        IF SEL2=0 THEN RETURN
0356        ENDIF
0358 71
035C        PRINT " 1.3.6."; SEL2; " ENTER THE NEW RATING (KW/HR) : ";
038F        RUN SS$(ONER,IT,TEMPR)
03A3        IF TEMPR<.0 THEN GOTO 71
03B6        ELSE
03BA           TL(16+SEL2)=TEMPR
03C9        ENDIF
03CB        GOTO 70
03CF 80
03D3        PRINT " 1.3."; SEL; " ENTER THE NEW RATING (1 - 100%) : ";
0407        RUN SS$(ONER,IT,TEMPR)
041B        IF TEMPR<1 OR TEMPR>100 THEN GOTO 80
0433        ENDIF
0435        TL(39+SEL)=TEMPR
0444        RETURN
0446 90
044A        PRINT " 1.3."; SEL; " ENTER THE NEW TIME (HOURS) : ";
0479        RUN SS$(ZINT,IT,TEMPR)
048D        IF IT<0 THEN GOTO 90
049C        ENDIF
049E        ITL(27+SEL)=IT
04AD        RETURN
04AF 100
04B3        SS2$="DN33"
04BE        RUN SS2$(" 1.3.9")
04CC        KILL SS2$
04D1        RETURN
04D3 200
PROCEDURE DN12
0000        PARAM TL(80):REAL; ITL(56):INTEGER; MIT$:STRING[6]
0022        DIM SS9$,SS2$:STRING[8]
0032        DIM TD$:STRING[17]
003E        DIM Y,Z:REAL
0049        DIM ZINT,ONER:BYTE; XT:REAL
005A        DIM IERR,SEL,SEL1,SEL2,SEL3:INTEGER
0071        DIM SC$(7):STRING[4]
0082        DIM DOW$(7):STRING[9]
0093        DIM SCT$(2):STRING[9]
00A4        DIM I,IT:INTEGER
00AF        DIM SCHED(2,7,24):BYTE
00C3        DIM PN:INTEGER
00CA        DIM IND$:STRING[19]
00D6        DIM SS$:STRING[4]
00E2        DATA "SUNDAY   ","MONDAY   ","TUESDAY  ","WEDNESDAY","THURSDAY "
0122        DATA "FRIDAY   ","SATURDAY "
013E        DATA "KB",0,1,"OPERATING","DEMAND"
0162 2      DATA " OFF"," ON "," TLF"," ELF"," LIM"," FIX","ECON"
019A        ON ERROR GOTO 100
01A0        FOR I=1 TO 7
01B0           READ DOW$(I)
01B9        NEXT I
01C4        READ SS$,ZINT,ONER,SCT$(1),SCT$(2)
01DF        FOR I=1 TO 7
01EF           READ SC$(I)
01F8        NEXT I
0203 5
```

```
0207        OPEN #PN,"ITCB13":READ
0218        SEEK #PN,225.
0225        GET #PN,TD$
022F        PRINT MIT$; " SCHEDULES AND RATCHET"
024D        PRINT "     1. "; SCT$(1); " SCHEDULE"
026B        PRINT "     2. DEMAND SCHEDULE"
0286        PRINT "     3. RATCHET PERIOD LENGTH (HOURS) : ";
02B3        PRINT TL(6)
02BA        PRINT "     4. RATCHET PERIOD START TIME       : ";
02E7        PRINT TD$
02EC        PRINT "     0. QUIT"
02FC        PRINT " SELECT (0 - 4) : ";
0313        RUN SS$(ZINT,SEL,XT)
0327        IF SEL<0 OR SEL>4 THEN
033A          GOTO 5
033E        ENDIF
0340        ON SEL+1 GOSUB 100,9,9,30,40
035E        GOTO 5
0362 9
0366        SS9$="SECURE"
0373        RUN SS9$(5,1,IERR)
0383        KILL SS9$
0388        OPEN #PN,"ITCB5":UPDATE
0398        GET #PN,SCHED
03A2 10
03A6        PRINT MIT$; "."; SEL; " "; SCT$(SEL); " SCHEDULE"
03CA        FOR I=1 TO 7
03DA          PRINT "       "; I; ". "; DOW$(I)
03F5        NEXT I
0400        PRINT "     0. QUIT"
0412        PRINT " SELECT (0 - 7) : ";
0429        RUN SS$(ZINT,SEL1,XT)
043D        IF SEL1>7 OR SEL1<0 THEN
0450          GOTO 10
0454        ENDIF
0456        IF SEL1=0 THEN
0462          SEEK #PN,.0
046F          IF IERR>99 THEN
047B            RUN SS9$(5,1,IERR)
048B            KILL SS9$
0490          ENDIF
0492          PUT #PN,SCHED
049C          CLOSE #PN
04A2          RUN SS9$(5,2,IERR)
04B2          RETURN
04B4        ENDIF
04B6 11
04BA        PRINT MIT$; "."; SEL; "."; SEL1; " "; SCT$(SEL);
04DB        PRINT " SCHEDULE FOR "; DOW$(SEL1)
04F4        FOR I=1 TO 12
0504          IF SCHED(SEL,SEL1,I)=0 THEN SCHED(SEL,SEL1,I)=1
0529          ENDIF
052B          PRINT "       "; I; ". "; SC$(SCHED(SEL,SEL1,I));
0552          IF SCHED(SEL,SEL1,I+12)=0 THEN SCHED(SEL,SEL1,I+12)=1
057D          ENDIF
057F          PRINT "       "; I+12; ". "; SC$(SCHED(SEL,SEL1,I+12))
05AB        NEXT I
05B6        PRINT " ENTER HOUR TO CHANGE (1 - 24 OR 0 TO QUIT) : ";
05E9        RUN SS$(ZINT,SEL2,XT)
05FD        IF SEL2<0 OR SEL2>24 THEN GOTO 11
0613        ENDIF
0615        IF SEL2=0 THEN
0621          GOTO 10
0625        ENDIF
0627 12
062B        PRINT MIT$; "."; SEL; "."; SEL1; "."; SEL2;
0649        PRINT " "; SCT$(SEL); " SCHEDULE OPTIONS"
0669        IF SEL=2 THEN IT=2
067B        ELSE IT=7
0685        ENDIF
```

```
0687        FOR I=1 TO IT
0698          PRINT "           "; I; ". "; SC$(I)
06B7        NEXT I
06C2        PRINT "        0. QUIT"
06D8        PRINT " SELECT (0 - "; IT; ") : ";
06F5        RUN SS$(ZINT,SEL3,XT)
0709        IF SEL3<0 OR SEL3>IT THEN GOTO 12
0720        ENDIF
0722        IF SEL3=0 THEN GOTO 11
0731        ENDIF
0733        FOR I=SEL2 TO 24
0744          SCHED(SEL,SEL1,I)=SEL3
0756        NEXT I
0761        GOTO 11
0765 30
0769        PRINT MIT$; ".3 ENTER THE PERIOD LENGTH (HOURS) : ";
0797        RUN SS$(ONER,IT,TL(6))
07AD        RETURN
07AF 40
07B3        PRINT MIT$; ".4.1 ENTER THE RATCHET START TIME, LIKE THIS : "
07EA        PRINT "YY/MM/DD HH:MM:SS"
07FF        INPUT "",TD$
0807        IF LEN(TD$)<17 THEN RETURN
0815        ENDIF
0817        OPEN #PN,"ITCB14":UPDATE
0828        SEEK #PN,75.
0835        SS2$="ELAPSE"
0842        RUN SS2$(TD$,XT)
0851        PUT #PN,XT
085B        CLOSE #PN
0861        KILL SS2$
0866        SS2$="TIMERS"
0873        RUN SS2$(1,16,XT)
0883        KILL SS2$
0888        PRINT " THE RATCHET WILL EXPIRE IN "; TL(6)-XT; " HOURS"
08BB        OPEN #PN,"ITCB13":UPDATE
08CC        SEEK #PN,225.
08D9        PUT #PN,TD$
08E3        CLOSE #PN
08E9        RETURN
08EB 100
PROCEDURE DN33
0000        PARAM MIT$:STRING[6]
000C        DIM P(3,6,11):REAL
0020        DIM ZINT,ONER:BYTE; IERR,I,J,IT,SEL,SEL2,SEL3:INTEGER; XT:REAL
004F        DIM PN:INTEGER
0056        DIM SS9$,SS2$,SS$:STRING[8]
006A        DIM TT$(6):STRING[10]
007B        DATA "FUEL USAGE","ELEC. GEN.","HEAT GEN. "
00A6        DATA "COOL INPUT","COOL OUTPT","SILNCER UA"
00D1        DATA 0,1,"KB"
00E0        ON ERROR GOTO 99
00E6        FOR I=1 TO 6
00F6          READ TT$(I)
00FF        NEXT I
010A        READ ZINT,ONER,SS2$
0117 5
011B        PRINT MIT$; " COGENERATOR RATING TREND CATEGORIES"
0147        PRINT "     1. FUEL USAGE"
015F        PRINT "     2. ELECTRICAL GENERATION"
0182        PRINT "     3. THERMAL TO HEATING LOAD"
01A7        PRINT "     4. THERMAL TO COOLING LOAD"
01CC        PRINT "     5. COOLING GENERATED"
01EB        PRINT "     6. SILENCER UA"
0204        PRINT "     0. QUIT"
0216        PRINT " SELECT (0 - 6) : ";
022D        RUN SS2$(ZINT,SEL,XT)
0241        IF SEL<0 OR SEL>6 THEN GOTO 5
0257        ENDIF
```

```
0259         IF SEL=0 THEN END
0266         ENDIF
0268  6
026C         SS9$="SECURE"
0279         RUN SS9$(11,1,IERR)
0289         KILL SS9$
028E         OPEN #PN,"ITCB11":UPDATE
029F         GET #PN,P
02A9  7
02AD         PRINT MIT$; "."; SEL; " "; TT$(SEL); " TREND TABLE TAILORING"
02DE         PRINT "           1. REPORT ON STANDARD AND OBSERVED RATINGS"
0315         PRINT "           2. INITIALIZE STANDARD RATINGS"
0340         PRINT "           3. REPLACE STANDARD RATINGS WITH OBSERVED RATINGS"
037E         PRINT "           4. REPLACE OBSERVED RATINGS WITH STANDARD RATINGS"
03BC         PRINT "           0. QUIT"
03D0         PRINT " SELECT (0 - 4) : ";
03E7         RUN SS2$(ZINT,SEL2,XT)
03FB         IF SEL2<0 OR SEL2>4 THEN
040E            GOTO 7
0412         ENDIF
0414         IF SEL2=0 THEN
0420            SEEK #PN,.0
042D            PUT #PN,P
0437            CLOSE #PN
043D            RUN SS9$(11,2,IERR)
044D            KILL SS9$
0452            GOTO 5
0456         ENDIF
0458         ON SEL2 GOSUB 10,20,30,40
046F         GOTO 7
0473  10     SS$="TPRINT"
0483         RUN SS$(SEL,P,"/T1")
0498         KILL SS$
049D         PRINT " PRESS RETURN TO CONTINUE...";
04BE         RUN SS2$(ZINT,IT,XT)
04D2         RETURN
04D4  20
04D8         PRINT MIT$; "."; SEL; "."; SEL2;
04EE         PRINT " ENTER THE "; TT$(SEL); " ENTRY # TO CHANGE,"
051A         PRINT " 1 - 10, OR 11 FOR MAX RANGE, OR 0 TO QUIT : ";
054C         RUN SS2$(ZINT,SEL3,XT)
0560         IF SEL3<0 OR SEL3>11 THEN GOTO 20
0576         ENDIF
0578         IF SEL3=0 THEN RETURN
0585         ENDIF
0587         PRINT MIT$; "."; SEL; "."; SEL2; "."; SEL3;
05A5         PRINT "           ENTER THE NEW RATING : ";
05CC         RUN SS2$(ONER,IT,P(1,SEL,SEL3))
05E8         GOTO 20
05EC  30
05F0         FOR I=1 TO 11
0600            P(1,SEL,I)=P(2,SEL,I)
0619         NEXT I
0624         RETURN
0626  40
062A         FOR I=1 TO 11
063A            P(2,SEL,I)=P(1,SEL,I)
0653            P(3,SEL,I)=1.
0667         NEXT I
0672         RETURN
0674  99
PROCEDURE DN13
 0000        PARAM TL(80):REAL; ITL(56):INTEGER; MIT$:STRING[6]
 0022        DIM NUM$(15):STRING[15]
 0033        DIM ZINT,ONER:BYTE; XT:REAL
 0044        DIM SEL,SEL2P,SEL1,SEL2,SEL3:INTEGER
 005B        DIM I,IT:INTEGER
 0066        DIM PN:INTEGER
 006D        DIM RT$(10):STRING[10]
 007E        DIM SS2$:STRING[8]
```

```
008A        DIM SS$:STRING[6]
0096        DATA "DESCHEDULE"
00A7        DATA "DIAGNOSTIC","SENSOR/ACT","HOURLY TAB","DAILY TAB "
00DF        DATA "MONTHLY   ","YEARLY TAB","PERF TREND","PEAK STAT."
0117        DATA "ALARM     "
0128        DATA 0,1,"KB","TIMERS"
0140        ON ERROR GOTO 5
0146        FOR I=1 TO 10
0156          READ RT$(I)
015F        NEXT I
016A        READ ZINT,ONER,SS$,SS2$
017B        OPEN #PN,"ITCB13":UPDATE
018C        GET #PN,NUM$
0196 1
019A        PRINT MIT$; " AUTOMATIC REPORTS"
01B4        PRINT "        # TYPE        DESTINATION #    PORT ";
01E5        PRINT "INTERVAL   NEXT"
01F7        FOR I=1 TO 15
0207          IF ITL(I+3)<0 OR ITL(I+3)>9 THEN ITL(I+3)=0
0233          ENDIF
0235          PRINT "       ";
0240          PRINT USING "I3>",I;
024D          PRINT ". ";
0254          PRINT USING "S11<",RT$(ITL(I+3)+1);
026E          PRINT USING "S16<",NUM$(I);
027F          PRINT USING "I3<",ITL(I+18);
0292          PRINT "   ";
0299          IF ITL(I+3)<3 OR ITL(I+3)>6 THEN
02B8            PRINT USING "R8.2<",TL(I+54);
02CD          ELSE PRINT "FIXED   ";
02DD          ENDIF
02DF          PRINT "  ";
02E7          RUN SS2$(1,I,XT)
02F9          PRINT USING "R8.2<",TL(I+54)-XT
0311          KILL SS2$
0316        NEXT I
0321        PRINT "        0. QUIT"
0334        PRINT " SELECT REPORT TO SET UP (0 - 15) : ";
035D        RUN SS$(ZINT,SEL,XT)
0371        IF SEL<0 OR SEL>15 THEN GOTO 1
0387        ENDIF
0389        IF SEL=0 THEN
0395 5
0399          SEEK #PN,.0
03A6          PUT #PN,NUM$
03B0          CLOSE #PN
03B6          END
03B8        ENDIF
03BA 6
03BE        PRINT MIT$; "."; SEL; " REPORT SET-UP MENU FOR REPORT # "; SEL
03F3        PRINT "         1. REPORT TYPE"
040E        PRINT "         2. REPORT DESTINATION PHONE #"
0438        PRINT "         3. REPORT OUTPUT PORT #"
045C        PRINT "         4. REPORT INTERVAL"
047B        PRINT "         0. QUIT"
048F        PRINT " SELECT (0 - 4) : ";
04A6        RUN SS$(ZINT,SEL2P,XT)
04BA        IF SEL2P<0 OR SEL2P>4 THEN GOTO 6
04D0        ENDIF
04D2        IF SEL2P=0 THEN GOTO 1
04E1        ENDIF
04E3        ON SEL2P GOSUB 10,20,25,30
04FA        GOTO 6
04FE 10
0502        PRINT MIT$; "."; SEL; "."; SEL2P; " REPORT TYPES"
0527        PRINT "         1. DE-SCHEDULED"
0545        PRINT "         2. DIAGNOSTIC STATUS"
0568        PRINT "         3. SENSOR/ACTUATOR"
0589        PRINT "         4. HOURLY TABULATED DATA"
05B0        PRINT "         5. DAILY TABULATED DATA"
```

```
05D6        PRINT "             6. MONTHLY TABULATED DATA"
05FE        PRINT "             7. YEARLY TABULATED DATA"
0625        PRINT "             8. COGENERATOR PERFORMANCE"
064E        PRINT "             9. PEAK IMPORT STATUS"
0672        PRINT "            10. ALARM (2 & 3 COMBO)"
0697        PRINT "             0. QUIT"
06AD        PRINT " SELECT (0 - 10) : ";
06C5        RUN SS$(ZINT,SEL1,XT)
06D9        IF SEL1<0 OR SEL1>10 THEN GOTO 10
06EF        ENDIF
06F1        IF SEL1=0 THEN RETURN
06FE        ENDIF
0700        ITL(SEL+3)=SEL1-1
0712        RETURN
0714 20
0718        PRINT MIT$; "."; SEL; "."; SEL2P;
072E        PRINT "  ENTER THE REPORT DESTINATION PHONE # : ";
075D        INPUT NUM$(SEL)
0766        RETURN
0768 25
076C        PRINT MIT$; "."; SEL; "."; SEL2P;
0782        PRINT "  ENTER THE OUTPUT PORT # (1 - 4) : ";
07AB        RUN SS$(ZINT,IT,XT)
07BF        IF IT<1 OR IT>4 THEN GOTO 25
07D5        ENDIF
07D7        ITL(SEL+18)=IT
07E6        RETURN
07E8 30
07EC        PRINT MIT$; "."; SEL; "."; SEL2P;
0802        PRINT " ENTER THE REPORT";
0818        PRINT " INTERVAL (HOURS), 0 TO DE-SCHEDULE : ";
0843        RUN SS$(ONER,IT,XT)
0857        IF XT<.0 THEN GOTO 30
086A        ENDIF
086C        TL(SEL+54)=XT
087B        RETURN
PROCEDURE DN14
 0000       PARAM TL(80):REAL; ITL(56):INTEGER; MIT$:STRING[6]
 0022       DIM SEL,SEL1,IT:INTEGER; ZINT,ONER:BYTE; XT:REAL
 0041       DIM LP$(2):STRING[4]
 0052       DIM SS$:STRING[4]
 005E       DIM ITS(9):INTEGER
 006A       DATA "HEAT","COOL"
 007C       DATA 0,1,"KB"
 008B 3     DATA 21,8,25,77,24,22,26,10,27
 00AD       ON ERROR GOTO 99
 00B3       IF ITL(48)<0 OR ITL(48)>2 THEN ITL(48)=0
 00D3       ENDIF
 00D5       FOR IT=1 TO 2
 00E5          READ LP$(IT)
 00EE       NEXT IT
 00F9       READ ZINT,ONER,SS$
 0106       FOR IT=1 TO 9
 0116          READ ITS(IT)
 011F       NEXT IT
 012A 5
 012E       PRINT MIT$; " COGENERATOR SETPOINTS AND LOAD PRIORITY"
 015E       PRINT "         1. HVAC LOAD PRIORITY              : ";
 018F       PRINT LP$(ITL(48))
 0199       PRINT "         2. ENGINE SETPOINT                 : ";
 01CA       PRINT TL(ITS(1))
 01D4       PRINT "         3. HEAT LOOP SETPOINT              : ";
 0205       PRINT TL(ITS(2))
 020F       PRINT "         4. COOL LOOP SETPOINT              : ";
 0240       PRINT TL(ITS(3))
 024A       PRINT "         5. ENCLOSURE SETPOINT              : ";
 027B       PRINT TL(ITS(4))
 0285       PRINT "         6. HEAT LOOP DELTA SETPOINT        : ";
 02B6       PRINT TL(ITS(5))
 02C0       PRINT "         7. COOL LOOP DELTA SETPOINT        : ";
```

```
02F1        PRINT TL(ITS(6))
02FB        PRINT "           8. ELF IMPORT SETPOINT              : ";
032C        PRINT TL(ITS(7))
0336        PRINT "           9. LIM IMPORT SETPOINT              : ";
0367        PRINT TL(ITS(8))
0371        PRINT "          10. FIX THROTTLE SETTING (0 - 100%) : ";
03A2        PRINT TL(ITS(9))/40.95
03B3        PRINT "           0. QUIT"
03C5        PRINT " SELECT (0 - 10) : ";
03DD        RUN SS$(ZINT,SEL,XT)
03F1        IF SEL<0 OR SEL>10 THEN GOTO 5
0407        ENDIF
0409        IF SEL=0 THEN
0415          END
0417        ENDIF
0419 10
041D        IF SEL=1 THEN
0429          IF ITL(48)=1 THEN ITL(48)=2
0440          ELSE ITL(48)=1
044D          ENDIF
044F        ENDIF
0451 20
0455        IF SEL>1 THEN
0461          PRINT MIT$; "."; SEL; " ENTER THE NEW SETPOINT : ";
048C          RUN SS$(ONER,IT,XT)
04A0          IF SEL=10 THEN
04AC             IF XT<.0 OR XT>100. THEN GOTO 20
04CA             ELSE XT=XT*40.95
04DC          ENDIF
04DE          ENDIF
04E0          TL(ITS(SEL-1))=XT
04F2        ENDIF
04F4        GOTO 5
04F8 99
PROCEDURE DN15
0000        PARAM MIT$:STRING[6]
000C        DIM ZINT,ONER:BYTE; SEL,IT,SEL2:INTEGER; XT,XTT:REAL
002F        DIM DOW$:STRING[9]
003B        DIM LO,HI:INTEGER
0046        DIM IDW:INTEGER
004D        DIM SS2$:STRING[8]; SS$:STRING[4]
0064        DATA 0,1,"KB"
0073 2      DATA "SUNDAY   ","MONDAY   ","TUESDAY  ","WEDNESDAY","THURSDAY "
00B6        DATA "FRIDAY   ","SATURDAY "
00D2 3      DATA 0,99,$DF09,1,12,$DF08,1,31,$DF07,0,23,$DF04,0,59,$DF02
010B        ON ERROR GOTO 99
0111        READ ZINT,ONER,SS$
011E 5
0122        IDW=PEEK($DF06)
012B        IF IDW<1 OR IDW>7 THEN IDW=1
0144        ENDIF
0146        RESTORE 2
014B        FOR IT=1 TO IDW
015C          READ DOW$
0161        NEXT IT
016C        PRINT MIT$; " CLOCK SET OPTIONS ON "; DOW$;
018F        PRINT " "; DATE$
0196        PRINT "           1. YEAR"
01A8        PRINT "           2. MONTH"
01BB        PRINT "           3. DAY"
01CC        PRINT "           4. HOUR"
01DE        PRINT "           5. MINUTE"
01F2        PRINT "           6. DAY OF WEEK"
020B        PRINT "           7. RESET ALL TIMERS"
0229        PRINT "           0. QUIT"
023B        PRINT " SELECT (0 - 7) : ";
0252        RUN SS$(ZINT,SEL,XT)
0266        IF SEL<0 OR SEL>7 THEN GOTO 5
027C        ENDIF
```

```
027E        IF SEL=0 THEN END
028B        ENDIF
028D        IF SEL=7 THEN
0299          SS2$="TIMERS"
02A6          XT=.0
02B1          SEL2=2
02B8          FOR IT=1 TO 51
02C8            RUN SS2$(SEL2,IT,XT)
02DC          NEXT IT
02E7          GOTO 5
02EB        ENDIF
02ED        IF SEL<6 THEN GOSUB 70
02FC        ELSE
0300 60
0304          PRINT MIT$; ".6 DAY OF WEEK MENU"
031F          RESTORE 2
0324          FOR IDW=1 TO 7
0334            READ DOW$
0339            PRINT "            "; IDW; ". "; DOW$
0354          NEXT IDW
035F          PRINT "        0. QUIT"
0374          PRINT " SELECT (0 - 7) : ";
038B          RUN SS$(ZINT,SEL2,XT)
039F          IF SEL2<0 OR SEL2>7 THEN GOTO 60
03B5          ENDIF
03B7          IF SEL2<>0 THEN
03C3            POKE $DF06,SEL2
03CC          ENDIF
03CE        ENDIF
03D0        GOTO 5
03D4 70
03D8        RESTORE 3
03DD        FOR IDW=1 TO SEL
03EE          READ LO,HI,XTT
03FB        NEXT IDW
0406 75
040A        PRINT MIT$; "."; SEL; " ENTER NEW VALUE : ";
042E        RUN SS$(ZINT,SEL2,XT)
0442        IF SEL2<LO OR SEL2>HI THEN GOTO 75
045A        ENDIF
045C        POKE XTT,SEL2
0466        RETURN
0468 99
PROCEDURE DN4P2
0000        PARAM TL(80):REAL; ITL(56):INTEGER
0017        PARAM SEL:INTEGER
001E        DIM LES,SEL2,SEL3,IT:INTEGER; ZINT,ONER:BYTE; XT:REAL
0041        DIM PN,PN2:INTEGER
004C        DIM IGN(2):INTEGER
0058        DIM GN$(2):STRING[1]
0069        DIM SS$:STRING[8]
0075        DATA "P","I",0,1,"KB"
008C 5      DATA 31,32,34,35,37,38,40,41,43,44,48,49,52,53
00BD        READ GN$(1),GN$(2),ZINT,ONER,SS$
00D8 60
00DC        PRINT " 1.4.5 CONTROL LOOP PID GAIN CONSTANTS"
0106        PRINT "     1. LOOP #1 (SILENCER)"
0126        PRINT "     2. LOOP #2 (DUMP JACKET FAN)"
014D        PRINT "     3. LOOP #3 (ENGINE, TLF)"
0170        PRINT "     4. LOOP #4 (HEAT LOOP VALVE)"
0197        PRINT "     5. LOOP #5 (ABSORPTION A.C.)"
01BE        PRINT "     6. LOOP #6 (DUMP JACKET VALVE)"
01E7        PRINT "     7. LOOP #3 (ENGINE, ELF)"
020A        PRINT "     0. QUIT"
021C        PRINT " SELECT (0 - 7) : "
0232        RUN SS$(ZINT,SEL2,XT)
0246        IF SEL2<0 OR SEL2>7 THEN GOTO 60
025C        ENDIF
```

```
025E        IF SEL2=0 THEN END
026B        ENDIF
026D    61
0271        RESTORE 5
0276        IF SEL2>1 THEN
0282          FOR IT=1 TO SEL2-1
0296            FOR PN=1 TO 2
02A6              READ PN2
02AB            NEXT PN
02B6          NEXT IT
02C1        ENDIF
02C3        PRINT " 1.4.5."; SEL2; " CURRENT GAINS"
02E3        FOR IT=1 TO 2
02F3          READ IGN(IT)
02FC          PRINT "            "; IT; ". "; GN$(IT); " : "; TL(IGN(IT))
0329        NEXT IT
0334        PRINT "          3. ";
0345        LES=SEL2+40
0350        IF ITL(LES)=1 THEN PRINT "ENABLED"
0369        ELSE PRINT "DISABLED"
0378        ENDIF
037A        PRINT "          0. QUIT"
038E        PRINT " SELECT (0 - 3) : ";
03A5        RUN SS$(ZINT,SEL3,XT)
03B9        IF SEL3<0 OR SEL3>3 THEN GOTO 61
03CF        ENDIF
03D1        IF SEL3=0 THEN GOTO 60
03E0        ENDIF
03E2    62
03E6        IF SEL3=3 THEN
03F2          IF ITL(LES)=1 THEN ITL(LES)=0
040B          ELSE ITL(LES)=1
0419          ENDIF
041B        ELSE
041F          PRINT " 1.4.5."; SEL2; "."; SEL3;
0437          PRINT " ENTER THE "; GN$(SEL3); " GAIN : ";
0459          RUN SS$(ONER,SEL,XT)
046D          TL(IGN(SEL3))=XT
047C        ENDIF
047E        GOTO 61
PROCEDURE SDBUF
0000        PARAM TL(80):REAL; ITL(56):INTEGER
0017        DIM B(100):REAL
0023        DIM I,J,AD,NUM,WC:INTEGER
003A        DIM SS$:STRING[8]
0046        DIM CIMP$:STRING[2]
0052        DATA 4501,80,2,4581,56,2
006A        IF ITL(51)<1 OR ITL(51)>4 THEN
0081          CIMP$="T4"
008A        ELSE CIMP$="T"+STR$(ITL(51))
009C        ENDIF
009E        SS$="READEM"
00AB        FOR I=1 TO 2
00BB          READ AD,NUM,WC
00C8          FOR J=1 TO NUM
00D9            IF I=2 THEN B(J)=FLOAT(ITL(J))
00F4            ELSE B(J)=TL(J)
0106            ENDIF
0108          NEXT J
0113          RUN SS$(B,AD,NUM,WC,CIMP$)
0131        NEXT I
013C        KILL SS$
PROCEDURE CONSOL
0000        DIM IN$:STRING[1]
000C        DIM IERR,LGO,IHGO,HALT,IMT,BRANCH:INTEGER
0027        DIM COM$:STRING[9]
0033        DIM SS$(9):STRING[8]
0044        DIM SS9$,SSDT$,SSD$:STRING[8]
0058        DIM ZINT:BYTE; XT:REAL
```

```
0065        DIM PT$:STRING[3]
0071        DIM PN,PN2:INTEGER
007C        DATA "DSTAT","SENSOR","REPORT","PEAK","DTAIL","HOUR","SPEC"
00B7        DATA "KB","STATUS"
00C9        DATA 0,0
00D3        ZINT=0
00DA        IHGO=1
00E1        SHELL "LOAD NINKEY,M1,M3"
00F6        SSD$="KB"
00FF        RUN SSD$(ZINT,IMT,XT)
0113        KILL SSD$
0118        IF IMT<1 OR IMT>2 THEN IMT=2
0131        ENDIF
0133        ON ERROR GOTO 99
0139        PT$="/M1"
0143        FOR BRANCH=1 TO 9
0153           READ SS$(BRANCH)
015C        NEXT BRANCH
0167        READ ZINT,LGO
0170        OPEN #PN,PT$
017A    5
017E        SSD$=SS$(8)
0188        RUN SSD$(ZINT,BRANCH,XT)
019C        KILL SSD$
01A1        IF LGO=0 AND BRANCH>0 THEN
01B4           SSD$="PWORD"
01C0           RUN SSD$(LGO)
01CA           KILL SSD$
01CF           BRANCH=0
01D6        ENDIF
01D8        IF IHGO=1 THEN
01E4           SSD$="TIMERS"
01F1           RUN SSD$(1,23,XT)
0201           KILL SSD$
0206           IF XT>.016666 THEN
0216              RUN SSD$(2,23,XT)
0226              KILL SSD$
022B              IF IMT<>2 THEN
0237                 IF LGO<>0 THEN
0243                    PRINT " PLEASE WAIT, SUPERVISORY CONTROL...";
026C                 ENDIF
026E                 SSD$="EXEC"
0279                 RUN SSD$
027D                 KILL SSD$
0282                 IF LGO<>0 THEN PRINT "DONE"
0295              ENDIF
0297           ENDIF
0299        ENDIF
029B        ENDIF
029D        IF LGO=0 AND BRANCH=0 THEN GOTO 5
02B3        ENDIF
02B5        IF LGO=1 THEN
02C1           IF BRANCH>0 AND BRANCH<8 THEN
02D4              SSDT$=SS$(BRANCH)
02DF              SSD$="CON2"
02EA              RUN SSD$(SSDT$,BRANCH,PN,HALT,IHGO,LGO)
030D              KILL SSD$
0312              IF BRANCH=6 THEN
031E                 BRANCH=0
0325                 GOTO 5
0329              ENDIF
032B           ENDIF
032D   10
0331        SSD$=SS$(9)
033B        RUN SSD$(PT$)
0345        KILL SSD$
```

```
034A        PRINT #PN,"_____"
0370        PRINT #PN,"  0. MAIN COMMAND MENU       |"
0397        PRINT #PN,"  1. DIAGNOSTIC ACK/CLEAR    |"
03BE        PRINT #PN,"  2. SENSOR/ACTUATOR REPORT  |"
03E5        PRINT #PN,"  3. TABULATED DATA REPORT   |"
040C        PRINT #PN,"  4. PEAK STATUS REPORT      |"
0433        PRINT #PN,"  5. TAILORING AND TRENDS    |"
045A        PRINT #PN,"  6. LOGOUT                  |"
0481        PRINT #PN,"  7. SPECIALS                |"
04A8        PRINT #PN,"  SELECT (1 - 7) :           ";
04CE        GOTO 5
04D2        ENDIF
04D4 99
04D8        LGO=0
04DF        SS9$="SECURE"
04EC        RUN SS9$(3,1,IERR)
04FC        OPEN #PN2,"ITCB3":UPDATE
050C        SEEK #PN2,502.
0519        PUT #PN2,LGO
0523        CLOSE #PN2
0529        RUN SS9$(3,2,IERR)
0539        KILL SS9$
053E        COM$="CLEAR "+PT$
054F        SHELL COM$
0554        GOTO 5
PROCEDURE CON2
0000        PARAM SSD$:STRING[8]
000C        PARAM BRANCH,PN,HALT,IHGO,LGO:INTEGER
0023        DIM J,IERR:INTEGER
002E        DIM PN2:INTEGER
0035        ON ERROR GOTO 99
003B        PRINT #PN,
0042        IF BRANCH=7 THEN
004E           RUN SSD$(HALT,IHGO)
005D           KILL SSD$
0062           IF HALT=1 THEN
006E              SSD$="INKEY"
007A              KILL SSD$
007F              SHELL "UNLINK M1,M3,INKEY"
0095              CLOSE #PN
009B              END
009D           ENDIF
009F        ENDIF
00A1        IF BRANCH=2 OR BRANCH=3 THEN
00B4           RUN SSD$(1,"/M1")
00C2        ENDIF
00C4        IF BRANCH=1 OR BRANCH=5 THEN
00D7           RUN SSD$
00DB        ENDIF
00DD        IF BRANCH=4 THEN
00E9           RUN SSD$(1,0,.0,.0,"/M1")
0108        ENDIF
010A        KILL SSD$
010F        SSD$="KB"
0118        KILL SSD$
011D        IF BRANCH=6 THEN
0129           FOR J=1 TO 21
0139              PRINT #PN,
0140           NEXT J
014B           PRINT #PN,"                    LOGOUT"
016D           LGO=0
0174           SS9$="SECURE"
0181           RUN SS9$(3,1,IERR)
0191           OPEN #PN2,"ITCB3":UPDATE
01A1           SEEK #PN2,502.
01AE           PUT #PN2,LGO
01B8           CLOSE #PN2
01BE           RUN SS9$(3,2,IERR)
```

```
01CE        KILL SS9$
01D3        SSD$="MODEM"
01DF        RUN SSD$(0,"/M1","825",0)
01F6        KILL SSD$
01FB      ENDIF
01FD      END
01FF 99
0203      CCM$="CLEAR "+PT$
0214      SHELL COM$
PROCEDURE TPRINT
0000      PARAM MODE:INTEGER; P(3,6,11):REAL
001A      PARAM PT$:STRING[3]
0026      DIM PTT:INTEGER
002D      DIM I,J,K:INTEGER
003C      DIM UT$(6):STRING[8]
004D      DIM COM$:STRING[9]
0059      DIM TT$(6):STRING[15]
006A      DIM SS$:STRING[8]
0076      DATA "ENG. FUEL USAGE ","ELEC. GENERATED","THERMAL TO HEAT"
00B1      DATA "THERMAL TO COOL","COOLING OUTPUT ","SILENCER H/X UA"
00EB      DATA "BTUS/HR.","KWH       ","BTUS/HR.","BTUS/HR."
011B      DATA "BTUS/HR.","BTU/HR-F"
0135      ON ERROR GOTO 99
013B      OPEN #PTT,PT$:WRITE
0147      FOR I=1 TO 6
0157        READ TT$(I)
0160      NEXT I
016B      FOR I=1 TO 6
017B        READ UT$(I)
0184      NEXT I
018F      SS$="HPRINT"
019C      RUN SS$(7,PT$)
01A9      KILL SS$
01AE      PRINT #PTT," ",TT$(MODE);
01C0      PRINT #PTT," TRENDS. UNITS ARE IN "; UT$(MODE)
01E6      PRINT #PTT," ENTRY #","RANGE","STANDARD","OBSERVED","# OF OBSERVED"
0225      FOR I=1 TO 11
0235        J=(I-1)*10
0243        K=I*10-1
0251        IF K>100 THEN K=100
0263        ENDIF
0265        PRINT #PTT," "; I;
0274        PRINT #PTT,".",J;
0283        PRINT #PTT," - "; K,P(1,MODE,I),P(2,MODE,I),P(3,MODE,I)
02B7      NEXT I
02C2 99
02C6      ON ERROR GOTO 100
02CC      CLOSE #PTT
02D2      COM$="CLEAR "+PT$
02E3      SHELL COM$
02E8 100
PROCEDURE HPRINT
0000      PARAM MODE:INTEGER
0007      PARAM PT$:STRING[3]
0013      DIM PTT:INTEGER
001A      DIM I:INTEGER
0021      DIM HEAD$:STRING[29]
002D      DIM COM$:STRING[9]
0039      DATA "DIAGNOSTIC STATUS","SENSOR/ACTUATOR"
0063      DATA "HOURLY TABULATED DATA","DAILY TABULATED DATA"
0096      DATA "MONTHLY TABULATED DATA","YEARLY TABULATED DATA"
00CB      DATA "COGEN PERFORMANCE","PEAK STATUS"
00F1      ON ERROR GOTO 99
00F7      FOR I=1 TO MODE
0108        READ HEAD$
010D      NEXT I
0118      HEAD$=HEAD$+" REPORT"
012A      OPEN #PTT,PT$:WRITE
0136      PRINT #PTT,
```

```
013D        PRINT #PTT," "; MID$(DATE$,1,9);
014F        PRINT #PTT,"                HONEYWELL COGEN CONTROLLER";
0184        PRINT #PTT,"                        "; MID$(DATE$,10,5)
01A9        PRINT #PTT,"","               "; HEAD$
01C4 99
01C8        ON ERROR GOTO 100
01CE        CLOSE #PTT
01D4        COM$="CLEAR "+PT$
01E5        SHELL COM$
01EA 100
PROCEDURE DSTAT
 0000       DIM SS2$,SS$:STRING[8]
 0010       DIM ZINT,ONER:BYTE; IT,SEL,SEL2:INTEGER; XT:REAL
 002F       DIM WARN$:STRING[11]
 003B       DIM ACK:BYTE
 0042       DIM FUNC$(2):STRING[5]
 0053       DATA 0,1,"KB","CLEAR","ACK"
 0070       READ ZINT,ONER,SS2$,FUNC$(1),FUNC$(2)
 008B 10
 008F       PRINT " 1. STATUS MESSAGES"
 00A6       PRINT "    1. PROBLEMS ARE FIXED - CLEAR MESSAGES"
 00D4       PRINT "    2. ACKNOWLEDGE MESSAGES"
 00F3       PRINT "    3. PRINT MESSAGES"
 010C       PRINT "    0. QUIT"
 011B       PRINT " SELECT (0 - 3) : ";
 0132       RUN SS2$(ZINT,SEL,XT)
 0146       IF SEL<0 OR SEL>3 THEN GOTO 10
 015C       ENDIF
 015E       IF SEL=0 THEN END
 016B       ENDIF
 016D 20
 0171       IF SEL<3 THEN
 017D          PRINT " 1.";SEL; " SELECT MESSAGE TO "; FUNC$(SEL);
 01A6          PRINT " (1 - 40) OR 0 TO QUIT : ";
 01C4          RUN SS2$(ZINT,SEL2,XT)
 01D8          IF SEL2>40 THEN GOTO 20
 01E7          ENDIF
 01E9          IF SEL2=0 THEN GOTO 10
 01F8          ENDIF
 01FA          IF SEL2<0 THEN
 0206             SEL2=-(SEL2)
 020F             ACK=2
 0216          ELSE
 021A             ACK=SEL-1
 0225          ENDIF
 0227          SS$="ENCODE"
 0234          RUN SS$(SEL2,ACK)
 0243          KILL SS$
 0248          GOTO 20
 024C       ENDIF
 024E       IF SEL=3 THEN
 025A          SS$="STATUS"
 0267          RUN SS$("/T1")
 0272          PRINT " PRESS RETURN TO CONTINUE - ";
 0293          RUN SS2$(ZINT,IT,XT)
 02A7       ENDIF
 02A9       GOTO 10
PROCEDURE ENCODE
 0000       PARAM N:INTEGER; ACK:BYTE
 000D       DIM XT:REAL; PN:INTEGER
 001A       DIM WARN$:STRING[11]
 0026       WARN$=MID$(DATE$,4,5)+" "+MID$(DATE$,10,5)
 003C       OPEN #PN,"ITCB9":UPDATE
 004C       XT=FLOAT((N-1)*12)
 005B       SEEK #PN,XT
 0065       PUT #PN,ACK
 006F       PUT #PN,WARN$
 0079       CLOSE #PN
```

```
PROCEDURE STATUS
0000       PARAM PT$:STRING[3]
000C       DIM PTT:INTEGER
0013       DIM SC,SE:INTEGER
001E       DIM SM$(7):STRING[4]
002F       DIM COM$:STRING[9]
003B       DIM WARN$:STRING[11]; ACK:BYTE
004D       DIM TITLE$:STRING[15]; TRIG:INTEGER; THRESH:REAL; WTYPE:BYTE
006B       DIM A$(2):STRING[6]
007C       DIM M,I,JJ,J:INTEGER
008F       DIM PN,PN2:INTEGER
009A       DIM WT$(3):STRING[8]; NWARN:INTEGER
00B1       DIM SS$:STRING[8]
00BD       DATA "WARNINGS","ALARMS  ","NOTICES ",40,"ACK","NO ACK"
00F4       DATA "OFF","ON","TLF","ELF","LIM","FIX","ECON"
0122       ON ERROR GOTO 99
0128       OPEN #PTT,PT$:WRITE
0134       FOR M=1 TO 3
0144         READ WT$(M)
014D       NEXT M
0158       READ NWARN
015D       READ A$(1)
0165       READ A$(2)
016D       FOR M=1 TO 7
017D         READ SM$(M)
0186       NEXT M
0191       OPEN #PN,"ITCB9":READ
01A1       OPEN #PN2,"ITCB10":READ
01B2       SS$="HPRINT"
01BF       RUN SS$(1,PT$)
01CC       KILL SS$
01D1       JJ=0
01D8       FOR M=1 TO 3
01E8         SEEK #PN,.0
01F5         SEEK #PN2,.0
0202         FOR I=1 TO NWARN
0213           IF I=1 THEN PRINT #PTT,"     "; WT$(M); " : ";
0239             J=0
0240           ENDIF
0242           GET #PN,ACK
024C           GET #PN,WARN$
0256           GET #PN2,TITLE$
0260           GET #PN2,TRIG
026A           GET #PN2,THRESH
0274           GET #PN2,WTYPE
027E           IF ACK<>0 AND WTYPE=M THEN
0292             IF J<>0 THEN PRINT #PTT,"            ";
02B6             ENDIF
02B8             PRINT #PTT USING "I3>",I;
02C9             PRINT #PTT,". ";
02D5             PRINT #PTT USING "S15<",TITLE$;
02E7             PRINT #PTT," AT "; WARN$; " - "; A$(ACK)
0305             IF J>0 THEN
0311               JJ=JJ+1
031C             ENDIF
031E             J=J+1
0329           ENDIF
032B         NEXT I
0336         IF J=0 THEN PRINT #PTT,"NONE"
034E         ENDIF
0350       NEXT M
035B       WHILE 8-JJ>0 DO
036A         PRINT #PTT,
0371         JJ=JJ+1
037C       ENDWHILE
0380       CLOSE #PN
```

```
0386        OPEN #PN,"ITCB3":READ
0396        SEEK #PN,466.
03A3        GET #PN,SC
03AD        GET #PN,SE
03B7        GET #PN,SE
03C1        CLOSE #PN
03C7        IF SC>7 OR SC<1 THEN SC=1
03E0        ENDIF
03E2        IF SE>7 OR SE<1 THEN SE=1
03FB        ENDIF
03FD        PRINT #PTT,"      MODE SCHEDULED : "; SM$(SC);
0423        PRINT #PTT,"; MODE SELECTED : "; SM$(SE)
0445        CLOSE #PN2
044B 99
044F        ON ERROR GOTO 100
0455        CLOSE #PTT
045B        COM$="CLEAR "+PT$
046C        SHELL COM$
0471 100
PROCEDURE DTAIL
0000        DIM SEL,SELT:INTEGER
000B        DIM ZINT,ONER:BYTE; XT:REAL
001C        DIM TL(80):REAL; ITL(56):INTEGER
0033        DIM IERR,PN,I,J,K:INTEGER
004A        DIM SSD$(6):STRING[8]
005B        DIM SS9$,SS2$,SS$:STRING[8]
006F        DIM MIT$(6):STRING[6]
0080        DATA "DN12"," 5.1","DN14","   5.2"
00A2        DATA "DN33","   5.3","DN13","   5.4"
00C6        DATA "DN15","   5.5.","DN4P2","   5.6"
00EB        DATA "KB",0,1
00FA        ON ERROR GOTO 99
0100        FOR PN=1 TO 6
0110           READ SSD$(PN)
0119           READ MIT$(PN)
0122        NEXT PN
012D        SS9$="SECURE"
013A        RUN SS9$(3,1,IERR)
014A        OPEN #PN,"ITCB3":READ
015A        GET #PN,TL
0164        GET #PN,ITL
016E        CLOSE #PN
0174        RUN SS9$(3,2,IERR)
0184        KILL SS9$
0189        READ SS2$,ZINT,ONER
0196 2
019A        PRINT " 5. ON-LINE TAILORING PACKAGE"
01BB        PRINT "    1. SCHEDULES AND RATCHET"
01DB        PRINT "    2. COGEN SETPOINTS AND LOAD PRIORITY"
0207        PRINT "    3. COGEN PERFORMANCE DATA"
0228        PRINT "    4. AUTOMATIC REPORT GENERATION"
024E        PRINT "    5. SET THE CLOCK"
0266        PRINT "    6. CONTROL LOOP GAINS"
0283        PRINT "    7. PRINT CONTENT OF TAILORING BUFFER"
02AF        PRINT "    8. SEND CHANGES TO THE 620"
02D1        PRINT "    9. OFF-LINE TAILORING PACKAGE"
02F6        PRINT "    0. QUIT"
0305        PRINT " SELECT (0 - 9) : ";
031C        RUN SS2$(ZINT,SEL,XT)
0330        IF SEL>9 OR SEL<0 THEN GOTO 2
0346        ENDIF
0348        IF SEL=0 OR SEL>7 THEN
035B           RUN SS9$(3,1,IERR)
036B           OPEN #PN,"ITCB3":UPDATE
037B           PUT #PN,TL
0385           PUT #PN,ITL
038F           CLOSE #PN
0395           RUN SS9$(3,2,IERR)
```

```
03A5            KILL SS9$
03AA            IF SEL=8 THEN
03B6               SS$="SDBUF"
03C2               RUN SS$(TL,ITL)
03D1               KILL SS$
03D6            ENDIF
03D8            IF SEL=9 THEN
03E4               SS$="TAILOR"
03F1               RUN SS$
03F5               KILL SS$
03FA            ENDIF
03FC            END
03FE         ENDIF
0400         IF SEL<7 THEN
040C            SS$=SSD$(SEL)
0417         ENDIF
0419         ON SEL GOSUB 55,55,30,55,50,60,70
043C         IF SEL<7 THEN KILL SS$
044C         ENDIF
044E         GOTO 2
0452 30
0456         RUN SS$(MIT$(SEL),"/M1")
0469         RETURN
046B 50
046F         RUN SS$(MIT$(SEL))
047C         RETURN
047E 55
0482         RUN SS$(TL,ITL,MIT$(SEL))
0499         RETURN
049B 60
049F         SELT=SEL
04A7         RUN SS$(TL,ITL,SELT)
04BB         RETURN
04BD 70
04C1         PRINT " 5.7 TAILORING BUFFER ON "; DATE$
04E0         FOR I=1 TO 34
04F0            FOR J=1 TO 4
0500               PRINT "   ";
0508               K=(I-1)*4+J
051A               PRINT USING "I4>",K;
0527               PRINT ". ";
052E               IF K<81 THEN
053A                  PRINT USING "R10.2<",TL(K);
054D               ELSE
0551                  PRINT USING "I10<",ITL(K-80);
0565               ENDIF
0567            NEXT J
0572            PRINT
0574            IF I=20 THEN GOSUB 200
0583            ENDIF
0585         NEXT I
0590         GOSUB 200
0594         RETURN
0596 99
059A         SHELL "CLEAR /M1"
05A7         END
05A9 200
05AD         PRINT " MORE TO COME, PRESS RETURN TO CONTINUE...";
05DC         RUN KB(ZINT,SEL,XT)
05F0         RETURN
PROCEDURE SENSOR
0000         PARAM MODE:INTEGER
0007         PARAM PT$:STRING[3]
0013         DIM SENS,ACT:REAL
001E         DIM U$:STRING[4]
002A         DIM TITLE$:STRING[15]
0036         DIM COM$:STRING[9]
0042         DIM SS2$,SS$:STRING[8]
```

```
0052      DIM ZINT,ONER:BYTE; IT:INTEGER; XT:REAL
0069      DIM NSEN,NACT,PTT,I,PN,PN2:INTEGER
0084      DATA 56,24,"KB",0,1
0099      ON ERROR GOTO 99
009F      READ NSEN,NACT,SS$,ZINT,ONER
00B4      OPEN #PTT,PT$:WRITE
00C0      SS2$="HPRINT"
00CD      RUN SS2$(2,PT$)
00DA      KILL SS2$
00DF      PRINT #PTT," SENSOR REPORT"
00F6      PRINT #PTT,"   NUMBER","DESCRIPTION"; "        "; "READING"
012B      OPEN #PN2,"ITCB1":READ
013B      OPEN #PN,"ITCB6":READ
014B      FOR I=1 TO NSEN
015C         GOSUB 10
0160         IF (I=20 OR I=40) AND MODE=1 THEN
017A            GOSUB 15
017E         ENDIF
0180      NEXT I
018B      IF MODE=1 THEN
0197         GOSUB 15
019B      ENDIF
019D      PRINT #PTT," ACTUATOR REPORT"
01B6      PRINT #PTT,"   NUMBER","DESCRIPTION       SETTING"
01E5      FOR I=1 TO NACT
01F6         GOSUB 10
01FA         IF I=8 AND MODE=1 THEN
020D            GOSUB 15
0211         ENDIF
0213      NEXT I
021E      IF MODE=1 THEN
022A         PRINT #PTT," PRESS RETURN TO GO BACK TO 0. ";
0253         PRINT #PTT,"MAIN COMMAND MENU...";
0271         RUN SS$(ZINT,IT,XT)
0285         KILL SS$
028A      ENDIF
028C      CLOSE #PN2
0292      CLOSE #PN
0298      CLOSE #PTT
029E      END
02A0 10   GET #PN,TITLE$
02AD      GET #PN,U$
02B7      PRINT #PTT,"    "; I; ".",
02CD      PRINT #PTT USING "S17<",TITLE$;
02DF      GET #PN2,XT
02E9      PRINT #PTT USING "R10.3<",XT;
02FD      PRINT #PTT," "; U$
030B      RETURN
030D 15
0311      PRINT #PTT," MORE TO COME, PRESS RETURN TO CONTINUE...";
0345      RUN SS$(ZINT,IT,XT)
0359      RETURN
035B 99
035F      ON ERROR GOTO 100
0365      COM$="CLEAR "+PT$
0376      SHELL COM$
037B      CLOSE #PTT
0381      CLOSE #PN2
0387      CLOSE #PN
038D 100
PROCEDURE REPORT
0000      PARAM MODE:INTEGER
0007      DIM NCALC:INTEGER
000E      DIM SS1$,SS$,SS2$:STRING[8]
0022      DIM ZINT:BYTE; SEL:INTEGER; XT:REAL
0035      DIM PN:INTEGER
003C      DATA 0,"MATRIX",20,"KB"
0054      READ ZINT,SS$,NCALC,SS2$
0065 5
0069      PRINT " 3. TABULATED DATA REPORT MENU"
```

```
008B         PRINT "   1. CURRENT HOUR TOTALS"
00A9         PRINT "   2. CURRENT DAY TOTALS"
00C6         PRINT "   3. CURRENT MONTH TOTALS"
00E5         PRINT "   4. CURRENT YEAR TOTALS"
0103         PRINT "   0. QUIT"
0112         PRINT " SELECT (0 - 4) : ";
0129         RUN SS2$(ZINT,SEL,XT)
013D         IF SEL<0 OR SEL>4 THEN GOTO 5
0153         ENDIF
0155         KILL SS2$
015A         IF SEL=0 THEN END
0167         ENDIF
0169         SS1$="HPRINT"
0176         RUN SS1$(SEL+2,"/M1")
0188         KILL SS1$
018D         RUN SS$(MODE,SEL,NCALC,"/M1")
01A7         KILL SS$
01AC         GOTO 5
PROCEDURE MATRIX
0000         PARAM MODE,IP,NCALC:INTEGER
000F         PARAM PT$:STRING[3]
001B         DIM PTT:INTEGER
0C22         DIM ZINT:BYTE; IT:INTEGER; XT,XTT:REAL
0039         DIM UNIT$:STRING[4]
0045         DIM COM$:STRING[9]
0051         DIM TITLE$:STRING[6]
005D         DIM NB,I,J,K,KL,NN,ID,OS:INTEGER
0080         DIM PN1:INTEGER
0087         DIM M(3):INTEGER
0093         DIM X(4,20),Y(20):REAL
00AC         DIM SS$,SS2$:STRING[8]
00BC         DATA "KB",1,24,31,12,0,"ARCH"
00DB         ON ERROR GOTO 99
00E1         READ SS2$,ID,M(1),M(2),M(3),ZINT,SS$
0107         OPEN #PTT,PT$:WRITE
0113         OPEN #PN1,"ITCB4"
0121         GET #PN1,X
012B         CLOSE #PN1
0131         OPEN #PN1,"ITCB7":READ
0141         ID=1
0148         I=MOD(NCALC,4)
0153         IF I=0 THEN NB=NCALC/4
0169         ELSE NB=NCALC/4+1
017A         ENDIF
017C         FOR I=1 TO NB
018D            PRINT #PTT,
0194            PRINT #PTT,"    ";
01A1            IF I=NB AND MOD(NCALC,4)>0 THEN KL=MOD(NCALC,4)
01C2            ELSE KL=4
01CC            ENDIF
01CE            XTT=FLOAT(I-1)*40.
01E1            SEEK #PN1,XTT
01EB            FOR K=1 TO KL
01FC               GET #PN1,TITLE$
0206               GET #PN1,UNIT$
0210               IF I+K-1>NCALC THEN
0224                  TITLE$="      "
0231               ENDIF
0233               PRINT #PTT,"    ";
0243               PRINT #PTT USING "S6<",TITLE$;
0254               PRINT #PTT,"       ";
0265            NEXT K
0270            PRINT #PTT,
0277            IF IP>1 THEN
0283               FOR J=1 TO M(IP-1)
029A                  PRINT #PTT USING "I3<",J;
02AB                  OS=J-1
02B6                  RUN SS$(Y,ID,IP-1,OS)
```

```
02D1              FOR K=1 TO KL
02E2                 NN=(I-1)*4+K
02F4                 PRINT #PTT USING "E12.5>,S7",Y(NN); "       ";
0318              NEXT K
0323              PRINT #PTT,
032A              IF MODE=1 AND (IP=2 AND J=12 OR IP=3 AND J=15) THEN
0352              ENDIF
0354            NEXT J
035F          ENDIF
0361          PRINT #PTT,"    ";
036E          XTT=FLOAT(I-1)*40.
0381          SEEK #PN1,XTT
038B          FOR K=1 TO KL
039C             NN=(I-1)*4+K
03AE             GET #PN1,TITLE$
03B8             GET #PN1,UNIT$
03C2             PRINT #PTT USING "E12.5>,S1,S4,S2",X(IP,NN); " "; UNIT$
                 ; " ";
03F2          NEXT K
03FD          PRINT #PTT,
0404          IF IP>1 AND MODE=1 THEN
0417             GOSUB 80
041B          ENDIF
041D       NEXT I
0428       GOTO 99
042C 80
0430       PRINT #PTT," PRESS RETURN TO CONTINUE...";
0456       RUN SS2$(ZINT,IT,XT)
046A       RETURN
046C 99
0470       ON ERROR GOTO 100
0476       KILL SS$
047B       CLOSE #PN1
0481       CLOSE #PTT
0487       COM$="CLEAR "+PT$
0498       SHELL COM$
049D 100
PROCEDURE ARCH
  0000        PARAM XV(20):REAL
  000C        PARAM ID,IP,OS:INTEGER
  001B        DIM I,IERR,B(3):INTEGER
  002F        DIM FP:REAL
  0036        DIM PN:INTEGER
  003D        DIM SS9$:STRING[8]
  0049        DATA 0,480,1100
  0058        READ B(1),B(2),B(3)
  006E        FP=FLOAT(5*(B(IP)+20*OS))
  0084        SS9$="SECURE"
  0091        RUN SS9$(12,1,IERR)
  00A1        OPEN #PN,"ITCB12":UPDATE
  00B2        SEEK #PN,FP
  00BC        IF ID=1 THEN
  00C8           GET #PN,XV
  00D2        ELSE
  00D6           PUT #PN,XV
  00E0        ENDIF
  00E2        CLOSE #PN
  00E8        RUN SS9$(12,2,IERR)
  00F8        KILL SS9$
PROCEDURE PEAK
  0000        PARAM MODE,NUM:INTEGER; P,G:REAL
  0015        PARAM PT$:STRING[3]
  0021        DIM PTT:INTEGER
  0028        DIM I,J,K:INTEGER
  0037        DIM T$:STRING[17]
  0043        DIM SS$:STRING[4]
  004F        DIM SS2$:STRING[8]
  005B        DIM ZINT,ONER:BYTE; IT:INTEGER; XT,PT:REAL
```

```
0076       DIM COM$:STRING[9]
0082       DIM R$(9):STRING[8]
0093       DIM PN:INTEGER
009A       DATA "KB",0,1
00A9       DATA "YEAR","MONTH","DAY","RATCHET","HOUR","TO DATE,","OFF PEAK"
00E9       DATA " ON PEAK"," "
00FC       DATA 1,6,7,1,6,8,2,6,7,2,6,8,3,6,7,3,6,8,4,6,7,4,6,8,5,6,9
0151       ON ERROR GOTO 8
0157       OPEN #PTT,PT$:WRITE
0163       OPEN #PN,"ITCB15":UPDATE
0174       IF MODE<2 THEN
0180         READ SS$,ZINT,ONER
018D         FOR I=1 TO 9
019D           READ R$(I)
01A6         NEXT I
01B1         SS2$="HPRINT"
01BE         RUN SS2$(8,PT$)
01CB         KILL SS2$
01D0         PRINT #PTT,"                        IMPORTED   GENERATED"
0209         FOR I=1 TO 9
0219           GET #PN,P
0223           GET #PN,G
022D           GET #PN,T$
0237           PRINT #PTT," ";
0242           FOR J=1 TO 3
0252             READ K
0257             PRINT #PTT USING "S8<",R$(K);
026B           NEXT J
0276           PRINT #PTT," : ";
0283           PRINT #PTT USING "E10.3<",P;
0297           PRINT #PTT USING "E10.3<",G;
02AB           PRINT #PTT USING "S18>",T$
02BC         NEXT I
02C7         IF MODE=1 THEN
02D3           PRINT #PTT," PRESS RETURN TO GO BACK TO 0. ";
02FC           PRINT #PTT,"MAIN COMMAND MENU...";
031A           RUN SS$(ZINT,IT,XT)
032E           KILL SS$
0333         ENDIF
0335       ELSE
0339         IF MODE=3 THEN
0345           XT=FLOAT(27*(NUM-1))
0354           GOSUB 10
0358         ELSE
035C           FOR I=1 TO 5
036C             XT=FLOAT((2*(I-1)+NUM)*27)
0382             IF XT>216. THEN XT=216.
039C           ENDIF
039E           SEEK #PN,XT
03A8           GET #PN,PT
03B2           IF PT<P THEN GOSUB 10
03C2           ENDIF
03C4         NEXT I
03CF         ENDIF
03D1       ENDIF
03D3       CLOSE #PN
03D9       CLOSE #PTT
03DF       END
03E1  8
03E5       ON ERROR GOTO 9
03EB       CLOSE #PN
03F1       CLOSE #PTT
03F7       COM$="CLEAR "+PT$
0408       SHELL COM$
040D  9
0411       END
0413 10
0417       SEEK #PN,XT
0421       PUT #PN,P
```

```
042B         PUT #PN,G
0435         T$=DATE$
043B         PUT #PN,T$
0445         RETURN
PROCEDURE PWORD
0000         PARAM LGO:INTEGER
0007         DIM IERR,MIN,PN:INTEGER
0016         DIM PW$,SS9$,SS1$:STRING[8]
002A         DIM N,UL,I,IDE.IT:INTEGER
0041         DIM IN$:STRING[1]
004D         DATA "",0,"",8,"INKEY"
0065         ZINT=0
006D         ON ERROR GOTO 13
0073         READ PW$,IT,IN$,UL,SS1$
0088  1
008C         MIN=VAL(MID$(DATE$,13,2))
0099         PRINT " ENTER THE PASSWORD : ";
00B4         REPEAT
00B6           RUN SS1$(IN$,1)
00C3           IF IN$=CHR$(8) OR IN$=CHR$(127) THEN
00D8             IT=IT-1
00E3             IF IT<0 THEN IT=0
00F5             ENDIF
00F7             IF IN$=CHR$(127) THEN
0104               PRINT CHR$(8); " "; CHR$(8);
0112             ENDIF
0114           ELSE
0118             IF LEN(IN$)>0 THEN
0125               IT=IT+1
0130               PW$=PW$+IN$
013C             ENDIF
013E           ENDIF
0140         UNTIL IT>UL OR VAL(MID$(DATE$,13,2))<>MIN OR IN$=CHR$(13)
0161         PRINT
0163         PW$=LEFT$(PW$,IT-1)
0172         IF PW$="DOODA" THEN
0183           LGO=1
018A           PRINT " PASSWORD ACCEPTED"
01A0         ELSE
01A4           LGO=0
01AB           PRINT " PASSWORD REJECTED"
01C1         ENDIF
01C3         SS9$="SECURE"
01D0         RUN SS9$(3,1,IERR)
01E0         OPEN #PN,"ITCB3":UPDATE
01F0         SEEK #PN,502.
01FD         PUT #PN,LGO
0207         CLOSE #PN
020D         RUN SS9$(3,2,IERR)
021D         KILL SS9$
0222  13
0226         KILL SS1$
022B         SHELL "CLEAR /M1"
PROCEDURE SPEC
0000         PARAM HALT,IHGO:INTEGER
000B         DIM ZINT,ONER:BYTE; SEL,IERR,PN:INTEGER; XT:REAL
002A         DIM SS$:STRING[8]
0036         DIM B(100),DL,SP(10):REAL
004F         DIM CC$:STRING[2]
005B         DIM PT$:STRING[3]
0067         DIM SAM(10),TIMES,AD,AD1,AD2,AD3:INTEGER
0087         DATA 0,1,4401,4301,4501,4201
00A1         DATA 1,2,14,58,59,60,61,62,57,17,5,.0
00CD         DATA "/M1","T4"
00DC         READ ZINT,ONER,AD,AD1,AD2,AD3
00F5         FOR SEL=1 TO 10
0105           READ SAM(SEL)
010E         NEXT SEL
```

```
0119        READ TIMES,DL,PT$,CC$
012A        SS$="SECURE"
0137        RUN SS$(3,1,SEL)
0147        KILL SS$
014C        OPEN #PN,"ITCB3":READ
015C        SEEK #PN,500.
0169        GET #PN,SEL
0173        CLOSE #PN
0179        RUN SS$(3,2,IERR)
0189        KILL SS$
018E        IF SEL>0 AND SEL<5 THEN CC$="T"+STR$(SEL)
01AD        ENDIF
01AF        HALT=0
01B6 5
01BA        PRINT " 7. SPECIALS"
01CA        PRINT "    1. HALT ";
01DB        IF HALT=0 THEN PRINT "DISABLED"
01F2        ELSE PRINT "ENABLED"
0200        ENDIF
0202        PRINT "    2. START-UP PACKAGE"
021D        PRINT "    3. MODEM ON-LINE SENSOR"
023C        PRINT "    4. HOURLY CHORES ";
0256        IF IHGO=0 THEN PRINT "DISABLED"
026D        ELSE PRINT "ENABLED"
027B        ENDIF
027D        PRINT "    5. SET UP FOR AUTO SAMPLE"
029E        PRINT "    6. AUTO-SAMPLE"
02B4        PRINT "    7. QUIT"
02C3        PRINT " SELECT (1 - 7) : ";
02DA        SS$="KB"
02E3        RUN SS$(ZINT,SEL,XT)
02F7        KILL SS$
02FC        IF SEL<1 OR SEL>7 THEN GOTO 5
0312        ENDIF
0314        IF SEL=7 THEN END
0321        ENDIF
0323        ON SEL GOSUB 10,20,30,40,50,60
0342        GOTO 5
0346 10
034A        IF HALT=1 THEN HALT=0
035C        ELSE HALT=1
0366        ENDIF
0368        RETURN
036A 20
036E        SS$="START"
037A        RUN SS$
037E        KILL SS$
0383        RETURN
0385 30
0389        OPEN #PN,"ITCB1":UPDATE
0399        SEEK #PN,240.
03A6        GET #PN,XT
03B0        PRINT " 7.3 MODEM SENSOR INDICATES : MODEM ";
03D9        IF XT<.5 THEN PRINT "OFF-LINE"
03F4        ELSE PRINT "ON-LINE"
0402        ENDIF
0404        PRINT "       ENTER 1 TO GO ON-LINE, 0 TO GO OFF-LINE : ";
0438        SS$="KB"
0441        RUN SS$(ONER,SEL,XT)
0455        KILL SS$
045A        SEEK #PN,240.
0467        PUT #PN,XT
0471        CLOSE #PN
0477        RETURN
0479 40
047D        IF IHGO=0 THEN IHGO=1
048F        ELSE IHGO=0
0499        ENDIF
049B        RETURN
049D 50
04A1        SS$="SU2"
```

```
04AB          RUN SS$(B,SP,TIMES,SAM,SEL,AD,AD1,AD2,AD3,PT$,CC$,DL)
04EC          KILL SS$
04F1          RETURN
04F3   60
04F7          SS$="AUTOSM"
0504          RUN SS$(SP,TIMES,SAM,AD1,AD3,PT$,CC$,DL)
0531          KILL SS$
0536          RETURN
PROCEDURE CCS
0000          DIM SS$:STRING[8]
000C          DIM I,J:INTEGER
0017          SS$="SECURE"
0024          FOR I=1 TO 16
0034             RUN SS$(I,2,J)
0046          NEXT I
0051          KILL SS$
0056          SS$="EXEC"
0061          ON ERROR GOTO 10
0067   10
006B          RUN SS$
006F          GOTO 10
PROCEDURE DIAG
0000          PARAM SENS(56):REAL
000C          DIM PN1,PN2:INTEGER
0017          DIM IERR,I,J,NDIAG:INTEGER
002A          DIM SS9$,SS$:STRING[8]
003A          DIM ACK,WT:BYTE
0045          DIM TG:INTEGER; XT,TR:REAL
0056          DIM W$:STRING[11]
0062          DIM T$:STRING[15]
006E          DIM TL(80):REAL
007A          DIM ITL(56):INTEGER
0086          DATA 40
008D          READ NDIAG
0092          OPEN #PN1,"ITCB9":UPDATE
00A2          OPEN #PN2,"ITCB10":READ
00B3          SEEK #PN1,144.
00C0          SEEK #PN2,276.
00CD          FOR I=13 TO NDIAG
00DE             GET #PN1,ACK
00E8             GET #PN1,W$
00F2             GET #PN2,T$
00FC             GET #PN2,TG
0106             GET #PN2,TR
0110             GET #PN2,WT
011A             IF WT>0 THEN
0126                IF ACK=0 THEN
0132                   IF TR>.0 AND SENS(TG)>TR OR TR<.0 AND SENS(TG)<ABS(TR
                       ) THEN
0164                      ACK=2
016B                      W$=MID$(DATE$,4,5)+" "+MID$(DATE$,10,5)
0181                      XT=FLOAT((I-1)*12)
0190                      SEEK #PN1,XT
019A                      PUT #PN1,ACK
01A4                      PUT #PN1,W$
01AE                   ENDIF
01B0                ENDIF
01B2             ENDIF
01B4          NEXT I
01BF          CLOSE #PN2
01C5          CLOSE #PN1
01CB          SS9$="SECURE"
01D8          RUN SS9$(3,1,IERR)
01E8          KILL SS9$
01ED          IF IERR<99 THEN
01F9             OPEN #PN1,"ITCB3":UPDATE
0209             GET #PN1,TL
0213             GET #PN1,ITL
021D             FOR J=1 TO 2
022D                IF TL(77+J)>FLOAT(ITL(36+J)) OR TL(77+J)<.0 THEN
```

```
0258            SS$="ENCODE"
0265            WT=2
026C            RUN SS$(J+7,WT)
027D            KILL SS$
0282            TL(77+J)=.0
0294         ENDIF
0296      NEXT J
02A1      SEEK #PN1,385.
02AE      PUT #PN1,TL(78)
02BB      PUT #PN1,TL(79)
02C8      CLOSE #PN1
02CE      IF ITL(49)>0 THEN
02DC         SS$="ENCODE"
02E9         WT=2
02F0         RUN SS$(10,WT)
02FD         KILL SS$
0302      ENDIF
0304      IF ITL(39)>0 THEN
0312         SS$="ENCODE"
031F         WT=2
0326         RUN SS$(5,WT)
0333         KILL SS$
0338      ENDIF
033A      IF ITL(40)>0 THEN
0348         SS$="ENCODE"
0355         WT=2
035C         RUN SS$(1,WT)
0369         KILL SS$
036E      ENDIF
0370      PN2=PEEK(139)
0378      IF PN2=1 THEN
0384         SS$="ENCODE"
0391         WT=2
0398         RUN SS$(4,WT)
03A5         KILL SS$
03AA      ENDIF
03AC      RUN SS9$(3,2,IERR)
03BC      KILL SS9$
03C1   ENDIF
PROCEDURE LOOKUP
0000      PARAM MODE:INTEGER
0007      PARAM CER,CES,CXH,CXC,CCG,CD:REAL
0022      PARAM DP:BYTE
0029      DIM C(10):REAL
0035      DIM TEMP$:STRING[17]
0041      DIM PN,IERR,D,H,I:INTEGER
0058      DIM SCHED(2,7,24):BYTE
006C      DIM SS$:STRING[8]
0078      DATA 5,.05,.0,5.,6.,4.,10.,1
00AC      READ MODE,CER,CES,CXH,CXC,CCG,CD,DP
00CD      TEMP$=DATE$
00D3      H=VAL(MID$(DATE$,10,2))+1
00E4      IF H<1 OR H>24 THEN H=1
00FD      ENDIF
00FF      I=0
0106      REPEAT
0108         D=PEEK($DF06)
0111         I=I+1
011C      UNTIL I>42 OR D>0 AND D<8
0135      IF D<1 OR D>7 THEN D=2
014E      ENDIF
0150      SS$="SECURE"
015D      RUN SS$(5,1,IERR)
016D      KILL SS$
0172      IF IERR<99 THEN
017E         OPEN #PN,"ITCB5":READ
018E         GET #PN,SCHED
0198         CLOSE #PN
019E         RUN SS$(5,2,IERR)
01AE         KILL SS$
```

```
01B3        OPEN #PN,"ITCB3":READ
01C3        GET #PN,C
01CD        SEEK #PN,250.
01DA        GET #PN,C(10)
01E7        CLOSE #PN
01ED        IF SCHED(2,D,H)=2 THEN
0201           CER=C(1)
020B           CES=C(3)
0215        ELSE
0219           CER=C(2)
0223           CES=C(4)
022D        ENDIF
022F        CXH=C(5)
0239        CXC=C(10)
0243        CCG=C(7)
024D        CD=C(9)
0257        MODE=SCHED(1,D,H)
0267        DP=SCHED(2,D,H)
0277     ENDIF

PROCEDURE INTEG
0000     PARAM XD(20):REAL
000C     DIM OS(4),C(4):REAL
0021     DIM X(4,20):REAL
0031     DIM I,IERR,J,K,L,PN,NCALC:INTEGER
0050     DIM DT:REAL
0057     DIM TT$:STRING[2]
0063     DIM T$:STRING[17]
006F     DIM SS9$:STRING[8]
007B     DATA 20
0082     READ NCALC
0087     SS9$="SECURE"
0094     RUN SS9$(4,1,IERR)
00A4     KILL SS9$
00A9     IF IERR<99 THEN
00B5        OPEN #PN,"ITCB4":UPDATE
00C5        GET #PN,X
00CF        SS$="TIMERS"
00DC        RUN SS$(1,18,DT)
00EC        RUN SS$(2,18,.0)
00FE        KILL SS$
0103        FOR I=1 TO 4
0113           FOR J=1 TO NCALC
0124              X(I,J)=XD(J)*DT+X(I,J)
0144           NEXT J
014F        NEXT I
015A        SEEK #PN,.0
0167        PUT #PN,X
0171        CLOSE #PN
0177        RUN SS9$(4,2,IERR)
0187        KILL SS9$
018C     ENDIF

PROCEDURE CALC
0000     PARAM SENS(56),ACT(24),XD(20):REAL
001E     DIM MODESC:INTEGER
0025     DIM EMAX,XUL,XLL,CER,TR,GIN,QAH,CES,CXH,CXC,CCG,CD:REAL
0058     DIM Z1,Z2,Z3,Z4,Z5:REAL
006F     DIM DP:BYTE
0076     DIM TL(80):REAL; ITL(56):INTEGER
008D     DIM DT:REAL
0094     DIM SS9$,SS$:STRING[8]
00A4     DIM IERR,NCALC,I:INTEGER
00B3     DIM PN:INTEGER
00BA     DATA 20,.5
00C8     DATA 1.,.0,1.,.0,1.,.0,1.,.0,1.,.0,1.,.0,1.,.0
012E     DATA 50000.,.0,50000.,.0,50000.,.0,50000.,.0
016A     DATA 1000000.,.0,1000000.,.0,1000000.,.0,1000000.,.0
01A6     DATA 1000000.,.0,1000000.,.0,1000.,.0,1000000.,.0,1000.,.0
```

```
01F0      ON ERROR GOTO 101
01F6      READ NCALC,TR
01FF      FOR I=1 TO NCALC
0210         XD(I)=.0
021F      NEXT I
022A      SS$="TABLE"
0236      RUN SS$(2,2,1.,EMAX)
024D      KILL SS$
0252      SS$="TIMERS"
025F      RUN SS$(1,20,DT)
026F      RUN SS$(2,20,DT)
027F      KILL SS$
0284      SS9$="SECURE"
0291      RUN SS9$(3,1,IERR)
02A1      KILL SS9$
02A6      IF IERR<99 THEN
02B2         OPEN #PN,"ITCB3":UPDATE
02C2         GET #PN,TL
02CC         GET #PN,ITL
02D6         IF ITL(36)>0 AND ITL(36)<6 THEN XD(ITL(36))=1.
02FD         ENDIF
02FF         IF ACT(20)>-.00001 AND ACT(20)<1.0001 THEN
031E            XD(6)=ACT(20)
032B            TL(78)=TL(78)+DT*XD(6)
0342         ENDIF
0344         IF ACT(1)>5. AND ACT(1)<105. OR ACT(6)>5. AND ACT(6)<105.
             THEN
037D            XD(7)=1.*ACT(20)
0391         ENDIF
0393         IF ACT(1)>5. AND ACT(1)<105. THEN TL(79)=TL(79)+DT*ACT(20
             )
03C8         ENDIF
03CA         TL(23)=SENS(17)/EMAX*4095.
03E2         SEEK #PN,110.
03EF         PUT #PN,TL(23)
03FC         SEEK #PN,385.
0409         PUT #PN,TL(78)
0416         PUT #PN,TL(79)
0423         CLOSE #PN
0429         RUN SS9$(3,2,IERR)
0439         KILL SS9$
043E         IF ACT(16)>.0 AND ACT(16)<1.0001 THEN
045D            XD(8)=ACT(16)
046A         ENDIF
046C         IF SENS(17)>.0 THEN
047E            XD(9)=SENS(18)+SENS(17)
0491         ENDIF
0493         SS$="LOOKUP"
04A0         RUN SS$(MODESC,CER,CES,CXH,CXC,CC,CD,DP)
04CD         KILL SS$
04D2         SS$="PEAK"
04DD         I=INT(DP)
04E7         RUN SS$(2,I,SENS(18),SENS(17),"/T1")
0508         KILL SS$
050D         IF DP=1 THEN
0519            XD(11)=SENS(17)
0526         ELSE
052A            XD(10)=SENS(17)
0537         ENDIF
0539         IF SENS(33)>.5 AND SENS(33)<1.0001 THEN
0558            IF SENS(6)<300. AND SENS(6)>40. THEN
0577               IF SENS(3)<300. AND SENS(3)>40. THEN
0596                  XD(12)=TL(13)*(SENS(6)-SENS(3))*SENS(33)
05B5               ENDIF
05B7            ENDIF
05B9            IF SENS(11)<300. AND SENS(11)>32. THEN
05D8               IF SENS(3)<300. AND SENS(3)>32. THEN
05F7                  XD(13)=TL(29)*(SENS(11)-SENS(3))*SENS(33)
0616               ENDIF
```

```
0618         ENDIF
061A        ENDIF
061C        IF SENS(34)>.5 AND SENS(34)<1.0001 THEN
063B          IF SENS(7)<300. AND SENS(7)>32. THEN
065A            IF SENS(10)<300. AND SENS(10)>32. THEN
0679              XD(14)=TL(14)*(SENS(7)-SENS(10))*SENS(34)
0698            ENDIF
069A          ENDIF
069C        IF ACT(16)>.5 AND ACT(16)<1.0001 THEN
06BB          IF SENS(4)<300. AND SENS(4)>30. THEN
06DA            IF SENS(15)<300. AND SENS(15)>30. THEN
06F9              XD(15)=TL(30)*(SENS(4)-SENS(15))*ACT(16)
0718            ENDIF
071A          ENDIF
071C          IF SENS(7)<300. AND SENS(7)>30. THEN
073B            IF SENS(8)<300. AND SENS(8)>30. THEN
075A      -       Z1=TL(30)*FLOAT(ITL(3))
076B              XD(16)=Z1*ACT(16)*(SENS(7)-SENS(8))
0788            ENDIF
078A          ENDIF
078C        ENDIF
078E        ENDIF
0790        SS$="TABLE"
079C        GIN=ACT(20)*ACT(3)/100.
07B3        RUN SS$(2,3,GIN,QAH)
07C8        KILL SS$
07CD        XD(17)=ACT(20)*(QAH-XD(15)-XD(13))
07EA        IF XD(17)<.0 THEN XD(17)=.0
0809        ENDIF
080B        Z1=ACT(10)*TL(18)*SQRT(ABS(ACT(2)*.01))
082A        XD(18)=TL(17)*XD(6)+Z1+TL(18)*ACT(16)
084D        XD(19)=ACT(20)*SENS(19)
0860        FOR I=1 TO NCALC
0871          READ XUL,XLL
087A          IF XD(I)>XUL THEN XD(I)=XUL
0895          ENDIF
0897          IF XD(I)<XLL THEN XD(I)=XLL
08B2          ENDIF
08B4        NEXT I
08BF        IF GIN>.0 THEN
08CF          SS$="TABLE"
08DB          Z1=XD(19)*1000.
08EC          RUN SS$(1,1,GIN,Z1)
0901          RUN SS$(1,2,GIN,SENS(17))
0918          IF SENS(33)>TR THEN
0927            Z1=XD(13)+XD(15)
0937            RUN SS$(1,3,GIN,Z1)
094C          ENDIF
094E          IF SENS(34)>TR THEN
095D            RUN SS$(1,4,GIN,XD(15))
0974            IF ACT(16)>TR THEN
0983              RUN SS$(1,5,GIN,XD(16))
099A            ENDIF
099C          ENDIF
099E          IF ACT(1)>95. THEN
09B0            Z1=SENS(12)-SENS(5)
09C0            IF Z1>TR THEN
09CD              Z2=SENS(13)-SENS(14)
09DD              IF Z2>TR THEN
09EA                Z3=LOG(Z1/Z2)
09F7                IF ABS(Z3)>TR THEN
0A05                  Z4=(Z2-Z1)/Z3
0A15                  IF ABS(Z4)>TR THEN
0A23                    Z5=TL(33)*GIN*(SENS(5)-SENS(14))/Z4
0A41                    RUN SS$(1,6,GIN,Z5)
0A56                  ENDIF
0A58                ENDIF
0A5A              ENDIF
```

```
0A5C           ENDIF
0A5E         ENDIF
0A60         KILL SS$
0A65       ENDIF
0A67     ENDIF
0A69 101

PROCEDURE CONTRO
0000     DIM ITL(56):INTEGER
000C     DIM TL(80):REAL
0018     DIM IERR,AD,MODESC,MODE,LMODE:INTEGER
002F     DIM CER,CES,CXH,CXC,CCG,CD:REAL
004A     DIM DP:BYTE
0051     DIM DT:REAL
0058     DIM SS9$,SS$:STRING[8]
0068     DIM CIMP$:STRING[2]
0074     DIM J,NUM,PN,NORY,I:INTEGER
008B     DIM B(100):REAL
0097     DATA 4508,70
00A2     DATA 4583,48
00AD     SS9$="SECURE"
00BA     RUN SS9$(3,1,IERR)
00CA     KILL SS9$
00CF     IF IERR<99 THEN
00DB       SS$="TIMERS"
00E8       RUN SS$(1,19,DT)
00F8       RUN SS$(2,19,.0)
010A       KILL SS$
010F       OPEN #PN,"ITCB3":UPDATE
011F       SEEK #PN,.0
012C       GET #PN,TL
0136       GET #PN,ITL
0140       SS$="LOOKUP"
014D       RUN SS$(MODESC,CER,CES,CXH,CXC,CCG,CD,DP)
017A       KILL SS$
017F       LMODE=ITL(35)
0189       IF MODESC>6 THEN
0195         SS$="STRAT"
01A1         RUN SS$(MODESC,LMODE,DP,CER,CES,CXH,CXC,CCG,CD,MODE)
01D8         KILL SS$
01DD       ELSE MODE=MODESC
01E8       ENDIF
01EA       SS$="ALARM"
01F6       RUN SS$(NORY)
0200       KILL SS$
0205       IF NORY=1 THEN
0211         REM MODE=1
021A       ENDIF
021C       IF ITL(51)<1 OR ITL(51)>4 THEN
0233         CIMP$="T4"
023C         ITL(51)=4
0246       ELSE
024A         CIMP$="T"+STR$(ITL(51))
0259       ENDIF
025B       ITL(34)=MODESC
0266       ITL(49)=57
0270       ITL(35)=MODE
027B       ITL(50)=0
0285       SEEK #PN,466.
0292       PUT #PN,ITL(34)
029F       PUT #PN,ITL(35)
02AC       SEEK #PN,496.
02B9       PUT #PN,ITL(49)
02C6       PUT #PN,ITL(50)
02D3       PUT #PN,ITL(51)
02E0       CLOSE #PN
02E6       RUN SS9$(3,2,IERR)
02F6       KILL SS9$
```

```
02FB            SS$="READEM"
0308            FOR I=1 TO 2
0318              READ AD,NUM
0321              FOR J=1 TO NUM
0332                IF I=2 THEN B(J)=FLOAT(ITL(J+2))
0350                ELSE B(J)=TL(J+7)
0365                ENDIF
0367              NEXT J
0372              RUN SS$(B,AD,NUM,2,CIMP$)
038E            NEXT I
0399            KILL SS$
039E         ENDIF

PROCEDURE GETEM
0000         PARAM SENS(56),ACT(24):REAL
0015         DIM ITL(56):INTEGER
0021         DIM CIMP$:STRING[2]
002D         DIM B(100):REAL
0039         DIM IERR,II,I,J,PN,AD,K,M:INTEGER
005C         DIM SS9$:STRING[8]
0068         DATA 1,4201,56,4301,24,4616,14
0084         READ M
0089         SS9$="SECURE"
0096         RUN SS9$(3,1,IERR)
00A6         KILL SS9$
00AB         IF IERR<99 THEN
00B7            OPEN #PN,"ITCB3":UPDATE
00C7            SEEK #PN,400.
00D4            GET #PN,ITL
00DE            IF ITL(51)>0 AND ITL(51)<5 THEN
00F5               CIMP$="T"+STR$(ITL(51))
0104            ELSE
0108               ITL(51)=4
0112               CIMP$="T4"
011B            ENDIF
011D            FOR J=1 TO 3
012D               READ AD,K
0136               SS$="READEM"
0143               RUN SS$(B,AD,K,M,CIMP$)
0161               KILL SS$
0166               IF B(100)<.5 THEN
0178                  FOR I=1 TO K
0189                     IF J=1 THEN
0195                        SENS(I)=B(I)
01A4                     ENDIF
01A6                     IF J=2 THEN
01B2                        IF I<9 THEN
01BE                           ACT(I)=B(I)/40.95
01D4                        ELSE
01D8                           ACT(I)=B(I)
01E7                        ENDIF
01E9                     ENDIF
01EB                     IF J=3 THEN
01F7                        FOR II=1 TO 14
0207                           IF II=1 OR II=4 OR II=5 OR II=14 THEN
0228                              IF B(II)>=0 AND B(II)<32000 THEN
0244                                 ITL(II+35)=FIX(B(II))
0257                              ENDIF
0259                           ENDIF
025B                        NEXT II
0266                        SEEK #PN,470.
0273                        PUT #PN,ITL(36)
0280                        SEEK #PN,476.
028D                        PUT #PN,ITL(39)
029A                        PUT #PN,ITL(40)
02A7                        SEEK #PN,496.
02B4                        PUT #PN,ITL(49)
02C1                     ENDIF
```

```
02C3              NEXT I
02CE           ENDIF
02D0         NEXT J
02DB         CLOSE #PN
02E1         RUN SS9$(3,2,IERR)
02F1       ENDIF
02F3       RUN SS9$(1,1,IERR)
0303       IF IERR<99 THEN
030F         OPEN #PN,"ITCB1":UPDATE
031F         PUT #PN,SENS
0329         PUT #PN,ACT
0333         CLOSE #PN
0339         RUN SS9$(1,2,IERR)
0349         KILL SS9$
034E       ENDIF

PROCEDURE TABLE
0000       PARAM MCALL,CATG:INTEGER
000B       PARAM TR,X:REAL
0016       DIM SS9$:STRING[8]
0022       DIM IERR:INTEGER
0029       DIM P(3,6,11):REAL
003D       DIM IR,IRUP,PN:INTEGER
004C       DIM DEN,PLO,OS,Y:REAL
005F       SS9$="SECURE"
006C       RUN SS9$(11,1,IERR)
007C       KILL SS9$
0081       OPEN #PN,"ITCB11":UPDATE
0092       ON ERROR GOTO 99
0098       GET #PN,P
00A2       ON MCALL GOSUB 10,20,30
00B5       CLOSE #PN
00BB       RUN SS9$(11,2,IERR)
00CB       KILL SS9$
00D0       END
00D2 10
00D6       IF IERR<99 THEN
00E2         GOSUB 50
00E6         Y=P(3,CATG,IR)
00F6         P(2,CATG,IR)=(P(2,CATG,IR)*Y+X)/(Y+1.)
0122         P(3,CATG,IR)=Y+1.
013A         SEEK #PN,.0
0147         PUT #PN,P
0151       ENDIF
0153       RETURN
0155 20
0159       GOSUB 50
015D       IF IR<11 THEN
0169         IF IRUP=1 THEN
0175           OS=2.*OS-1.
018B           PLO=.0
0196         ELSE PLO=P(1,CATG,IRUP-1)
01AC         ENDIF
01AE         IF IRUP=11 THEN OS=2.*OS
01C8         ENDIF
01CA         X=P(1,CATG,IRUP)*OS+(1.-OS)*PLO
01ED       ELSE X=P(1,CATG,11)
01FF       ENDIF
0201       RETURN
0203 30
0207       IF X<.0 THEN X=.0
0221       ENDIF
0223       FOR IR=1 TO 11
0233         IF X<P(1,CATG,IR) THEN
0248           IF IR>1 THEN
0254             OS=(X-P(1,CATG,IR-1))/(P(1,CATG,IR)-P(1,CATG,IR-1))
0286             IF IR=11 THEN OS=OS/2.
02A0           ENDIF
```

```
02A2            TR=-.05+(FLOAT(IR-1)+OS)/10.
02C0          ELSE
02C4            TR=X/P(1,CATG,1)*.05
02DE          ENDIF
02E0          RETURN
02E2        ENDIF
02E4      NEXT IR
02EF      TR=1.
02FA      RETURN
02FC 50
0300      IF TR>1. THEN TR=1.
031A      ENDIF
031C      IF TR<.0 THEN TR=.0
0336      ENDIF
0338      IR=INT(TR*10.)+1
034D      OS=10.*TR-.5-FLOAT(IR-1)
036B      IF OS<.0 THEN
037B        OS=1.+OS
038A        IRUP=IR
0392      ELSE
0396        IRUP=IR+1
03A1      ENDIF
03A3      RETURN
03A5 99

PROCEDURE ALARM
  0000      PARAM NORY:INTEGER
  0007      DIM T$:STRING[1]
  0013      DIM WTYPE,ACK:BYTE
  001E      DIM NWARN,K,PN2,PN3:INTEGER
  0031      DATA 40
  0038      READ NWARN
  003D      NORY=0
  0044      OPEN #PN2,"ITCB9":READ
  0054      OPEN #PN3,"ITCB10":READ
  0065      FOR K=1 TO NWARN
  0076        SEEK #PN2,FLOAT((K-1)*12)
  0087        GET #PN2,ACK
  0091        SEEK #PN3,FLOAT(K*23-1)
  00A2        GET #PN3,WTYPE
  00AC        IF ACK=2 AND WTYPE=2 THEN
  00BF          CLOSE #PN2
  00C5          CLOSE #PN3
  00CB          NORY=1
  00D2          END
  00D4        ENDIF
  00D6      NEXT K
  00E1      CLOSE #PN2
  00E7      CLOSE #PN3

PROCEDURE STRAT
  0000      PARAM MODESC,LMODE:INTEGER
  000B      PARAM DP:BYTE
  0012      PARAM CER,CES,CXH,CXC,CCG,CD:REAL
  002D      PARAM MODE:INTEGER
  0034      DIM MODETP:INTEGER
  003B      DIM TL(80):REAL; ITL(56):INTEGER
  0052      DIM PN,H,J:INTEGER
  0061      DIM EPSILN,X,DT:REAL
  0070      DIM THL,TCL,EL,TCLX,THLX:REAL
  0087      DIM QAH,QAC,QCGAS,EGEN,EGRID,CHFUEL,CCFUEL:REAL
  00A6      DIM XP,QACP,QAHP:REAL
  00B5      DIM QHSUP,QCSUP:REAL
  00C0      DIM COPER(4):REAL
  00CC      DIM SS$:STRING[8]
  00D8      DATA .00001
  00E3      ON ERROR GOTO 99
  00E9      IF MODESC<7 THEN
  00F5        MODE=MODESC
```

```
00FD        ELSE
0101          SS$="TIMERS"
010E          RUN SS$(1,22,DT)
011E          KILL SS$
0123          IF DT>.25 THEN
0133            SS$="TIMERS"
0140            RUN SS$(2,22,.0)
0152            KILL SS$
0157            READ EPSILN
015C            SS9$="SECURE"
0169            RUN SS9$(3,1,IERR)
0179            OPEN #PN,"ITCB3":READ
0189            GET #PN,TL
0193            GET #PN,ITL
019D            CLOSE #PN
01A3            RUN SS9$(3,2,IERR)
01B3            KILL SS9$
01B8            H=VAL(MID$(DATE$,10,2))
01C5            IF H>23 OR H<0 THEN H=0
01DE          ENDIF
01E0          H=H-1
01EB          IF H<0 THEN H=24
01FD          ENDIF
01FF          X=FLOAT(5*(20*H+8))
0211          RUN SS9$(12,1,IERR)
0221          OPEN #PN,"ITCB12":UPDATE
0232          SEEK #PN,X
023C          GET #PN,EL
0246          GET #PN,X
0250          GET #PN,X
025A          GET #PN,THL
0264          GET #PN,THLX
026E          GET #PN,TCL
0278          GET #PN,X
0282          GET #PN,TCLX
028C          CLOSE #PN
0292          RUN SS9$(12,2,IERR)
02A2          KILL SS9$
02A7          IF ITL(2)=2 THEN
02B5            IF TL(12)>EPSILN THEN
02C4              EL=EL-TCLX/TL(12)/3413.
02DD            ENDIF
02DF          ENDIF
02E1          IF ITL(1)=2 THEN
02EF            EL=EL-THLX/3413.
0302          ENDIF
0304          IF TL(12)>EPSILN AND TL(80)>EPSILN THEN
031D            IF ITL(2)<>3 THEN
032B              IF ITL(2)=1 THEN
0339                CCFUEL=CXH/TL(12)
0347              ELSE
034B                CCFUEL=CER/TL(12)/3413.
0360              ENDIF
0362            ENDIF
0364          ELSE CCFUEL=.0
0372          ENDIF
0374          IF ITL(1)<>3 THEN
0382            IF ITL(1)=1 THEN
0390              IF TL(11)>EPSILN THEN
039F                CHFUEL=CXH/TL(11)
03AD              ENDIF
03AF            ELSE
03B3              CHFUEL=CER/3413.
03C2            ENDIF
03C4          ELSE
03C8            CHFUEL=.0
03D3          ENDIF
03D5          ITL(48)=1
```

```
03DF        IF TL(80)>EPSILN THEN
03EE           IF CCFUEL/TL(80)>CHFUEL THEN
0401              ITL(48)=2
040B           ENDIF
040D        ENDIF
040F        IF ITL(1)<>3 AND ITL(2)=3 THEN ITL(48)=2
042F        ENDIF
0431        IF ITL(1)=1 AND ITL(2)=2 AND DP=2 THEN ITL(48)=2
0458        ENDIF
045A        IF ITL(48)=2 THEN
0468           IF ITL(1)=3 THEN ITL(48)=1
047F           ENDIF
0481           IF ITL(1)=2 AND ITL(2)=1 THEN ITL(48)=1
04A1           ENDIF
04A3        ENDIF
04A5        IF ITL(3)=0 THEN ITL(48)=1
04BC        ENDIF
04BE        SS$="TABLE"
04CA        FOR J=1 TO 2
04DA           IF J=1 THEN
04E6              RUN SS$(3,2,X,EL)
04FB           ELSE
04FF              X=1.
050A           ENDIF
050C           RUN SS$(2,1,X,QCGAS)
0521           RUN SS$(2,2,X,EGEN)
0536           RUN SS$(2,3,X,QAH)
054B           RUN SS$(2,5,X,QAC)
0560           IF ITL(48)=1 THEN
056E              IF THL>QAH THEN
057B                 QHSUP=QAH
0583                 QCSUP=.0
058E              ELSE
0592                 RUN SS$(3,3,XP,THL)
05A7                 RUN SS$(2,5,XP,QACP)
05BC                 QHSUP=THL
05C4                 QCSUP=QAC-QACP
05D0                 IF QCSUP>TCL THEN QCSUP=TCL
05E4                 ENDIF
05E6              ENDIF
05E8           ELSE
05EC              IF TCL>QAC THEN
05F9                 QCSUP=QAC
0601                 QHSUP=.0
060C              ELSE
0610                 RUN SS$(3,5,XP,TCL)
0625                 RUN SS$(2,4,XP,QAHP)
063A                 QCSUP=TCL
0642                 QHSUP=QAH-QAHP
064E                 IF QHSUP>THL THEN QHSUP=THL
0662                 ENDIF
0664              ENDIF
0666           ENDIF
0668           IF J=1 THEN
0674              ICS=4
067C           ELSE ICS=2
0687           ENDIF
0689           GOSUB 50
068D        NEXT J
0698        IF ITL(48)=1 THEN
06A6           RUN SS$(3,3,X,THL)
06BB           RUN SS$(2,3,X,QAH)
06D0           RUN SS$(2,5,X,QAC)
06E5           QACP=QAC+TCL
06F1           RUN SS$(3,5,X,QACP)
0706           RUN SS$(2,5,X,QACP)
071B           QCSUP=QACP-QAC
0727           QHSUP=QAH
```

```
072F            ELSE
0733               RUN SS$(3,5,X,TCL)
0748               RUN SS$(2,3,X,QAH)
075D               RUN SS$(2,5,X,QAC)
0772               QAHP=QAH+THL
077E               RUN SS$(3,3,X,QAHP)
0793               RUN SS$(2,3,X,QAHP)
07A8               QCSUP=QAC
07B0               QHSUP=QAHP-QAH
07BC            ENDIF
07BE            RUN SS$(2,1,X,QCGAS)
07D3            RUN SS$(2,2,X,EGEN)
07E8            ICS=3
07F0            GOSUB 50
07F4            X=.0
07FF            EGEN=.0
080A            QCSUP=.0
0815            QHSUP=.0
0820            QCGAS=.0
082B            ICS=1
0833            GOSUB 50
0837            MODE=1
083E            X=COPER(1)
0848            FOR J=2 TO 4
0858               IF COPER(J)<X THEN
0868                  X=COPER(J)
0873                  MODE=J
087B               ENDIF
087D            NEXT J
0888            MODETP=MODE
0890            IF DP=2 AND MODE=1 THEN MODETP=5
08A9            ENDIF
08AB            IF MODE=1 THEN
08B7               IF ITL(1)=3 OR ITL(2)=3 AND ITL(3)=1 AND TL(80)>.0 THEN
08E4                  MODETP=3
08EB               ENDIF
08ED            ENDIF
08EF            MODE=MODETP
08F7         ENDIF
08F9      ENDIF
08FB      KILL SS$
0900      END
0902 50
0906      EGRID=EGEN-EL
0912      COPER(ICS)=QCGAS*CCG+(THL-QHSUP)*CHFUEL+(TCL-QCSUP)*CCFUEL
093B      IF EGRID<.0 THEN COPER(ICS)=COPER(ICS)-EGRID*CER
0963      ELSE COPER(ICS)=COPER(ICS)-EGRID*CES
097F      ENDIF
0981      RETURN
0983 99

PROCEDURE EXEC
0000      DIM SENS(56),ACT(24),XD(20):REAL
001E      DIM SS$:STRING[8]
002A      DIM XT:REAL
0031      ON ERROR GOTO 10
0037 10
003B      SS$="GETEM"
0047      RUN SS$(SENS,ACT)
0056      KILL SS$
005B      SS$="DIAG"
0066      RUN SS$(SENS)
0070      KILL SS$
0075      SS$="CONTRO"
0082      RUN SS$
0086      KILL SS$
008B      SS$="CALC"
```

```
0096        RUN SS$(SENS,ACT,XD)
00AA        KILL SS$
00AF        SS$="INTEG"
00BB        RUN SS$(XD)
00C5        KILL SS$
00CA        SS$="TIMERS"
00D7        RUN SS$(1,23,XT)
00E7        KILL SS$
00EC        IF XT>.016666 THEN
00FC           RUN SS$(2,23,XT)
010C           KILL SS$
0111           SS$="HOUR"
011C           RUN SS$
0120           KILL SS$
0125        ENDIF

PROCEDURE START
0000        DIM B(100),ACT(24),AW(24):REAL
001E        DIM CC$:STRING[2]
002A        DIM AD4,QT2,MD2:INTEGER
0039        DIM PT$:STRING[3]
0045        DIM DL,SP(10):REAL
0055        DIM SAM(10):INTEGER
0061        DIM SS2$,SS$:STRING[8]
0071        DIM ONER,ZINT:BYTE
007C        DIM TIMES,PN,ISR,PN2,I,AD,AD1,AD2,AD3,SEL,SELT:INTEGER
00AB        DIM XT:REAL
00B2        DATA 0,1,4401,4301,4501,4201
00CC        DATA 1,2,14,58,59,60,61,62,57,17,5,.0
00F8        DATA "/M1","T4"
0107        READ ZINT,ONER,AD,AD1,AD2,AD3
0120        FOR I=1 TO 10
0130           READ SAM(I)
0139        NEXT I
0144        READ TIMES,DL
014D        READ PT$,CC$
0156        SHELL "LOAD M1"
0161        SHELL "LOAD M3"
016C        SHELL "LOAD NINKEY"
017B        SS$="KB"
0184        OPEN #PN2,"ITCB1"
0192        SEEK #PN2,280.
019F        GET #PN2,AW
01A9        SS2$="SECURE"
01B6        RUN SS2$(3,1,SEL)
01C6        KILL SS2$
01CB        OPEN #PN,"ITCB3":READ
01DB        SEEK #PN,500.
01E8        GET #PN,ISR
01F2        IF ISR>0 AND ISR<5 THEN CC$="T"+STR$(ISR)
0211        ENDIF
0213        CLOSE #PN
0219        RUN SS2$(3,2,SEL)
0229        KILL SS2$
022E 5
0232        PRINT " 7.2 START UP PACKAGE"
024B        PRINT "     1. SET UP ACTUATOR DESIRED SETTINGS"
0277        PRINT "     2. SEND SETTINGS TO THE 620"
029B        PRINT "     3. LIST ACTUATOR DESIRED SETTINGS"
02C5        PRINT "     4. LIST ACTUATOR ACTUAL SIGNALS"
02ED        PRINT "     5. SET UP FOR AUTO-SAMPLE"
030F        PRINT "     6. AUTO-SAMPLE"
0326        PRINT "     7. QUIT"
0336        PRINT " SELECT (1 - 7) : ";
034D        RUN SS$(ZINT,SEL,XT)
0361        KILL SS$
0366        IF SEL<1 OR SEL>7 THEN GOTO 5
037C        ENDIF
037E        ON SEL GOSUB 10,10,10,10,60,70,55
```

```
03A1        GOTO 5
03A5  10
03A9        SS2$="SU1"
03B3        RUN SS2$(B,ACT,AW,AD,AD1,AD2,AD3,PN2,SEL,CC$)
03EA        KILL SS2$
03EF        RETURN
03F1  55
03F5        CLOSE #PN2
03FB        OPEN #PN,"ITCB3":UPDATE
040B        SEEK #PN,498.
0418        ISR=0
041F        PUT #PN,ISR
0429        CLOSE #PN
042F        SS2$="READEM"
043C        B(1)=57.
044A        B(2)=.0
0458        AD4=4629
0460        QT2=2
0467        MD2=2
046E        RUN SS2$(B,AD4,QT2,MD2,CC$)
048C        KILL SS2$
0491        SHELL "UNLINK INKEY"
04A1        SHELL "UNLINK M1"
04AE        SHELL "UNLINK M3"
04BB        END
04BD  60
04C1        SS2$="SU2"
04CB        RUN SS2$(B,SP,TIMES,SAM,SEL,AD,AD1,AD2,AD3,PT$,CC$,DL)
050C        KILL SS2$
0511        RETURN
0513  70
0517        SS2$="AUTOSM"
0524        RUN SS2$(SP,TIMES,SAM,AD1,AD3,PT$,CC$,DL)
0551        KILL SS2$
0556        RETURN

PROCEDURE SU2
0000        PARAM B(100),SP(10):REAL
0015        PARAM TIMES,SAM(10),SEL,AD,AD1,AD2,AD3:INTEGER
0039        PARAM PT$:STRING[3]
0045        PARAM CC$:STRING[2]
0051        PARAM DL:REAL
0058        DIM T$:STRING[15]
0064        DIM U$:STRING[4]
0070        DIM SS2$,SS$:STRING[8]
0080        DIM ZINT,ONER:BYTE
008B        DIM PTT,ICON,PN2,PN,I,J,K,SEL1:INTEGER
00AE        DIM XT:REAL
00B5        DATA 0,1
00BF        READ ZINT,ONER
00C8        SS$="KB"
00D1  60
00D5        OPEN #PN,"ITCB6":READ
00E5        SEEK #PN,.0
00F2        PRINT " 7.2.5 CURRENT SAMPLE LIST"
0110        GOSUB 75
0114        CLOSE #PN
011A        PRINT "      10. NUMBER OF SAMPLES           : "; TIMES
0149        PRINT "      11. OUTPUT OF SAMPLES TO PORT : "; PT$
0178        PRINT "      12. INTER SAMPLE DELAY TIME   : "; DL
01A7        PRINT "      13. MAKE A PHONE CONNECTION ON PORT "; PT$
01DA        PRINT "      14. HANG UP THE PHONE"
01FA        PRINT "       0. QUIT"
020C        PRINT " SELECT ITEM TO CHANGE (0 - 14) : ";
0233        RUN SS$(ZINT,SEL,XT)
0247        KILL SS$
024C        IF SEL<0 OR SEL>14 THEN GOTO 60
0262        ENDIF
```

```
0264        IF SEL=0 THEN END
0271        ENDIF
0273        ON SEL GOSUB 65,65,65,65,65,65,65,65,65,61,62,63,68,69
02B2        GOTO 60
02B6  61
02BA        PRINT " 7.2.5.5 ENTER THE NUMBER OF SAMPLES : ";
02E6        RUN SS$(ZINT,TIMES,XT)
02FA        KILL SS$
02FF        IF TIMES<1 THEN GOTO 61
030E        ENDIF
0310        RETURN
0312  62
0316        PRINT " 7.2.5.6 ENTER THE PORT NUMBER (1 - 4) : ";
0344        RUN SS$(ZINT,SEL1,XT)
0358        KILL SS$
035D        IF SEL1<1 OR SEL1>4 THEN GOTO 62
0373        ENDIF
0375        PT$="/M"+CHR$(SEL1+48)
0386        RETURN
0388  63
038C        PRINT " 7.2.5.7 ENTER THE INTER SAMPLE DELAY TIME : ";
03BE        RUN SS$(ONER,SEL1,XT)
03D2        KILL SS$
03D7        IF XT<.0 THEN GOTO 63
03EA        ENDIF
03EC        DL=XT
03F4        RETURN
03F6  65
03FA        PRINT "      (1 - 56 FOR INPUTS, 57 - 80 FOR OUTPUTS";
042B        PRINT ", 0 TO QUIT) : ";
043F        RUN SS$(ZINT,SEL1,XT)
0453        KILL SS$
0458        IF SEL1<0 OR SEL1>80 THEN GOTO 65
046E        ENDIF
0470        IF SEL1<>0 THEN
047C           SAM(SEL)=SEL1
0488        ENDIF
048A        RETURN
048C  68
0490        PRINT " 7.2.5.8 ENTER THE PHONE NUMBER:";
04B5        INPUT T$
04BA        SS2$="MODEM"
04C6        RUN SS2$(1,PT$,T$,ICON)
04DD        KILL SS2$
04E2        IF ICON=0 THEN PRINT " CONNECTION FAILED"
0503        ELSE PRINT " CARRIER DETECTED"
051B        ENDIF
051D        RETURN
051F  69
0523        OPEN #PN2,PT$
052D        PRINT #PN2,"\";
0538        CLOSE #PN2
053E        SS2$="MODEM"
054A        RUN SS2$(0,PT$,T$,ICON)
0561        KILL SS2$
0566        RETURN
0568  75
056C        PRINT "  NUMBER POINT   DESCRIPTION       UNITS"
0596        FOR J=1 TO 9
05A6           XT=FLOAT((SAM(J)-1)*19)
05B8           SEEK #PN,XT
05C2           GET #PN,T$
05CC           GET #PN,U$
05D6           PRINT USING "I8>",J;
05E3           PRINT ". ";
05EA           PRINT USING "I5>",SAM(J);
05FA           PRINT "  ";
0601           PRINT USING "S15<",T$;
```

```
060F         PRINT USING "S4<",U$
061B         NEXT J
0626         RETURN

PROCEDURE SU1
0000         PARAM B(100),ACT(24),AW(24):REAL
001E         PARAM AD,AD1,AD2,AD3:INTEGER
0031         PARAM PN2,SEL:INTEGER
003C         PARAM CIMP$:STRING[2]
0048         DIM T$:STRING[15]
0054         DIM PT$:STRING[3]
0060         DIM U$:STRING[4]
006C         DIM SS2$,SS$:STRING[8]
007C         DIM ONER,ZINT:BYTE
0087         DIM PN,I,SEL1,ADSR,QT,MD:INTEGER
00A2         DIM XT:REAL
00A9         DATA 0,1
00B3         READ ZINT,ONER
00BC         SS$="KB"
00C5         ON SEL GOSUB 10,20,30,40
00DC         END
00DE 10
00E2         PRINT " 7.2.1.1 ENTER # OF ACTUATOR TO CHANGE (1 - 24) : ";
0119         RUN SS$(ZINT,SEL1,XT)
012D         KILL SS$
0132         IF SEL1<0 OR SEL1>24 THEN GOTO 10
0148         ENDIF
014A         IF SEL1=0 THEN
0156            SEL=3
015D            GOSUB 30
0161            RETURN
0163         ENDIF
0165 11
0169         PRINT " 7.2.1.2 ENTER THE NEW SETTING : ";
018F         RUN SS$(ONER,SEL,XT)
01A3         KILL SS$
01A8         IF SEL1>8 THEN
01B4            IF XT<>1. AND XT<>.0 THEN GOTO 11
01D2            ENDIF
01D4         ENDIF
01D6         AW(SEL1)=XT
01E2         GOTO 10
01E6 20
01EA         FOR I=1 TO 24
01FA            IF I<9 THEN
0206               B(I)=AW(I)*40.95
021C            ELSE
0220               B(I)=AW(I)
022F            ENDIF
0231         NEXT I
023C         SS2$="READEM"
0249         QT=24
0250         MD=2
0257         RUN SS2$(B,AD,QT,MD,CIMP$)
0275         ADSR=4630
027D         QT=1
0284         MD=2
028B         B(1)=1.
0299         RUN SS2$(B,ADSR,QT,MD,CIMP$)
02B7         KILL SS2$
02BC         OPEN #PN,"ITCB3":UPDATE
02CC         SEEK #PN,498
02D6         MD=1
02DD         PUT #PN,MD
02E7         CLOSE #PN
02ED         RETURN
02EF 30
02F3         OPEN #PN,"ITCB6":READ
0303         SEEK #PN,1064.
0310         IF SEL=3 THEN
```

```
031C           PRINT " 7.2.3. DESIRED ACTUATOR SETTINGS"
0341         ELSE
0345           PRINT " 7.2.4. CURRENT ACTUATOR SIGNALS"
0369         ENDIF
036B         PRINT "    ANALOG OUTPUTS"
0381         PRINT " NUMBER DESCRIPTION              SETTING  UNITS"
03B1         FOR I=1 TO 24
03C1           GET #PN,T$
03CB           IF I=9 THEN
03D7             PRINT " MORE TO COME, PRESS RETURN TO CONTINUE...";
0406             RUN SS$(ZINT,SEL1,XT)
041A             KILL SS$
041F             PRINT "    DIGITAL OUTPUTS"
0436             PRINT " NUMBER DESCRIPTION              SETTING  UNITS"
0466           ENDIF
0468           GET #PN,U$
0472           PRINT USING "I6>",I;
047F           PRINT ". ";
0486           PRINT USING "S15<",T$;
0494           PRINT "   ";
049E           IF SEL=3 THEN
04AA             PRINT USING "R10.2^",AW(I);
04BD           ELSE
04C1             PRINT USING "R10.2^",B(I);
04D4           ENDIF
04D6           PRINT " ";
04DC           PRINT USING "S4<",U$
04E8         NEXT I
04F3         CLOSE #PN
04F9         PRINT " PRESS RETURN TO CONTINUE...";
051A         RUN SS$(ZINT,SEL1,XT)
052E         KILL SS$
0533         RETURN
0535 40
0539         SS2$="READEM"
0546         RUN SS2$(B,AD1,24,1,CIMP$)
0560         KILL SS2$
0565         FOR I=1 TO 8
0575           B(I)=B(I)/40.95
058B         NEXT I
0596         SEEK #PN2,280.
05A3         PUT #PN2,B
05AD         GOSUB 30
05B1         RETURN

PROCEDURE READEM
0000         PARAM B(100):REAL; AD,QT,M:INTEGER
001A         PARAM CIMP$:STRING[2]
0026         DIM C(100):REAL
0032         DIM RETRY:INTEGER
0039         DIM CP,K,NN,CC(4),FM,PM:INTEGER
0059         DIM ER:BYTE
0060         DIM SS$:STRING[8]
006C 5       DATA 0,0,2,7,8,10,0,1,0
008E         RESTORE 5
0093         READ CP,NN,CC(1),CC(2),CC(3),CC(4),FM,PM,ER
00C4         SS$="Ppint"
00D0         RETRY=0
00D7         IF M=4 OR M=2 THEN
00EA           FOR K=1 TO QT
00FB             IF B(K)<32000 AND B(K)>=.0 THEN C(K)=FLOAT(FIX(B(K)))
012A             ELSE C(K)=32000.
013C             ENDIF
013E           NEXT K
0149         ENDIF
014B 10
014F         ER=1
0156         IF CC(M)=2 OR CC(M)=7 OR CC(M)=8 OR CC(M)=10 THEN
```

```
0183            IF AD>4200 AND AD<4700 OR CC(M)=10 THEN
01A2              IF QT>0 AND QT<90 THEN
01B5                RUN SS$("IPC620 ",CP,CIMP$,NN,CC(M),QT,AD,C(1),FM,PM,
                    ER)
01FB              ELSE END
0200              ENDIF
0202            ELSE END
0207            ENDIF
0209          ELSE END
020E          ENDIF
0210          RETRY=RETRY+1
021B          IF ER<>0 AND RETRY<5 THEN
022E            GOTO 10
0232          ENDIF
0234          KILL SS$
0239          IF RETRY>4 THEN
0245            SS$="ENCODE"
0252            ER=2
0259            RUN SS$(3,ER)
0266            KILL SS$
026B          ENDIF
026D          B(100)=FLOAT(ER)
0279          IF M<>2 AND ER=0 THEN
028C            FOR K=1 TO QT
029D              B(K)=C(K)
02AC            NEXT K
02B7          ENDIF
02B9 13

PROCEDURE AUTOSM
0000          PARAM SP(10):REAL
000C          PARAM TIMES,SAM(10),AD1,AD3:INTEGER
0024          PARAM PT$:STRING[3]
0030          PARAM CC$:STRING[2]
003C          PARAM DL:REAL
0043          DIM T$:STRING[15]
004F          DIM SS2$:STRING[8]
005B          DIM PTT,PN,I,J,K:INTEGER
0072          DIM XT:REAL
0079 70
007D          SS2$="TIMERS"
008A          RUN SS2$(2,21,XT)
009A          KILL SS2$
009F          OPEN #PTT,PT$
00A9          PRINT #PTT," 7.2.6. AUTO SAMPLE STARTED AT "; DATE$;
00D4          PRINT #PTT," FOR "; TIMES; " SAMPLES"
00F1          FOR I=1 TO TIMES
0102            IF I=1 OR MOD(I,20)=0 THEN
0118              OPEN #PN,"ITCB6":READ
0128              PRINT #PTT,"       ";
0135              SEEK #PN,.0
0142              FOR K=1 TO 10
0152                XT=FLOAT((SAM(K)-1)*19)
0164                SEEK #PN,XT
016E                PRINT #PTT,"¦";
0179                GET #PN,T$
0183                PRINT #PTT USING "S6>",T$;
0194              NEXT K
019F              PRINT #PTT,
01A6              CLOSE #PN
01AC              PRINT #PTT,"    ";
01B9              FOR K=1 TO 10
01C9                PRINT #PTT,"¦";
01D4                PRINT #PTT USING "I6>",SAM(K);
01E8              NEXT K
01F3              PRINT #PTT,
01FA            ENDIF
```

```
01FC        SS2$="TIMERS"
0209        REPEAT
020B          RUN SS2$(1,21,XT)
021B        UNTIL XT>DL
0227        RUN SS2$(2,21,XT)
0237        KILL SS2$
023C        SS2$="SAMP"
0247        RUN SS2$(SP,SAM,AD1,AD3,CC$)
0265        KILL SS2$
026A        PRINT #PTT USING "S3>",MID$(DATE$,16,2);
027E        FOR K=1 TO 10
028E          PRINT #PTT,"¦";
0299          IF SAM(K)<57 OR SAM(K)>64 THEN
02B2            PRINT #PTT USING "R6.1>",SP(K);
02C8          ELSE
02CC            PRINT #PTT USING "R6.1>",SP(K)/40.95;
02E9          ENDIF
02EB        NEXT K
02F6        PRINT #PTT,
02FD      NEXT I
0308      CLOSE #PTT
```

PROCEDURE SAMP
```
0000      PARAM SP(10):REAL
000C      PARAM SAM(10),AD1,AD3:INTEGER
0020      PARAM CC$:STRING[2]
002C      DIM K,J:INTEGER
0037      DIM SS2$:STRING[8]
0043      DIM B(100):REAL
004F      FOR K=1 TO 10
005F        IF SAM(K)<57 THEN B(K)=FLOAT(AD3-1+SAM(K))
0084        ELSE B(K)=FLOAT(AD1-57+SAM(K))
009E        ENDIF
00A0      NEXT K
00AB      SS2$="READEM"
00B8      RUN SS2$(B,0,10,4,CC$)
00D0      KILL SS2$
00D5      FOR K=1 TO 10
00E5        SP(K)=B(K)
00F4      NEXT K
```

PROCEDURE KB
```
0000      PARAM LT:BYTE; IX:INTEGER; X:REAL
0013      DIM PN:INTEGER
001A      DIM BUF$(20):STRING[1]
002B      DIM IN$:STRING[1]
0037      DIM S:REAL
003E      DIM TMO:REAL
0045      DIM SS2$,SS1$:STRING[8]
0055      DIM N,UL,I,IDE,IT:INTEGER
006C      ON ERROR GOTO 13
0072      OPEN #PN,"/M1"
007E      SS1$="INKEY"
008A      SS2$="TIMERS"
0097      IF LT=0 THEN UL=5
00A9      ELSE UL=20
00B3      ENDIF
00B5 1    S=1.
00C3      IT=0
00CA      IDE=0
00D1      X=.0
00DC      IX=0
00E3      RUN SS2$(2,24,TMO)
00F3      REPEAT
00F5        RUN SS1$(PN,IN$,1)
0107        IF IN$=CHR$(8) OR IN$=CHR$(127) THEN
011C          IT=IT-1
0127          IF IN$=CHR$(127) THEN
```

```
0134            PRINT CHR$(8); " "; CHR$(8);
0142          ENDIF
0144        ELSE
0148          IF IN$="." OR IN$="-" OR ASC(IN$)>47 AND ASC(IN$)<58 THEN
016D            IT=IT+1
0178            BUF$(IT)=IN$
0184          ELSE
0188          ENDIF
018A        ENDIF
018C        RUN SS2$(1,24,TMO)
019C      UNTIL IT>UL OR TMO>.0166666 OR IN$=CHR$(13)
01BB      IF IN$=CHR$(13) THEN PRINT
01C9      ENDIF
01CB      FOR I=1 TO IT
01DC        IF BUF$(I)>CHR$(47) AND BUF$(I)<CHR$(58) THEN
01F7          IF IDE<0 THEN
0203            X=X+(FLOAT(ASC(BUF$(I)))-48.)*10.**IDE
0227            IDE=IDE-1
0232          ELSE
0236            X=X*10.+FLOAT(ASC(BUF$(I)))-48.
0255          ENDIF
0257        ELSE
025B          IF BUF$(I)="-" THEN
026B            IF S=-1. THEN
027B              GOTO 13
027F            ELSE
0283              S=-1.
028E            ENDIF
0290          ELSE
0294            IF BUF$(I)="." THEN
02A4              IF IDE<0 THEN
02B0                GOTO 13
02B4              ELSE
02B8                IDE=-1
02C0              ENDIF
02C2            ENDIF
02C4          ENDIF
02C6        ENDIF
02C8      NEXT I
02D3      X=S*X
02DF      IF LT=0 THEN
02EB        IX=FIX(X)
02F4      ENDIF
02F6      KILL SS2$
02FB      KILL SS1$
0300      CLOSE #PN
0306      END
0308 13
030C      ON ERROR GOTO 14
0312      SHELL "CLEAR /M1"
031F 14

PROCEDURE HOUR
0000      DIM IERR,PN,NCALC,ITL(56):INTEGER
0018      DIM SS9$,SS$:STRING[8]
0028      DIM C(4),OS(4),TL(80):REAL
0046      DATA 20,"SECURE"
0056      ON ERROR GOTO 101
005C      READ NCALC,SS9$
0065      RUN SS9$(3,1,IERR)
0075      OPEN #PN,"ITCB3":READ
0085      GET #PN,TL
008F      GET #PN,ITL
0099      CLOSE #PN
009F      RUN SS9$(3,2,IERR)
00AF      KILL SS9$
00B4      OPEN #PN,"ITCB14":UPDATE
```

```
00C5        SEEK #PN,235.
00D2        GET #PN,C
00DC        CLOSE #PN
00E2        SS$="HOUR2"
00EE        RUN SS$(C,TL,OS,NCALC)
0107        KILL SS$
010C        SS$="HOUR3"
0118        RUN SS$(OS,C,TL,ITL,NCALC)
0136        KILL SS$
013B        SS$="HOUR4"
0147        RUN SS$(C,OS,NCALC)
015B        KILL SS$
0160 101
```

```
PROCEDURE TIMERS
0000        PARAM MODE,NUM:INTEGER; DELTA:REAL
0011        DIM PN:INTEGER
0018        DIM FPOS:REAL
001F        DIM TEMP$:STRING[17]
002B        DIM NDT:REAL
0032        TEMP$=DATE$
0038        SS$="ELAPSE"
0045        RUN SS$(TEMP$,NDT)
0054        KILL SS$
0059        FPOS=5.*FLOAT(NUM-1)
006C        OPEN #PN,"ITCB14":UPDATE
007D        SEEK #PN,FPOS
0087        IF MODE=2 THEN
0093          PUT #PN,NDT
009D        ELSE
00A1          GET #PN,DELTA
00AB          DELTA=NDT-DELTA
00B7        ENDIF
00B9        CLOSE #PN
```

```
PROCEDURE ESCHEK
0000        PARAM TE,TS:REAL
000B        DIM P(3,6,11):REAL
001F        DIM PN,NE,NS:INTEGER
002E        DIM SS$:STRING[8]
003A        DIM B:BYTE
0041        DATA "ENCODE",6,7,2
0057        OPEN #PN,"ITCB11":READ
0068        GET #PN,P
0072        CLOSE #PN
0078        READ SS$,NE,NS,B
0089        IF ABS(P(1,2,11))>.01 THEN
00A0          IF P(2,2,11)/P(1,2,11)<TE THEN
00BD            RUN SS$(NE,B)
00CC            KILL SS$
00D1          ENDIF
00D3        ENDIF
00D5        IF ABS(P(1,6,11))>.01 THEN
00EC          IF P(2,6,11)/P(1,6,11)<TS THEN
0109            RUN SS$(NS,B)
0118            KILL SS$
011D          ENDIF
011F        ENDIF
```

```
PROCEDURE PKSET
0000        PARAM RP:REAL; OS(4),C(4):REAL
001B        DIM ST:REAL
0022        DIM I,J:INTEGER
002D        DIM SD$:STRING[3]
0039        DIM SS$:STRING[8]
0045        SD$="/T1"
004F        IF RP>.0 THEN
005F          SS$="TIMERS"
```

```
006C          RUN SS$(1,16,XT)
007C          KILL SS$
0081          IF XT>RP THEN
008E             SS$="PEAK"
0099             RUN SS$(3,7,.0,.0,SD$)
00B7             RUN SS$(3,8,.0,.0,SD$)
00D5             KILL SS$
00DA          ENDIF
00DC       ENDIF
00DE       FOR I=1 TO 4
00EE          IF ABS(OS(I)-C(I))>.001 THEN
0109             SS$="PEAK"
0114             IF I=1 THEN
0120                RUN SS$(3,9,.0,.0,SD$)
013E                KILL SS$
0143             ELSE
0147                J=9-2*I
0155                RUN SS$(3,J,.0,.0,SD$)
0175                RUN SS$(3,J+1,.0,.0,SD$)
0197             ENDIF
0199             KILL SS$
019E          ENDIF
01A0       NEXT I

PROCEDURE ELAPSE
0000       PARAM TEMP$:STRING[17]
000C       PARAM NDT:REAL
0013       DIM MEL,ND,YT,I:INTEGER
0026       DATA 31,28,31,30,31,30,31,31,30,31,30,31
004E       NDT=.0
0059       YT=VAL(MID$(TEMP$,1,2))
0068       MEL=YT-85
0073       IF MEL>0 THEN
007F          NDT=365.
008A       ENDIF
008C       IF MEL>1 THEN
0098          FOR I=1 TO MEL-1
00AC             NDT=NDT+365.
00BB             IF MOD(85+I,4)=0 THEN NDT=NDT+1.
00DB          ENDIF
00DD          NEXT I
00E8       ENDIF
00EA       MEL=VAL(MID$(TEMP$,4,2))-1
00FD       FOR I=1 TO MEL
010E          READ ND
0113          NDT=NDT+FLOAT(ND)
0120          IF I=2 AND MOD(YT,4)=0 THEN
0136             NDT=NDT+1.
0145          ENDIF
0147       NEXT I
0152       NDT=(NDT+VAL(MID$(TEMP$,7,2))-1.)*24.
0172       NDT=NDT+VAL(MID$(TEMP$,10,2))
0184       NDT=NDT+(VAL(MID$(TEMP$,16,2))/60.+VAL(MID$(TEMP$,13,2)))/60.

PROCEDURE RESP
0000       PARAM PT3:INTEGER; PT$:STRING[3]; RB$(40):STRING[1]; IC:INTEGER
0028       DIM SS$:STRING[9]
0034       DIM ICM:INTEGER
003B       SS$="INKEY"
0047       ON ERROR GOTO 13
004D       ICM=0
0054       IC=1
005B       REPEAT
005D          RUN SS$(PT3,RB$(IC),1)
0072          IF LEN(RB$(IC))>0 THEN IC=IC+1
008C          ENDIF
008E          ICM=ICM+1
```

```
0099         UNTIL IC>40 OR ICM>40 AND LEN(RB$(IC))=0
00B6         KILL SS$
00BB         END
00BD  13
00C1         ON ERROR GOTO 14
00C7         SS$="CLEAR "+PT$
00D8         SHELL SS$
00DD  14
```

---

```
PROCEDURE CMDM
0000         PARAM PT3:INTEGER; PT$:STRING[3]
0012         DIM RB$(40):STRING[1]
0023         DIM SS$:STRING[9]
002F         DIM P$:STRING[3]
003B         DIM X:REAL
0042         DIM IC:INTEGER
0049         ON ERROR GOTO 13
004F         P$="+++"
0059         GOSUB 10
005D         SS$="RESP"
0068         PUT #PT3,P$
0072         RUN SS$(PT3,PT$,RB$,40)
0089       . KILL SS$
008E         GOSUB 10
0092         END
0094  10
0098         SHELL "SLEEP 150"
00A5         RETURN
00A7  13
00AB         ON ERROR GOTO 14
00B1         SS$="CLEAR "+PT$
00C2         SHELL SS$
00C7  14
```

---

```
PROCEDURE HANG
0000         PARAM RB$(40):STRING[1]; ICON:INTEGER; M$:STRING[7]
0022         DIM L,IC:INTEGER
002D         L=1
0034         FOR IC=1 TO 40
0044           IF L<=LEN(M$) AND RB$(IC)=MID$(M$,L,1) THEN
0063             L=L+1
006E           ENDIF
0070         NEXT IC
007B         IF L=LEN(M$)+1 THEN ICON=1
0092         ELSE ICON=0
009C         ENDIF
```

```
PROCEDURE DIAL
0000         PARAM PT3:INTEGER; PT$:STRING[3]; T$:STRING[17]
001D         DIM TD$:STRING[22]
0029         DIM RB$(40):STRING[1]
003A         DIM OUT$:STRING[1]
0046         DIM L,IC:INTEGER
0051         DIM SS$:STRING[9]
005D         ON ERROR GOTO 13
0063         TD$="AT"+TRIM$(T$)+CHR$(13)+CHR$(10)
0079         FOR IC=1 TO LEN(TD$)
008B           OUT$=MID$(TD$,IC,1)
0099           PUT #PT3,OUT$
00A3         NEXT IC
00AE         END
00B0  13
00B4         ON ERROR GOTO 14
00BA         SS$="CLEAR "+PT$
00CB         SHELL SS$
00D0  14
```

```
PROCEDURE SECURE
    0000        PARAM FN,I,J:INTEGER
    000F        DIM LATCH(127):INTEGER
    001B        DIM PN:INTEGER
    0022        J=1
    0029        END
    002B        OPEN #PN,"ITCB16":UPDATE
    003C        GET #PN,LATCH
    0046        IF I=1 THEN
    0052            J=0
    0059            REPEAT
    005B                SEEK #PN,.0
    0068                GET #PN,LATCH
    0072                IF LATCH(FN)=0 THEN SHELL "SLEEP 5"
    008B                    J=J+1
    0096                ENDIF
    0098            UNTIL LATCH(FN)<>0 OR J>100
    00AD            IF J<100 THEN
    00B9                LATCH(FN)=0
    00C4                SEEK #PN,.0
    00D1                PUT #PN,LATCH
    00DB            ENDIF
    00DD        ELSE
    00E1            LATCH(FN)=1
    00EC            SEEK #PN,.0
    00F9            PUT #PN,LATCH
    0103            J=0
    010A        ENDIF
    010C        CLOSE #PN
PROCEDURE HOUR2
    0000        PARAM C(4),TL(80),OS(4):REAL
    001E        PARAM NCALC:INTEGER
    0025        DIM I,IERR,PN,PN2,J,K,M:INTEGER
    0044        DIM SS9$,SS$:STRING[8]
    0054        DIM TEMP$:STRING[17]
    0060        DIM TT$:STRING[2]
    006C        DIM X(4,20),Y(20):REAL
    0085        ON ERROR GOTO 101
    008B        TEMP$=DATE$
    0091        FOR I=1 TO 4
    00A1            J=5-I
    00AC            K=(I-1)*3+1
    00BD            TT$=MID$(TEMP$,K,K+1)
    00CF            OS(J)=VAL(TT$)
    00DC            IF OS(J)<>C(J) AND I>1 THEN
    00F6                IF J=2 THEN
    0102                    SS$="ESCHEK"
    010F                    RUN SS$(TL(46),TL(47))
    0122                    KILL SS$
    0127                ENDIF
    0129                SS9$="SECURE"
    0136                RUN SS9$(4,1,IERR)
    0146                OPEN #PN2,"ITCB4":READ
    0156                GET #PN2,X
    0160                CLOSE #PN2
    0166                RUN SS9$(4,2,IERR)
    0176                KILL SS9$
    017B                SS$="ARCH"
    0186                K=C(J)-1
    0196                IF J=1 THEN K=K+1
    01AC                ENDIF
    01AE                FOR M=1 TO NCALC
    01BF                    Y(M)=X(J,M)
    01D1                NEXT M
    01DC                RUN SS$(Y,0,J,K)
    01F3                KILL SS$
    01F8            ENDIF
    01FA        NEXT I
```

```
0205        SS$="PKSET"
0211        RUN SS$(TL(6),OS,C)
0227        KILL SS$
022C  101
PROCEDURE HOUR3
0000        PARAM OS(4),C(4),TL(80):REAL
001E        PARAM ITL(56),NCALC:INTEGER
002E        DIM I,IERR,PN,PN2,J,K,ICON:INTEGER
004D        DIM PT$:STRING[3]
0059        DIM SS2$,SS$:STRING[8]
0069        DIM T$:STRING[15]
0075        DIM XT,P(3,6,11):REAL
008D        DATA "MODEM","SECURE"
00A2        ON ERROR GOTO 101
00A8        READ SS2$
00AD        FOR I=1 TO 15
00BD          K=ITL(I+3)
00CB          IF ITL(I+18)>0 AND ITL(I+18)<5 AND K>0 AND K<10 THEN
00F8            IF TL(I+54)>.01 THEN
010E              PT$="/M"+CHR$(ITL(I+18)+48)
0125              IF K>2 AND K<7 THEN
0138                IF OS(K-2)<>C(K-2) THEN GOSUB 100
0154              ENDIF
0156            ENDIF
0158            IF K=1 OR K=2 OR K>6 AND K<9 THEN
0179              SS$="TIMERS"
0186              RUN SS$(1,I,XT)
0198              KILL SS$
019D              ICON=0
01A4              IF XT>TL(I+54) THEN
01B7                GOSUB 100
01BB                RUN SS$(2,I,XT)
01CD                RUN SS$(1,I,XT)
01DF                KILL SS$
01E4              ENDIF
01E6            ENDIF
01E8            IF K=9 THEN GOSUB 90
01F7            ENDIF
01F9            IF ICON=1 THEN
0205              ON K GOSUB 10,20,30,30,30,30,70,80,95
0230              RUN SS2$(0,PT$,T$,ICON)
0247              KILL SS2$
024C            ENDIF
024E          ENDIF
0250        ENDIF
0252        SS$="TIMERS"
025F        RUN SS$(1,I,XT)
0271        KILL SS$
0276        NEXT I
0281        END
0283  10
0287        SS$="STATUS"
0294        RUN SS$(PT$)
029E        KILL SS$
02A3        RETURN
02A5  20
02A9        SS$="SENSOR"
02B6        RUN SS$(0,PT$)
02C3        KILL SS$
02C8        RETURN
02CA  30
02CE        SS$="HPRINT"
02DB        RUN SS$(K,PT$)
02EA        KILL SS$
02EF        SS$="MATRIX"
02FC        RUN SS$(0,K-2,NCALC,PT$)
0315        KILL SS$
031A        RETURN
031C  70
0320        OPEN #PN2,"ITCB11":READ
```

```
0331          GET #PN2,P
033B          CLOSE #PN2
0341          SS$="TPRINT"
034E          FOR J=1 TO 6
035E             RUN SS$(J,P,PT$)
0372          NEXT J
037D          KILL SS$
0382          RETURN
0384 80
0388          SS$="PEAK"
0393          RUN SS$(0,0,.0,.0,PT$)
03B1          KILL SS$
03B6          RETURN
03B8 90
03BC          ICON=0
03C3          SS$="TIMERS"
03D0          RUN SS$(1,I,XT)
03E2          KILL SS$
03E7          IF XT>TL(I+54) THEN
03FA             SS$="ALARM"
0406             RUN SS$(NORY)
0410             KILL SS$
0415             IF NORY=1 THEN
0422                SS$="TIMERS"
042F                RUN SS$(2,I,XT)
0441                KILL SS$
0446                GOSUB 100
044A                RETURN
044C             ENDIF
044E             SS$="TIMERS"
045B             RUN SS$(2,I,XT)
046D             KILL SS$
0472          ENDIF
0474          RETURN
0476 95
047A          GOSUB 10
047E          GOSUB 20
0482          RETURN
0484 100
0488          OPEN #PN2,"ITCB13":READ
0499          XT=15.*FLOAT(I-1)
04AC          SEEK #PN2,XT
04B6          GET #PN2,T$
04C0          CLOSE #PN2
04C6          RUN SS2$(1,PT$,T$,ICON)
04DD          KILL SS2$
04E2          RETURN
04E4 101
PROCEDURE HOUR4
0000          PARAM C(4),OS(4):REAL
0015          PARAM NCALC:INTEGER
001C          DIM I,IERR,PN,PN2,J:INTEGER
0033          DIM X(4,20):REAL
0043          DIM SS9$:STRING[8]
004F          DATA "SECURE"
005C          ON ERROR GOTO 101
0062          READ SS9$
0067          FOR I=1 TO 4
0077             IF C(I)<>OS(I) THEN
008A                RUN SS9$(4,1,IERR)
009A                OPEN #PN2,"ITCB4":UPDATE
00AA                GET #PN2,X
00B4                FOR J=1 TO 20
00C4                   X(I,J)=.0
00D6                NEXT J
00E1                SEEK #PN2,.0
00EE                PUT #PN2,X
00F8                CLOSE #PN2
00FE                RUN SS9$(4,2,IERR)
```

```
010E         KILL SS9$
0113       ENDIF
0115     NEXT I
0120     OPEN #PN,"ITCB14":UPDATE
0131     SEEK #PN,235.
013E     PUT #PN,OS
0148     CLOSE #PN
014E 101
```

PROCEDURE MODEM
```
0000     PARAM MODE:INTEGER; PT$:STRING[3]; T$:STRING[15]; ICON:INTEGER
0023     DIM TD$:STRING[17]
002F     DIM RB$(40):STRING[1]
0040     DIM SS9$,SS$:STRING[8]
0050     DIM IERR,L,LGO,PN,RETRY,IC,PT3:INTEGER
006F     DIM XT:REAL
0076     DIM B:BYTE
007D     ICON=0
0084     ON ERROR GOTO 99
008A     SS9$="SECURE"
0097     RUN SS9$(1,1,IERR)
00A7     OPEN #PN,"ITCB1":READ
00B7     SEEK #PN,240.
00C4     GET #PN,XT
00CE     CLOSE #PN
00D4     RUN SS9$(1,2,IERR)
00E4     RUN SS9$(3,1,IERR)
00F4     OPEN #PN,"ITCB3":READ
0104     SEEK #PN,502.
0111     GET #PN,LGO
011B     CLOSE #PN
0121     RUN SS9$(3,2,IERR)
0131     KILL SS9$
0136     IF LEN(T$)<4 OR LGO<>0 OR XT<.5 THEN
0155       IF MODE=1 THEN ICON=1
0167       ENDIF
0169       END
016B     ENDIF
016D     OPEN #PT3,PT$:UPDATE
0179     GOSUB 90
017D     RETRY=0
0184     IF MODE=0 THEN
0190       REPEAT
0192         SS$="CMDM"
019D         RUN SS$(PT3,PT$)
01AC         KILL SS$
01B1         GOSUB 90
01B5         SS$="DIAL"
01C0         RUN SS$(PT3,PT$,"H")
01D3         KILL SS$
01D8         SS$="HANG"
01E3         RUN SS$(RB$,L,"OK")
01F7         KILL SS$
01FC         GOSUB 90
0200         IF L<>1 THEN
020C           RETRY=RETRY+1
0217           GOSUB 80
021B         ELSE
021F           RETRY=2
0226         ENDIF
0228         SS$="DIAL"
0233         RUN SS$(PT3,PT$,"Q1")
0247         KILL SS$
024C       UNTIL RETRY=2
0257     ENDIF
0259     IF MODE=1 THEN
0265       REPEAT
0267         SS$="DIAL"
0272         RUN SS$(PT3,PT$,"Q")
0285         KILL SS$
028A         SS$="HANG"
```

```
0295            RUN SS$(RB$,L,"OK")
02A9            KILL SS$
02AE            SS$="DIAL"
02B9            TD$="D"+TRIM$(T$)
02C6            RUN SS$(PT3,PT$,TD$)
02DA            KILL SS$
02DF            FOR L=1 TO LEN(TD$)
02F1               SHELL "SLEEP 150"
02FE            NEXT L
0309            GOSUB 90
030D            SS$="HANG"
0318            RUN SS$(RB$,L,"CONNECT")
0331            KILL SS$
0336            IF L<>1 THEN
0342               RETRY=RETRY+1
034D               GOSUB 80
0351               ICON=0
0358            ELSE
035C               RETRY=2
0363               ICON=1
036A            ENDIF
036C            SS$="DIAL"
0377            RUN SS$(PT3,PT$;"Q1")
038B            KILL SS$
0390         UNTIL RETRY=2
039B         ENDIF
039D         GOSUB 90
03A1         GOTO 99
03A5   80
03A9         SS$="ENCODE"
03B6         B=2
03BD         RUN SS$(2,B)
03CA         KILL SS$
03CF         RETURN
03D1   90
03D5         SS$="RESP"
03E0   95
03E4         RUN SS$(PT3,PT$,RB$,IC)
03FD         IF IC>1 THEN GOTO 95
040C         ENDIF
040E         KILL SS$
0413         RETURN
0415   99
0419         ON ERROR GOTO 100
041F         CC$="CLEAR "+PT$
0430         SHELL CC$
0435         CLOSE #PT3
043B   100
```

We claim:

1. A control sub-system for a cogeneration system including a liquid-cooled internal combustion engine, electrical generator means coupled to the engine and driven thereby for generating electrical power, power grid switch means connecting the electrical power output of said generator means with a power grid and an electrical load, a plurality of independent thermal loads, and heat exchanger means coupled to the internal combustion engine for extracting therefrom heat energy generated as a result of operation of the engine and applying same to the independent thermal loads for supplying heating and cooling demands of the installation, a programmed computer for controlling the operation of at least the engine, the independent thermal loads and the power switch means, said control sub-system comprising: a plurality of sensors each providing a sensor signal indicative of a different parameter of the cogeneration system, signal processing means coupled to said plurality of sensors, said signal processing means responding to said sensor signals to at least monitor the operation of functional devices of the cogeneration system, operator interface means coupled to said signal processing means, and tailoring means for enabling modification of the operation of said signal processing means in monitoring said functional devices and operating characteristics of the cogeneration system through entry of information via said operator interface means.

2. A control sub-system according to claim 1, further comprising a plurality of control points, said signal processing means coupled to said control points of said cogeneration system associated with functional devices thereof, said signal processing means responding to said sensor signals to control said functional devices to thereby vary operating conditions of the cogeneration system, and said tailoring means enabling changing operating characteristics of the cogeneration system through entry of information via said operator interface means.

3. A control sub-system according to claim 1, wherein said signal processing means is controlled by modularized software which includes a plurality of modules, each including a plurality of submodules, each submodule controlling said signal processing means in the performance of a different operation, a first group of said submodules being common to a plurality of cogeneration system types, and a further group of said submodules being individually correlated to a specific cogeneration system type as a function of characteristics of a selected cogeneration system.

4. A control sub-system according to claim 3, wherein said selected submodules define for the signal processing means the configuration of the cogeneration system, integrated control strategy and system control points.

5. A control sub-system for a cogeneration system including a liquid-cooled internal combustion engine, electrical generator means coupled to the engine and driven thereby for generating electrical power, power grid switch means connecting the electrical power output of said generator means with a power grid and an electrical load, a plurality of independent thermal loads, and heat exchanger means coupled to the internal combustion engine for extracting therefrom heat energy generated as a result of operation of the engine, and applying same to the independent thermal loads for supplying heating and cooling demands of the installation, said control sub-system comprising: a plurality of sensors each providing a sensor signal indicative of a different parameter of the cogeneration system, a plurality of control points, signal processing means coupled to said plurality of sensors and to said control points of said cogeneration system associated with functional devices thereof, said signal processing means responding to said sensor signals to control said functional devices of the cogeneration system to thereby vary the operating characteristics of the cogeneration system, operator interface means coupled to said signal processing means, and tailoring means for enabling modification of the operation of said signal processing means in controlling said functional devices through entry of information via said operator interface means for changing the operating characteristics of the cogeneration system.

6. A control sub-system according to claim 5, wherein said signal processing means is software controlled for operation in a tailoring mode to receive modification information and implement the modifications indicated thereby.

7. A control sub-system according to claim 6, wherein said signal processing means is controlled by modularized software which includes a plurality of modules, each including a plurality of submodules, each submodule controlling said signal processing means in the performance of a different operation, a first group of said submodules being common to a plurality of cogeneration system types, and a further group of said submodules being individually correlated to a specific cogeneration system type, as a function of characteristics of a selected cogeneration system.

8. A control sub-system according to claim 7, wherein said selected submodules define for the processing means the configuration of the cogeneration system, integrated control strategy and system control points.

9. A control sub-system according to claim 7, wherein certain ones of said submodules define the cogeneration system configuration and associated components and control points thereof, and certain other ones of said submodules define quantity and type of controlled devices and sensors, heat rejection mechanism, energy transport vehicle and the nature of the internal combustion engine.

10. A control sub-system according to claim 7, wherein certain ones of said submodules define specific sensors to be monitored in each of a plurality of categories, and certain other submodules define quantity and type of sensors, parameters to be diagnosed and trended, diagnosis-based control supervision.

11. A control sub-system according to claim 7, wherein certain submodules define parameters which can be tailored.

12. A control sub-system according to claim 5, wherein said signal processing means comprises process controller means operating under program control for acquiring said sensor signals and generating analog control signals for application to said functional devices of said cogeneration system, and data generating means coupled to said process controller means for receiving therefrom sensor data signals corresponding to said sensor signals and for providing to said process controller means defined data signals including a set of control data signals representing set point values for said functional devices controlled thereby.

13. A control sub-system according to claim 12, wherein said data generating means responds to the sensor data signals and to defined data signals to monitor diagnostic status conditions for the cogeneration system and to generate an indication of the status conditions.

14. A cogeneration system according to claim 13, wherein said data generating means responds to the sensor data signals and the defined data signals to perform trend-based degradation detection of failure of components of the cogeneration system and to initiate shutdown of the cogeneration system in the event of an anticipated failure of a selected component thereof.

15. A control sub-system according to claim 12, wherein said set of control data signals further comprises operating parameters for said functional devices, said data generating means being programmed to receive modification information via said operator interface means for modifying the cogeneration system operation by changing set point values and operating parameters for said functional devices of the cogeneration system.

16. A control sub-system according to claim 15, wherein said process controller means responds to certain ones of said sensor signals to provide an indication whenever a sensor signal reaches a set point value, and responds to certain other ones of said sensor signals to generate analog control signals for application to said control points to vary operating parameters for the cogeneration system.

17. A control sub-system according to claim 12, wherein said signal processing means provides a plurality of sets of defined data signals including sets of data signals representing operating schedules, power costs, heating/cooling system characteristics, cogeneration system characteristics, analog sensor alarm limits and values for use in analog control signal generation, selected data signals of any of said sets of defined data signals being changeable to reflect information manually entered via said operator interface means.

18. A control sub-system according to claim 17, wherein said process controller means operates independently of said data generating means in controlling the operation of said functional devices of the cogeneration system.

19. A control sub-system for a cogeneration system including a liquid-cooled internal combustion engine, electrical generator means coupled to the engine and driven thereby for generating electrical power, power grid switch means connecting the electrical power output of said generator means with a power grid and an electrical load, a plurality of independent thermal loads, and heat exchanger means coupled to the internal combustion engine for extracting therefrom heat energy generated as a result of operation of the engine and applying same to the independent thermal loads for supplying heating and cooling demands of the installation, a programmed computer for controlling the operation of at least the engine, the independent thermal loads and the power switch means, said control sub-system comprising: a plurality of sensors each providing a sensor signal indicative of a different parameter of the cogeneration system, signal processing means coupled to said plurality of sensors, said signal processing means responding to said sensor signals to at least monitor the operation of functional devices of the cogeneration system, operator interface means coupled to said signal processing means, and tailoring means for enabling modification of the operation of said signal processing means in monitoring said functional devices and operating characteristics of the cogeneration system through entry of information via said operator interface means, said signal processing means controlled by modularized software which includes a plurality of modules each including a plurality of submodules, each submodule controlling said signal processing means in the performance of a different operation, a first group of said submodules being common to a plurality of cogeneration system types, and a second group of said submodules being accessible by said signal processing means for operating said control sub-system only in a monitoring mode and a third group of said submodules being accessible by said signal processing means for operating said control sub-system in a monitoring mode and a control mode.

20. A control sub-system for controlling the operation of a cogeneration system including a liquid-cooled internal combustion engine, an electrical power generator coupled to the engine and driven thereby for generating electrical power, power grid switch means connecting the electrical power output of the generator to a power grid, heat exchanger means for extracting heat generated through operation of the engine and applying the heat to a heating loop for supplying heating requirements for the installation and applying the heat to a cooling loop including cooling means thermally coupled to the heat exchanger means for deriving therefrom cooling for supplying the cooling needs of the installation, said control sub-system comprising: a plurality of sensors for providing electrical sensor signals indicative of parameters of the cogeneration system, a plurality of control points and signal processing means coupled to the electrical sensors and to said control points of the cogeneration system associated with functional devices thereof, said signal processing means responding to the sensor signals to control the operation of the engine for operating the cogeneration system in one of a plurality of operating modes including an electrical load following mode wherein the engine is controlled to produce the energy required to meet the electrical loads of the installation, and a thermal load following mode in which the engine is controlled to generate sufficient thermal energy to satisfy the heating and cooling requirements of the installation, and the signal processing means responding to the sensor signals and to data signals representing the expected total cost for each operating mode to select the operating mode for the cogeneration system which is most economical.

21. A control sub-system according to claim 20, wherein said signal processing means determines engine fuel consumption, amount of electrical power generated, contribution of engine heat to the heating and cooling loops, the system heating requirements, the system cooling requirements, and the system electrical loads in determining the lowest cost operating mode.

22. A control sub-system according to claim 21, wherein said signal processing means is operative to disable the electrical power generator whenever the required throttle setting for the thermal or electrical load following mode is less than an idle setting for the throttle.

23. A control sub-system according to claim 21, wherein the signal processing means determines operating cost, as a function of operating mode, in accordance with the relationship:

$$COST = QXG*CX + QCG*CCG + QEU*CU$$

where:
QXG = the thermal equivalent of auxiliary fuel
CX = the cost of auxiliary fuel,
QCG = the thermal equivalent of cogenerator fuel
CCG = the cost of cogenerator fuel,
QEU = the difference between electrical power usage and electrical power generated by generator means, and
CU = the cost of buying (or the price for selling) electricity.

24. A control sub-system according to claim 23, wherein the cogeneration system includes an auxiliary heating means and an auxiliary cooling means, and wherein said signal processing means correlates the cost of energy for operating the auxiliary heating means with the cost for operating the auxiliary cooling means to determine which of the auxiliary heating means and cooling means is the most expensive to operate, and controls functional devices of the cogeneration system to select a heating load priority mode in which thermal energy output from the heat exchanger means is applied to the heating loop and to select a cooling load priority mode in which thermal energy output from the heat exchanger means is applied to the cooling loop.

25. A control sub-system according to claim 20, wherein said signal processing means responds to said sensor signals and to stored data signals to generate an analog control signal for application to the engine to control throttling of the engine as a function of operating mode selected by establishing a throttle setting for the engine.

26. A control sub-system according to claim 25, wherein said signal processing means responds to sensor signals representing the difference in the power grid import/export electrical power and the electrical power generated by the generator to control the throttle setting for the engine when the cogeneration system is operating in the electrical load following mode, and said signal processing means responds to sensor signals representing heat contribution of the engine to the heating and cooling loops to control the throttle setting for the engine when the cogeneration system is operating in the thermal load following mode.

27. A control sub-system for controlling the operation of a cogeneration system including a liquid-cooled internal combustion engine, an electrical power generator coupled to the engine and driven thereby for generating electrical power, heat exchanger means for extracting heat generated through operation of the engine and applying the heat to a heating loop for supplying heating requirements for the installation and applying the heat to a cooling loop including cooling means thermally coupled to the heat exchanger means for deriving therefrom cooling for supplying the cooling needs of the installation, said control sub-system comprising: a plurality of functional devices, a plurality of sensors for providing electrical sensor signals indicative of parameters of the cogeneration system, a plurality of control points and signal processing means coupled to the electrical sensors and to said control points of the cogeneration system associated with said functional devices, said signal processing means responding to the sensor signals to control the operation of the cogeneration system in a selectable one of a plurality of operating modes including an electrical load following mode wherein the engine is controlled to produce the energy required to meet the electrical loads of the installation, and a thermal load following mode in which the engine is controlled to generate sufficient thermal energy to satisfy the heating and cooling requirements of the installation, and said signal processing means defining a plurality of interactive control loops each generating an analog control signal for controlling a different one of said functional devices as a function of variation in a sensor signal supplied to the control loop relative to a setpoint value for the control loop, the control loop setpoints for said plurality of control loops being referenced to a common setpoint value with a predetermined offset from the referenced setpoint value.

28. A control sub-system according to claim 27, wherein said common setpoint value is the engine coolant temperature.

29. A control sub-system according to claim 28, wherein at least one of said control loops includes first and second sub-loops, each having a different setpoint value, one of which is said common reference setpoint value, and each providing output error signal, and wherein said signal processing means selects the output error signal from one of said loops as a function of the relative amplitudes of the output error signals for use in generating the analog control signal for that loop.

30. A control sub-system according to claim 29, wherein different ones of said control loops have different offsets from the reference setpoint value.

31. A control sub-system according to claim 30, which includes means for establishing load priority in the delivery of thermal energy to the heating load or to the cooling load and wherein for a given control loop, different offsets from the reference setpoint value are used as a function of load prioritization.

32. A control sub-system according to claim 31, wherein the number of setpoint values for said plurality of control loops is less than the number of said control loops, certain ones of said control loops employing the same reference setpoint value.

33. A control sub-system according to claim 31, wherein said signal processing means responds to sensor signals to change the operating mode for the cogeneration system as a function of fuel cost and consumption for the cogeneration system.

34. In a control system including a plurality of functional devices, the combination comprising: a plurality of sensors for providing electrical sensor signals indicative of parameters of the system, a plurality of control points, and signal processing means coupled to the electrical sensors and to said control points of the system associated with said functional devices, said signal processing means responding to the sensor signals and generating a plurality of analog control signals to control the operation of the functional devices; said signal processing means defining a plurality of interactive control loops each generating an analog control signal for controlling a different one of said function devices as a function of variation in a sensor signal supplied to the control loop relative to a setpoint value for the control loop, the control loop setpoints for said plurality of control loops being referenced to a common setpoint with a predetermined offset from the reference.

35. A control system according to claim 34, wherein at least one of said control loops includes first and second sub-loops, each having a different setpoint value, one of which is said common reference setpoint value, and each providing output error signal, and wherein said signal processing means selects the output error signal from one of said loops as a function of the relative amplitudes of the output error signals for use in generating the analog control signal for that loop.

36. A control system according to claim 35, wherein different ones of said control loops have different offsets from the reference setpoint value.

* * * * *